Nov. 11, 1941.　　B. M. SHIPLEY ET AL　　2,262,258
ACCOUNTING MACHINE
Original Filed June 28, 1933　　25 Sheets-Sheet 1

Inventors
Bernis M. Shipley
Pascal Sburlino and
Everett H. Placke
By Earl Benst
their Attorney

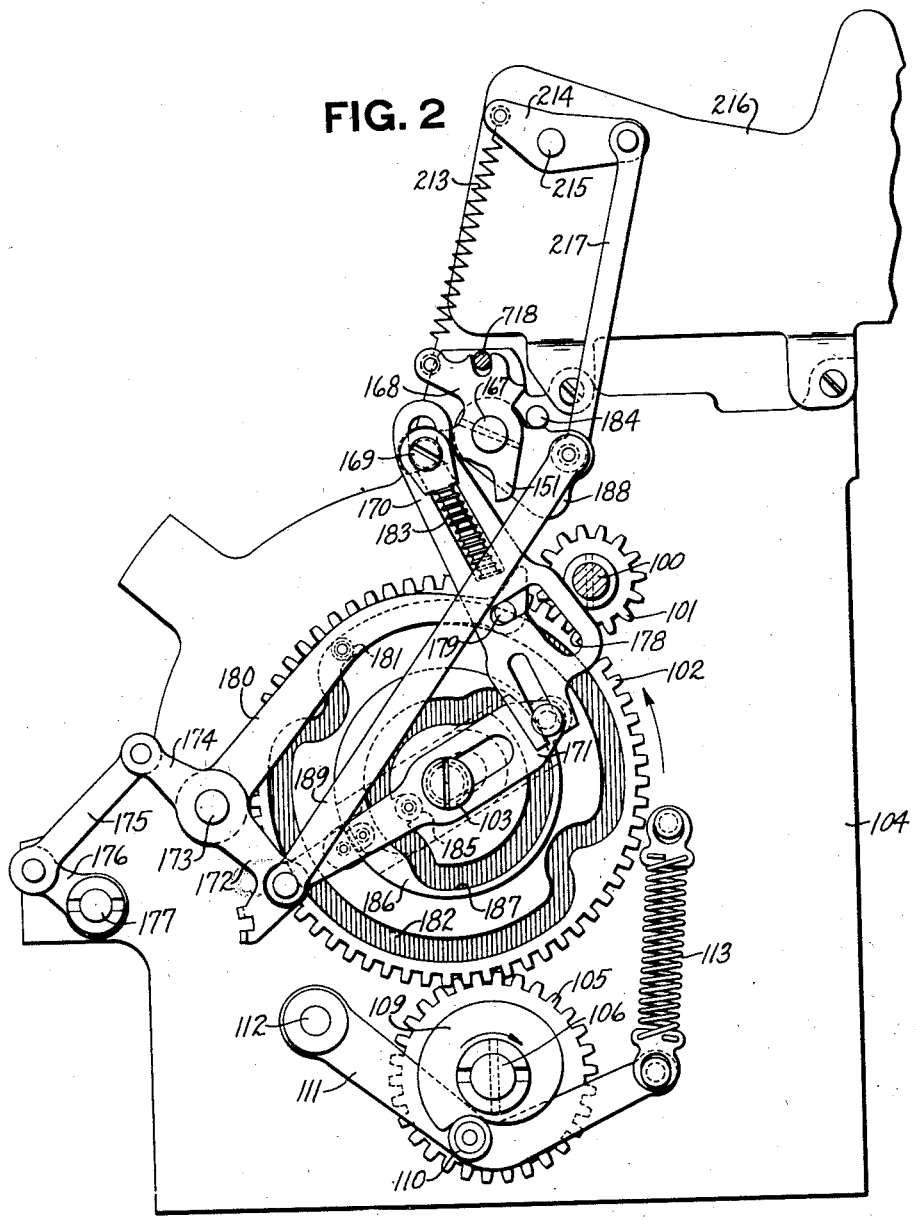

Nov. 11, 1941.   B. M. SHIPLEY ET AL   2,262,258
ACCOUNTING MACHINE
Original Filed June 28, 1933   25 Sheets-Sheet 3

Inventors
Bernis M. Shipley
Pascal Sburlino and
Everett H. Placke
By Pearl Benst
their Attorney

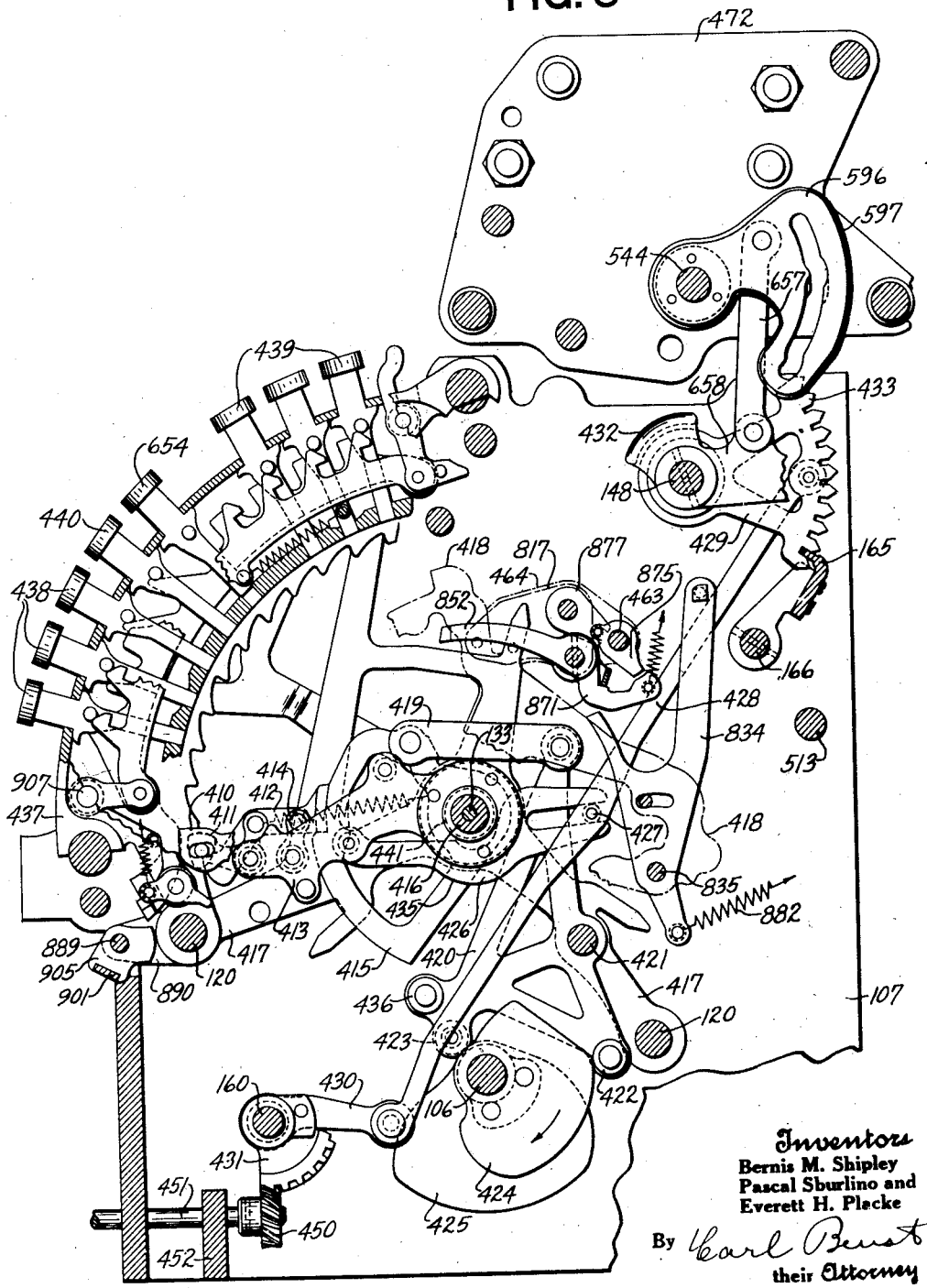

Nov. 11, 1941.   B. M. SHIPLEY ET AL   2,262,258
ACCOUNTING MACHINE
Original Filed June 28, 1933   25 Sheets-Sheet 5

Inventors
Bernis M. Shipley
Pascal Sburlino and
Everett H. Placke

By   *Earl Benst* their Attorney

Nov. 11, 1941.   B. M. SHIPLEY ET AL   2,262,258
ACCOUNTING MACHINE
Original Filed June 28, 1933   25 Sheets-Sheet 7

Inventors
Bernis M. Shipley
Pascal Sburlino and
Everett H. Placke
By Earl Benst
their Attorney Inventors
Bernis M. Shipley
Pascal Sburlino and
Everett H. Placke By Carl Benst
their Attorney Nov. 11, 1941.　　B. M. SHIPLEY ET AL　　2,262,258
ACCOUNTING MACHINE
Original Filed June 28, 1933　　25 Sheets-Sheet 9

Inventors
Bernis M. Shipley
Pascal Sburlino and
Everett H. Placke
By *Earl Beust*
their Attorney

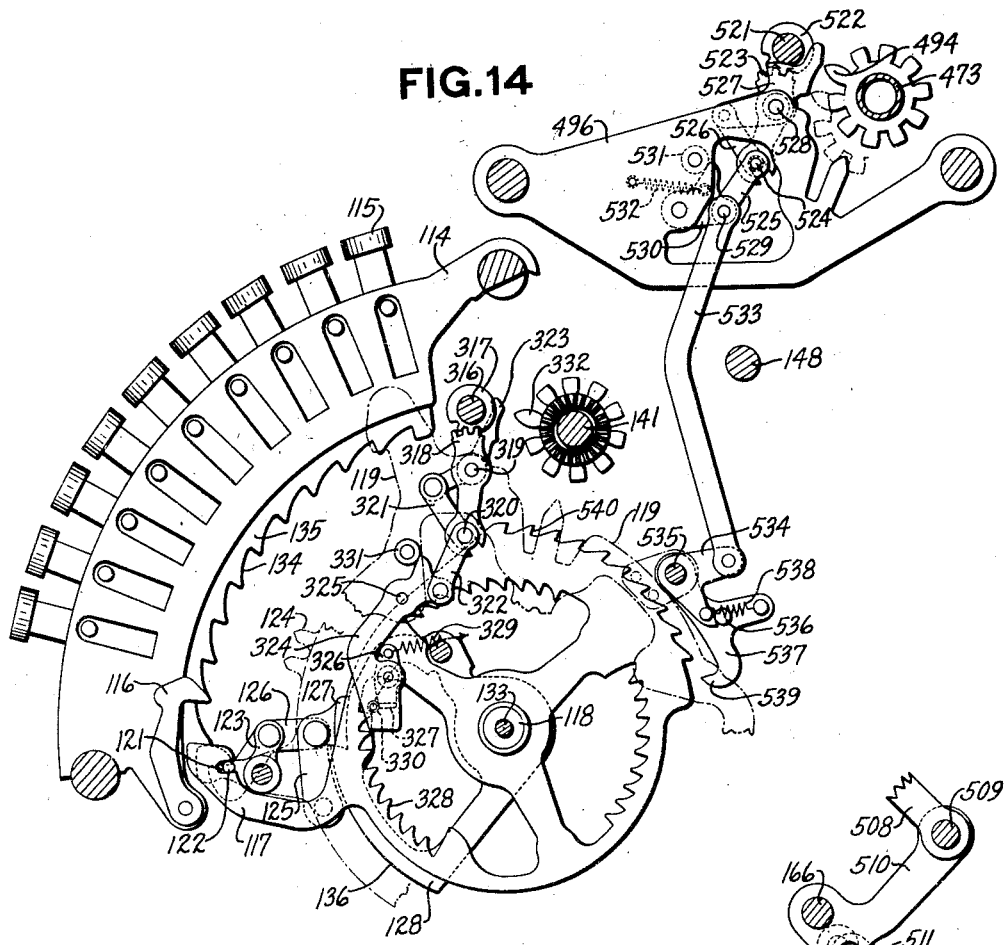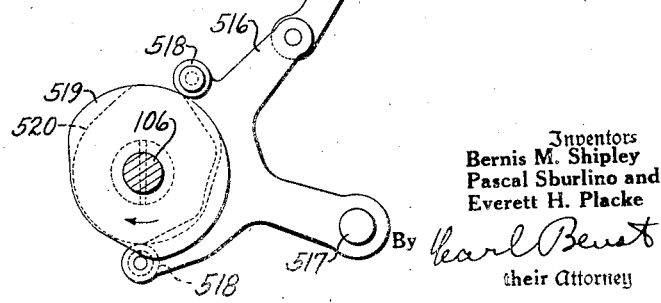

Nov. 11, 1941.   B. M. SHIPLEY ET AL   2,262,258
ACCOUNTING MACHINE
Original Filed June 28, 1933   25 Sheets-Sheet 11

Inventors
Bernis M. Shipley
Pascal Sburlino and
Everett H. Placke
By Earl Berust
their Attorney Nov. 11, 1941.    B. M. SHIPLEY ET AL    2,262,258
ACCOUNTING MACHINE
Original Filed June 28, 1933    25 Sheets-Sheet 12
FIG. 21
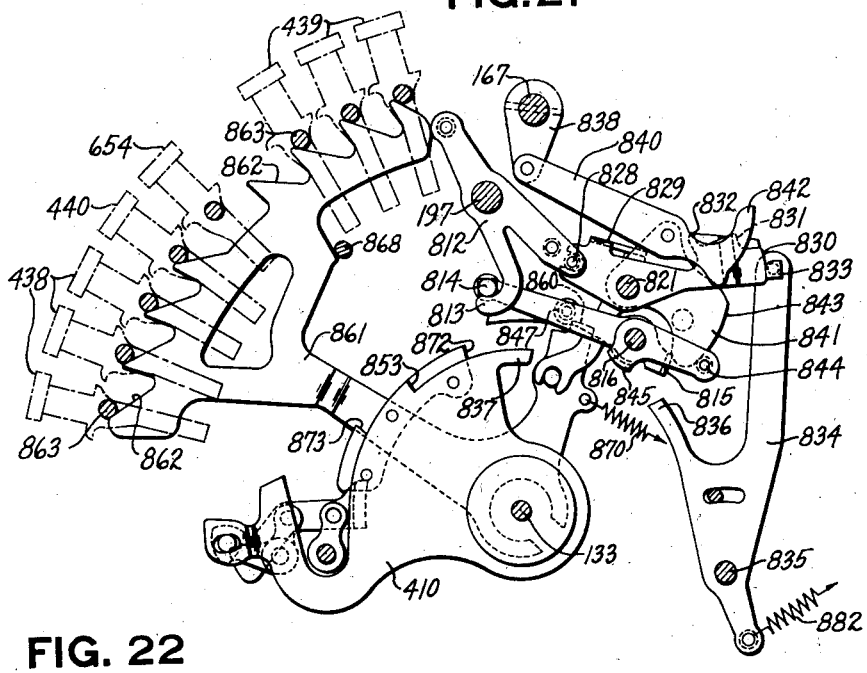
FIG. 22
FIG. 23
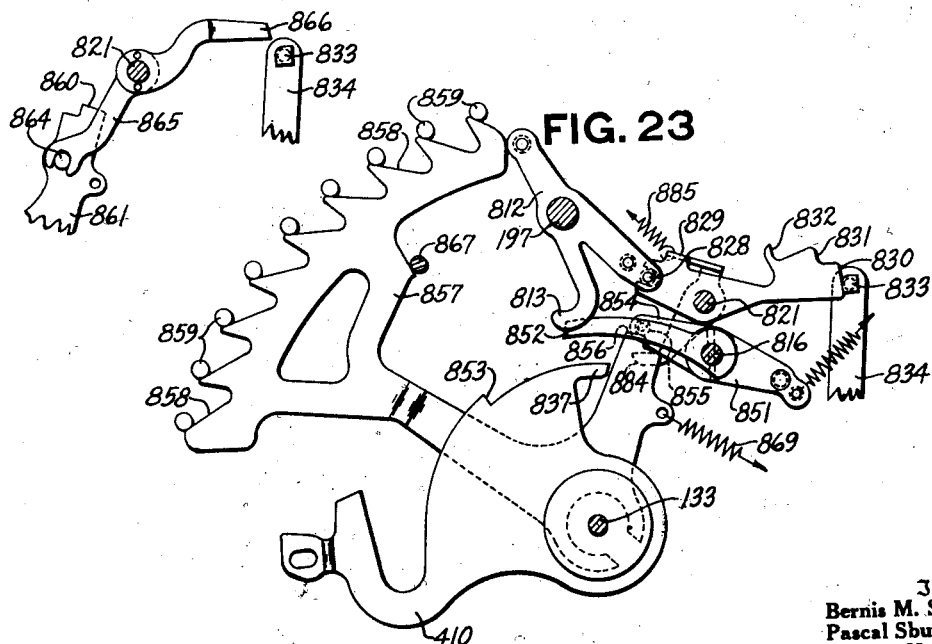
Inventors
Bernis M. Shipley
Pascal Sburlino and
Everett H. Placke
By Earl Beust
their Attorney Nov. 11, 1941.  B. M. SHIPLEY ET AL  2,262,258
ACCOUNTING MACHINE
Original Filed June 28, 1933  25 Sheets-Sheet 13

Inventors
Bernis M. Shipley
Pascal Sburlino and
Everett H. Placke
By Carl Beust
their Attorney

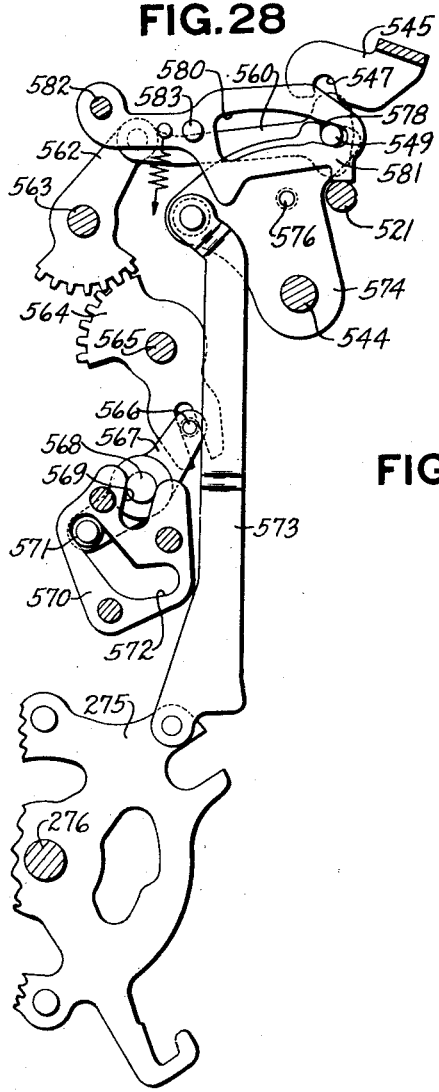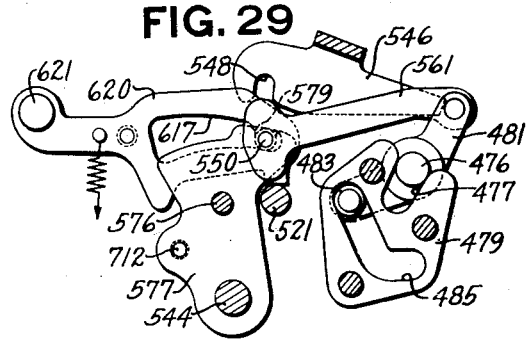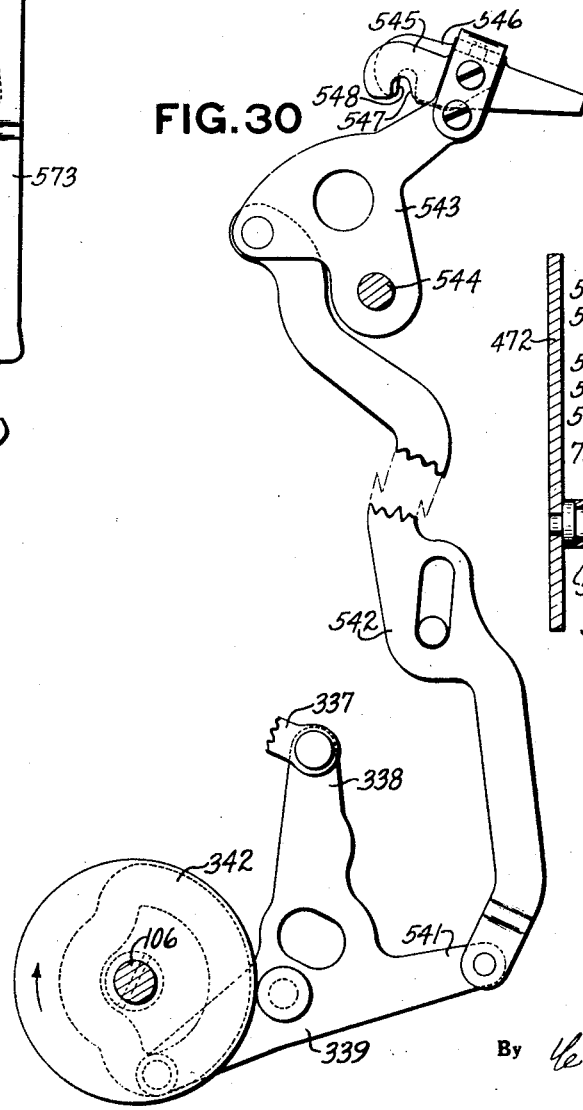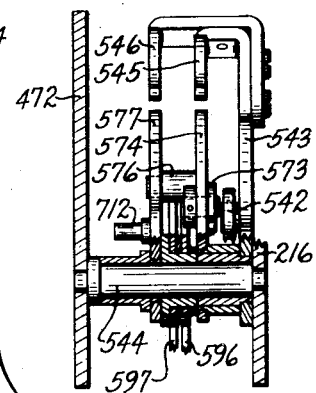

Nov. 11, 1941. B. M. SHIPLEY ET AL 2,262,258
ACCOUNTING MACHINE
Original Filed June 28, 1933 25 Sheets—Sheet 15

Inventors
Bernis M. Shipley
Pascal Sburlino and
Everett H. Placke

By *Pearl Benst*
their Attorney

Nov. 11, 1941. B. M. SHIPLEY ET AL 2,262,258
ACCOUNTING MACHINE
Original Filed June 28, 1933 25 Sheets-Sheet 16
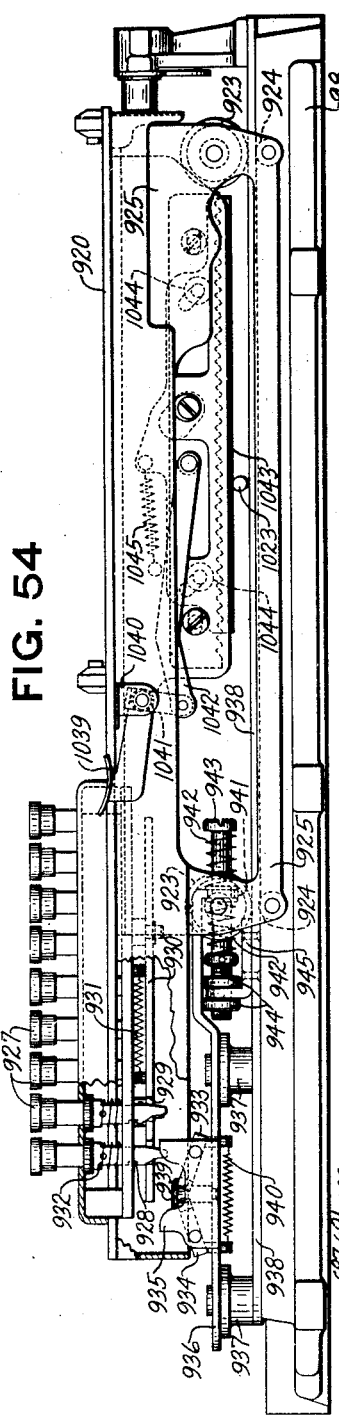
Inventors
Bernis M. Shipley
Pascal Sburlino and
Everett H. Placke
By *Carl Benst*
their Attorney

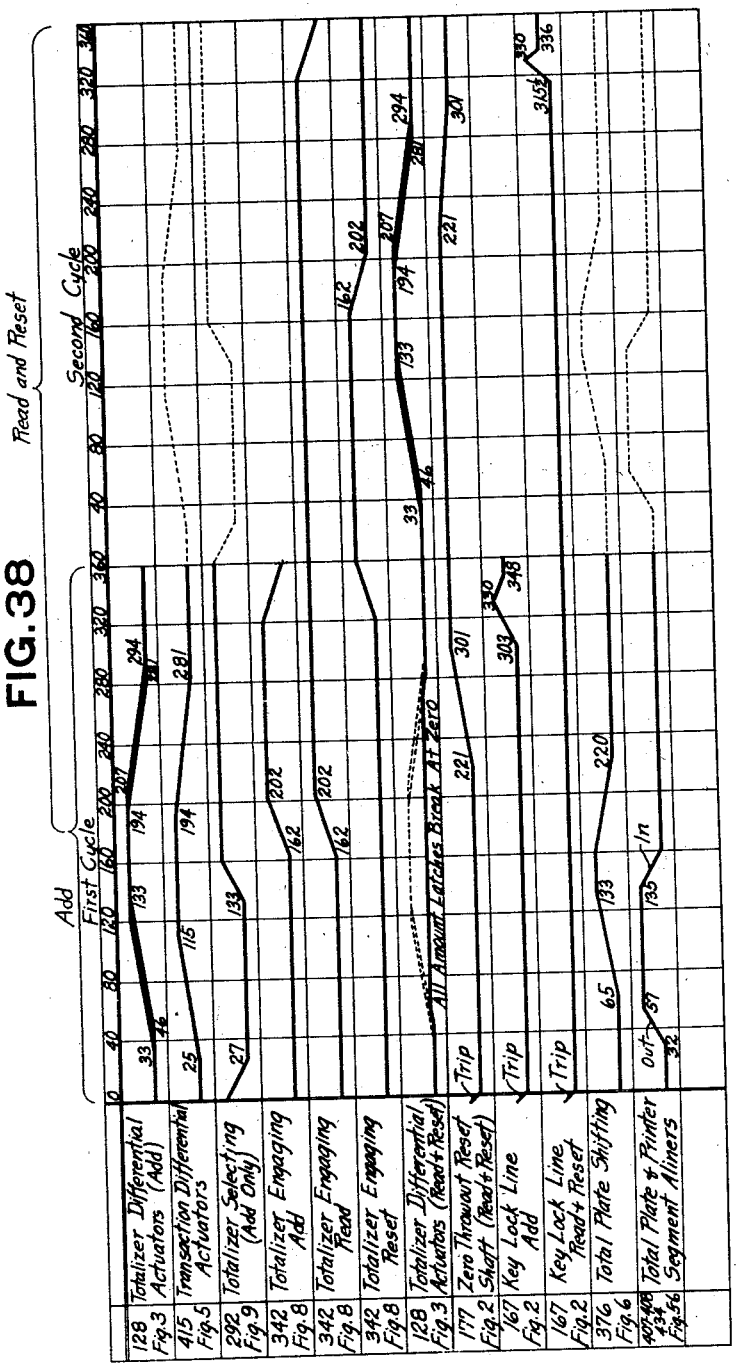

Nov. 11, 1941.   B. M. SHIPLEY ET AL   2,262,258
ACCOUNTING MACHINE
Original Filed June 28, 1933   25 Sheets-Sheet 18

Inventors
Bernis M. Shipley
Pascal Sburlino and
Everett H. Placke

By Earl Beust
their Attorney

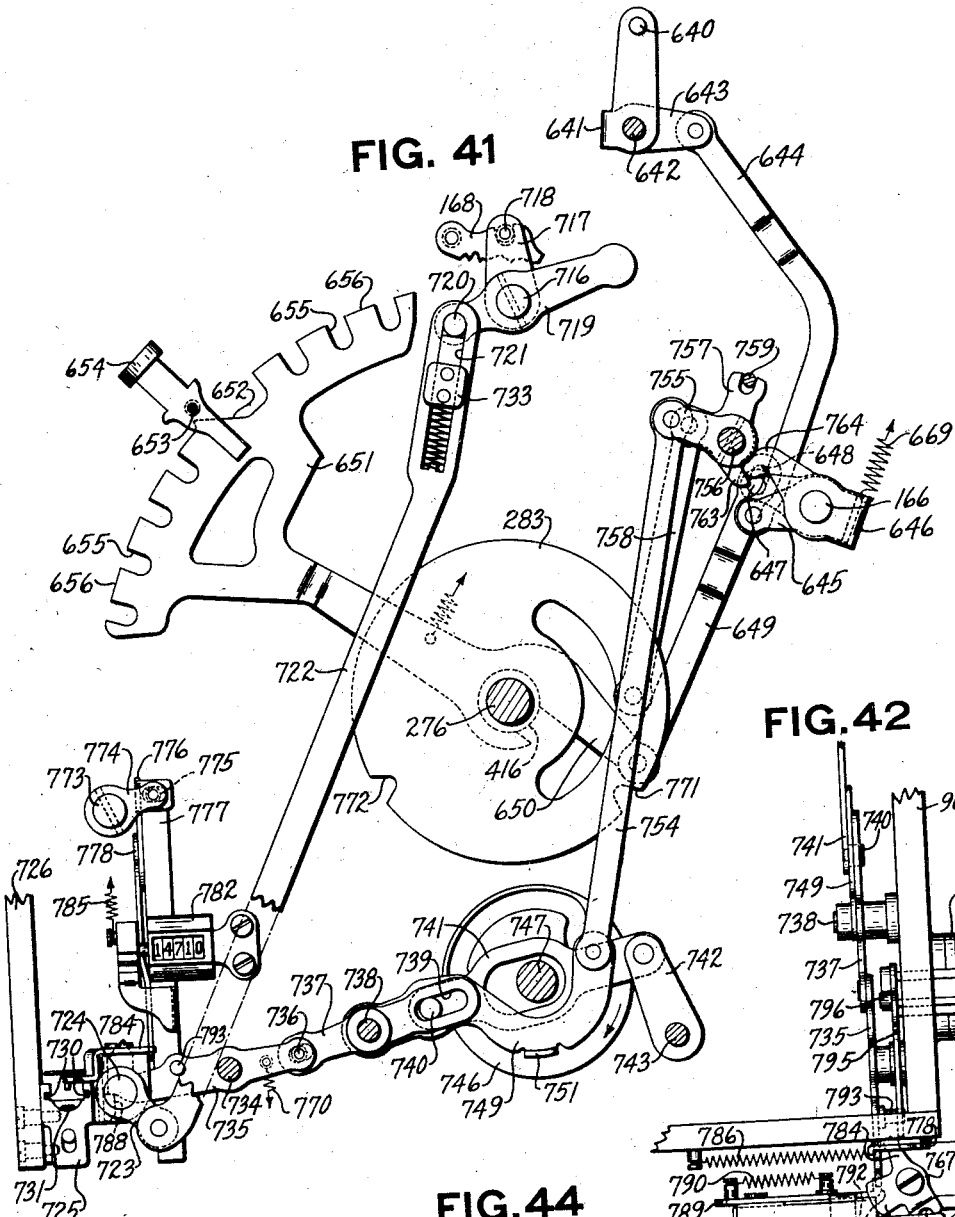

Nov. 11, 1941.　　　B. M. SHIPLEY ET AL　　　2,262,258

ACCOUNTING MACHINE

Original Filed June 28, 1933　　　25 Sheets-Sheet 20

Inventors
Bernis M. Shipley
Pascal Sburlino and
Everett H. Placke

By　*Hearl Beust* their Attorney

Nov. 11, 1941.   B. M. SHIPLEY ET AL   2,262,258
ACCOUNTING MACHINE
Original Filed June 28, 1933   25 Sheets-Sheet 21

FIG. 49

| | DATE | OLD BAL. | DEBIT | CREDIT | NEW BAL. | | TR. | ACC. NO. |
|---|---|---|---|---|---|---|---|---|
| NAME JOHN DOE | | | | | | | | ACC. NO. 12357 |
| 1 | | 8***5,000.00 | | ****150.00 | | 1 | CI | 12357 |
| 2 | | | | ****60.00 | | 2 | TC | |
| 3 | | | | ****25.00 | | 3 | IC | |
| 4 | | | ****300.00 | | | 4 | LP | |
| 5 | | | *****60.00 | | | 5 | TP | |
| 6 | JUL-1-33 | | *****25.00 | | ****4850.00 | 6 | IP | |

| | DATE | OLD BAL. | DEBIT | CREDIT | NEW BAL. | | TR. | ACC.NO |
|---|---|---|---|---|---|---|---|---|
| 1 | JAN14-33 | 8****0.78 | | *5.60 | ---***6.38 | 1 | CC | 12731 |
| 2 | | | | | | 2 | | |

| | DATE | DEBIT | | | | |
|---|---|---|---|---|---|---|
| 1 | JAN14-33 | **50,780.00 | | | 1 | LP E |
| 2 | JAN14-33 | ***677.48 | | | 1 | PI E |
| 3 | JAN14-33 | ****780.00 | | | 1 | IP E |
| 4 | JAN14-33 | ****74.80 | | | 1 | TP E |
| 5 | JAN14-33 | ****790.56 | | | 1 | SR E |
| 6 | JAN14-33 | *****45.60 | | | 1 | PS E |
| 7 | JAN14-33 | ****457.00 | | | 1 | CD E |
| 8 | JAN14-33 | **2,300.00 | | | 1 | DC E |
| 9 | JAN14-33 | ******0.00 | | | 1 | NR E |
| 10 | JAN14-33 | | DEBIT TOTAL | ***76,605.44 | | E |
| 11 | JAN14-33 | | OLD DEB.BAL | ***49,615.60 | | |
| 12 | JAN14-33 | | NEW CR.BAL | ***58,009.70 | | |
| 13 | JAN14-33 | CREDIT | BALANCE | ---*18,423.074 | | |
| 14 | JAN14-33 | ******0.00 | | | 2 | LDE |
| 15 | JAN14-33 | ******0.00 | | | 2 | CIE |
| 16 | JAN14-33 | ******5.60 | | | 2 | ICE |
| 17 | JAN14-33 | ******5.60 | | | 2 | TCE |
| 18 | JAN14-33 | *****71.20 | | | 2 | SWE |
| 19 | JAN14-33 | ******6.01 | | | 2 | SCE |
| 20 | JAN14-33 | ******0.00 | | | 2 | CCE |
| 21 | JAN14-33 | *****33.57 | | | 2 | DPE |
| 22 | JAN14-33 | ******6.04 | | | 2 | NPE |
| 23 | JAN14-33 | | CREDIT TOTAL | *****128.02 | | |
| 24 | JAN14-33 | | OLD CR. BAL | ***65,171.78 | | |
| 25 | JAN14-33 | | NEW DEB.BAL | **118,930.94 | | |
| 26 | JAN14-33 | | BALANCE | **18,423.074 | | |
| 27 | | | | | | |

Inventors
Bernis M. Shipley
Pascal Sburlino and
Everett H. Placke

By *Hearl Benst*
their Attorney

Nov. 11, 1941.   B. M. SHIPLEY ET AL   2,262,258
ACCOUNTING MACHINE
Original Filed June 28, 1933   25 Sheets-Sheet 22

Inventors
Bernis M. Shipley
Pascal Sburlino and
Everett H. Placke
By Pearl Benst
their Attorney Nov. 11, 1941.　　　B. M. SHIPLEY ET AL　　　2,262,258
ACCOUNTING MACHINE
Original Filed June 28, 1933　　25 Sheets-Sheet 23

Inventors
Bernis M. Shipley
Pascal Sburlino and
Everett H. Placke
By Carl Beust
their Attorney Nov. 11, 1941.  B. M. SHIPLEY ET AL  2,262,258
ACCOUNTING MACHINE
Original Filed June 28, 1933    25 Sheets-Sheet 24
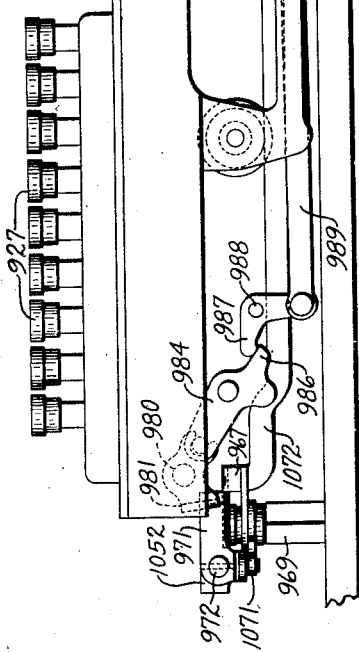
FIG. 56
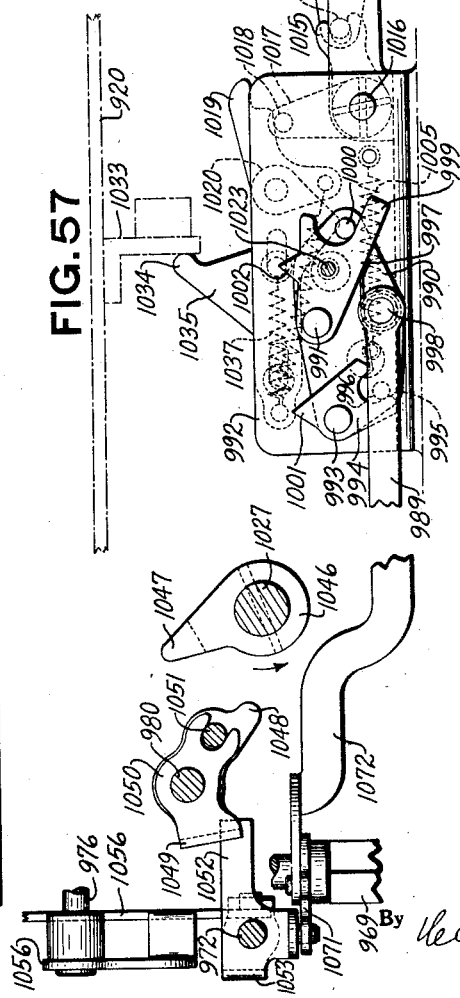
FIG. 57
FIG. 58
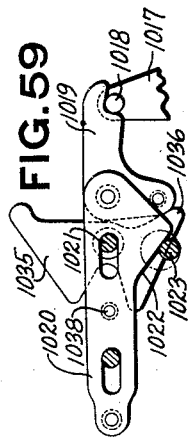
FIG. 59
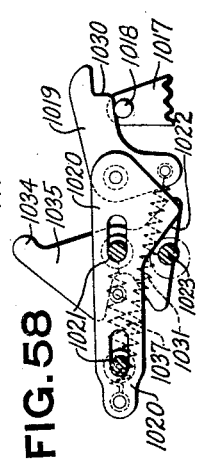
Inventors
Bernis M. Shipley
Pascal Sburlino and
Everett H. Placke
By Karl Beust
their Attorney Nov. 11, 1941.   B. M. SHIPLEY ET AL   2,262,258
ACCOUNTING MACHINE
Original Filed June 28, 1933   25 Sheets-Sheet 25

Inventors
Bernis M. Shipley
Pascal Sburlino and
Everett H. Placke
By Carl Benst
their Attorney Patented Nov. 11, 1941

2,262,258

UNITED STATES PATENT OFFICE 2,262,258

ACCOUNTING MACHINE

Bernis M. Shipley, Pascal Sburlino, and Everett H. Placke, Dayton, Ohio, assignors to The National Cash Register Company, Dayton, Ohio, a corporation of Maryland Application June 28, 1933, Serial No. 677,980
Renewed June 14, 1939

30 Claims. (Cl. 235—7)

This invention relates to the type of cash registers known as accounting machines, and more particularly to the type of accounting machines used by banking and similar institutions.

The primary object of this invention is to provide a machine adapted for use by banking and similar institutions.

Another object is to provide the present standard machine with additional totalizer capacity by incorporating therein an auxiliary line of interspersed totalizers.

A further object is to construct a machine in which one of the adding totalizers and the add-subtract totalizer are connected in such a manner that the selection and functions of one are controlled by the controlling mechanism of the other.

Still another object is the provision of means whereby the auxiliary totalizer functions through the regular differential mechanism.

Still another object is to supply novel means for controlling the functions of the auxiliary totalizer.

Still another object is to provide automatic means for selecting the positive and negative sides of the add-subtract totalizer and the totalizers on the auxiliary line.

Other objects of the instant invention are to provide means for directly transferring totals from the auxiliary totalizer to the add-subtract totalizer, and vice versa; to supply means for controlling the auxiliary totalizer and the add-subtract totalizer by means of one row of keys; the provision of an improved differential latch mechanism; to provide various interlocks between the banks of transaction keys, the total keys and the machine releasing means; to improve the mechanism for adjusting the total plate by means of keys; to provide means for automatically line-spacing the traveling carriage when certain transactions are being computed; and to furnish novel means for controlling the line-spacing means.

With these and incidental objects in view, the invention consists of certain novel features of construction and combinations of parts, the essential elements of which are set forth in appended claims and a preferred form of embodiment of which is hereinafter described with reference to the drawings which accompany and form part of this specification.

Of said drawings:

Fig. 2 is an elevation of the right side frame showing the cycle control mechanism.

Fig. 5 is a sectional view of one of the transaction banks and its associated differential mechanism.

Fig. 14 is a sectional view taken just to the right of an amount bank showing the mechanism for controlling the machine differentials in read and reset operations.

Fig. 15 is a detail view of part of the mechanism for resetting the auxiliary totalizer transfer mechanism.

Fig. 21 is a side elevation as observed from the right, showing the differential latch mechanism for the first transaction bank, and the mechanism for automatically breaking said latch mechanism.

Fig. 22 is a detail view of the means for crippling part of the automatic latch-breaking mechanism when a key is depressed in the first transaction bank.

Fig. 23 is a side view of the manner in which the automatic latch-breaking mechanism is controlled by the third transaction bank.

Fig. 28 is a side elevation as observed from the right of the machine, showing the mechanism for engaging the auxiliary and the add-subtract totalizers with their actuators in add, read, and reset operations.

Fig. 29 is a detail view of the engaging mechanism for the auxiliary totalizer.

Fig. 30 is a side view of the mechanism for engaging the add-subtract and the auxiliary totalizers with their actuators in add operations.

Fig. 31 is a fragmentary sectional view showing the side spacing of the engaging cam for the auxiliary and the add-subtract totalizers.

Fig. 36 is a view as observed from the front of the machine showing the side spacing of parts shown in Fig. 37.

Fig. 37 is a side elevation of the read and reset selecting mechanism for the auxiliary totalizer.

Fig. 38 is a time chart giving the movements of the principal mechanisms of the instant machine.

Fig. 41 is a side elevation illustrating the proof key, and the correction and cashier key mechanisms.

Fig. 42 is a fragmentary view as observed from above, showing a portion of the correction key mechanism.

Fig. 43 is a detail view illustrating the manner in which the correction key mechanism is locked in ineffective position.

Fig. 44 is a perspective view of the correction key.

Fig. 45 is a perspective of the cashier's key.

Fig. 49 is a facsimile of a fragment of a ledger or account card illustrating one form of transaction which is possible with the instant machine.

Fig. 50 is a facsimile of a fragment of another ledger card.

Fig. 51 is a facsimile of a portion of a proof card.

Fig. 52 illustrates a portion of the detail strip used in the present machine.

Fig. 54 is a front elevation of the sliding table or traveling carriage with which the instant machine is equipped.

Fig. 55 is a fragmentary end view as observed from the right, showing the method of mounting the sliding table to the machine.

Fig. 56 is a front view of the sliding table showing in a general way the escapement mechanism.

Fig. 57 is a front view showing in detail the escapement mechanism and part of its controlling mechanism.

Fig. 58 is a detail view showing the escapement releasing mechanism in ineffective position.

Fig. 59 is a detail view showing the escapement releasing mechanism in effective position.

GENERAL DESCRIPTION

Figure 1:
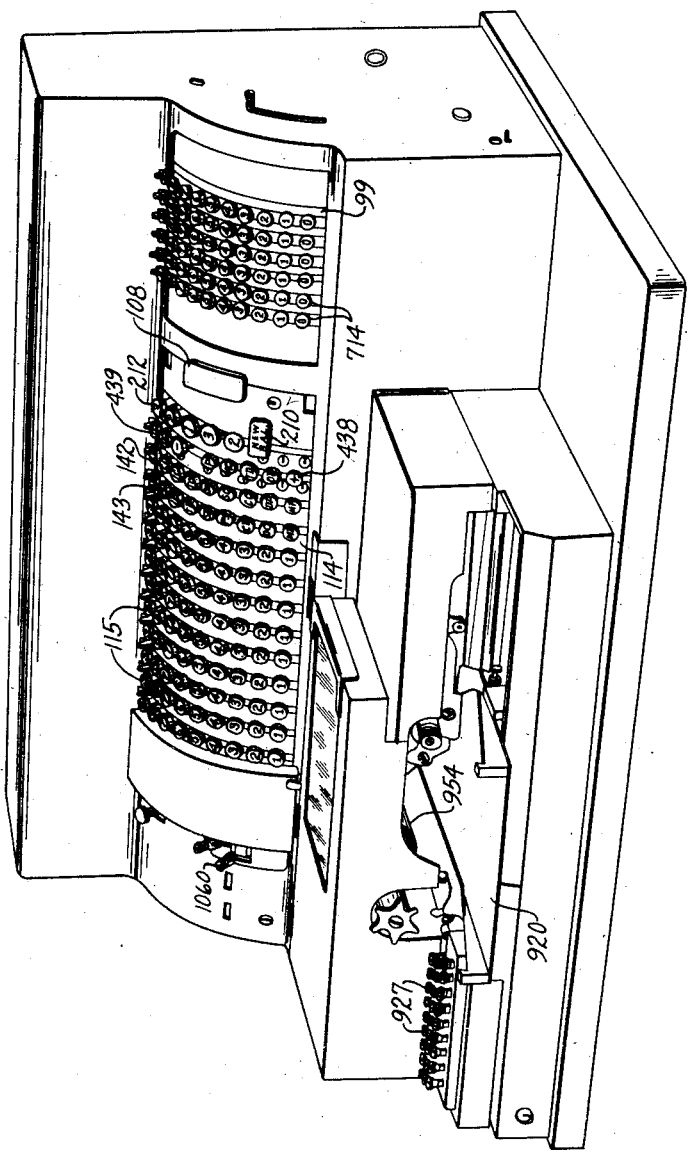
Fig. 1 is a perspective of the complete machine.

The instant invention is embodied in a machine of the type illustrated and described in Letters Patent of the United States Nos. 1,619,796, 1,747,397 and 1,761,542 issued respectively March 1, 1927, February 18, 1930, and June 3, 1930, to B. M. Shipley, and the copending application of M. M. Goldberg filed August 27, 1931, Serial Number 559,720, now Patent No. 2,175,346, issued October 10, 1939.

Such mechanism of the instant machine which is of standard construction, having been used in former machines, will be but briefly treated in both the general description and the detailed description to follow. However, reference may be had to the patents and application referred to above and hereinafter for a more detailed description of the mechanism not thoroughly treated herein.

The machine of the instant invention while shown embracing a system for use by building and loan associations is very flexible in its nature and with slight alterations may be adapted for use by various other business institutions where debits and credits are constantly being made against old balances, and new balances ascertained.

Heretofore when machines of this type were equipped with an add-subtract totalizer, sometimes referred to as a balance totalizer, it was necessary to sacrifice one line of interspersed totalizers in order to provide room for the balance totalizer. This greatly reduced the registering capacity of the machine as it left only two lines of interspersed totalizers in addition to the balance totalizer.

In the instant invention an auxiliary line of interspersed totalizers has been added to the standard machine, substantially increasing the totalizer capacity and improving the flexibility of the machine to a marked degree.

The present machine also embraces an improved "key set" total plate, which greatly facilitates the control of the machine for reading and resetting of the different totalizer lines.

Selection of the different totalizers on the auxiliary line, some of which represent negative data and others of which represent positive data, is accomplished by means of a first transaction bank of keys. The auxiliary totalizer and the "balance" totalizer are so connected that selection of one of the different totalizers on the auxiliary line automatically selects the proper side (positive or negative) of the "balance" totalizer. The other two lines of interspersed totalizers are each controlled by a separate bank of keys, one of these lines being used for the accumulation of credit items and the other for the accumulation of debit items.

The auxiliary totalizer line in its present embodiment is used for the accumulation of grand totals of credits, debits, old credit balances, old debit balances, positive new balances, and negative new balances. Selecting one of the debit totalizers automatically selects the debit grand totalizer on the auxiliary line and also the negative side of the "balance" totalizer. In like manner selection of a totalizer on the credit line automatically selects the credit grand totalizer on the auxiliary line and at the same time the positive side of the "balance" totalizer.

In ascertaining what the new balance is, the positive or negative side of the "balance" totalizer, depending on the positive or negative condition of the new balance, is automatically selected for resetting and simultaneously the proper totalizer on the auxiliary line is automatically selected for storing the positive or negative new balance. The same thing occurs when setting up an old balance. By depressing the proper key, the positive or negative old balance is simultaneously entered in the corresponding totalizer of the auxiliary line and the proper side of the balance totalizer.

In proof-reading the auxiliary totalizer the total credits, total old credit balances, and the total of the negative new balances are transferred from the auxiliary totalizer to one side of the "balance" totalizer, the "balance" totalizer is then cleared in order to print the grand total of these items. Next the total debits, total old debit balances and the total of the positive new balances are transferred from the auxiliary totalizer to the "balance" totalizer and the "balance" totalizer cleared as before. The grand total of these two groups of items should agree.

In order to prevent the grand totals of the two groups of items in a proof reading operation from being transferred to the auxiliary totalizer a proof key is provided. Depression of this key disables the mechanism that engages the auxiliary totalizer with its actuators.

From the foregoing it will be seen that amounts may be transferred directly from the auxiliary totalizer to the "balance" totalizer and vice versa, or amounts may be simultaneously added in either of the item totalizers, the balance totalizer and the auxiliary totalizer.

In the detailed description to follow, the mechanism briefly outlined above, will be thoroughly treated.

DETAILED DESCRIPTION

Operating Mechanism

The machine of the instant invention is preferably operated by means of the usual electric motor. Releasing the machine for operation automatically closes the electrical circuit and clutches the motor to the driving mechanism of the machine, from which it is automatically declutched after the machine has operated through the proper number of cycles. As these motor and clutch and releasing mechanisms are of conventional design, they have not been illustrated herein, and will not be further described. However, if further description is desired, reference may be had to Letters Patent of the United States No. 1,144,418 granted June 29, 1915, to Kettering and Chryst.

If desired the machine may be hand-operated by means of a crank, (not shown), connected to the right end of a shaft 100 (Fig. 2) journaled between the side frames 96 and 97 (Fig. 46) of a ledger unit 99 (Fig. 1). Secured to the left end of the shaft 100 is a pinion 101 (Fig. 2) which cooperates with a gear 102 pivoted on a stud 103 secured in a main right frame 104. The gear 102 meshes with a gear 105 secured on the right-hand end of a main cam shaft 106, one end of which is journaled in the right frame 104, the other end being journaled in a left frame 107 (Fig. 5). The ledger unit frames 96 and 97 and the main frames 104 and 107, between which the bulk of the machine mechanism is supported, are mounted on a machine base 98 (Figs. 54 and 55). Depressing a starting bar 108 (Fig. 1) releases the shaft 106 (Fig. 2) for rotation. The machine may then be operated by means of the hand crank and its associated mechanism.

Secured on the right end of the shaft 106 is a cam 109 which cooperates with a roller 110 pivotally mounted on a lever 111 loose on a stud 112 secured in the frame 104. A strong spring 113 is tensioned to urge the lever 111 upward and through the roller 110 and the cam 109 assist the shaft 106 to its home position after the clutch mechanism has been disengaged near the end of an operation. Further explanation of this operating mechanism is deemed unnecessary, as reference may be had to the previously mentioned patents if a more detailed description is desired.

Keyboard

For illustrative purposes let us assume that the instant machine has been arranged for use by building and loan associations or similar banking institutions where individual records are kept of each member's account. Such accounts are frequently subjected to debit and credit transactions, which includes the setting up of an old balance, the addition of credits to or the subtraction of debits from such old balance, and the ascertainment of the new balance. With such a system in mind let us examine the keyboard of this machine.

Amount keys

Figure 3:
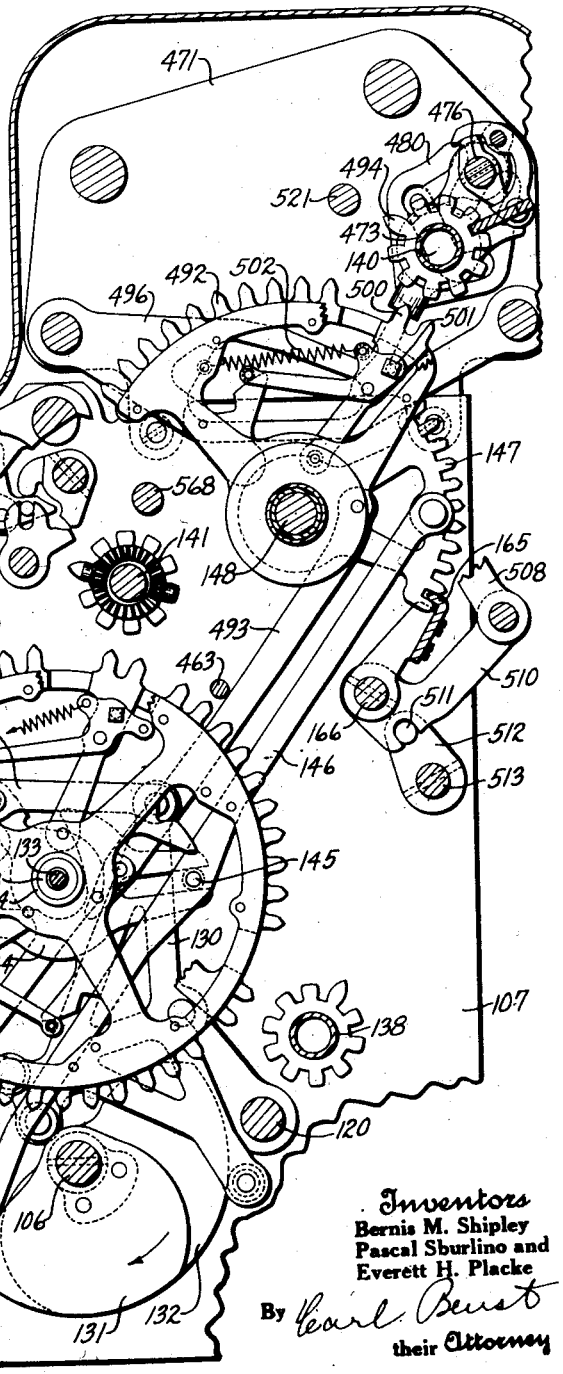
Fig. 3 is a cross section picturing an amount bank and its associated differential mechanism.

Calling attention to Figs. 1, 3, and 14, the machine as illustrated has nine amount banks 114, each containing nine amount keys 115. Each amount bank carries a zero stop lever 116, arranged to cooperate with the nose of a reset spider 117 loosely mounted on a hub 164 of a differential actuator 124 which in turn is pivoted on a hub 118 extending between two plates 119 (see also Fig. 7) supported by rods 120 extending between the main frames 104 and 107 of the machine. The spider 117 has a notch 121 (Fig. 14) which embraces a stud 122 in the nose of a latch arm 123 pivoted on a differential actuator 124. Shiftably mounted on the actuator 124 by means of the arm 123 and another arm 125 is a latch 126. The arm 125 has a foot 127 arranged to cooperate with a notch in a driving segment 128 connected by a link 129 (Fig. 3) to a cam lever 130 loosely mounted on a stud carried by one of the plates 119. The cam lever 130 cooperates with companion cams 131 and 132 secured on the shaft 106.

In add operations the shaft 106 makes one clockwise rotation thereby rocking the lever 130 and the segments 128 first clockwise as viewed in Fig. 3, then counterclockwise to their normal positions. There is a differential actuator unit like that explained above for each amount bank, and each differential unit is supported between two of the plates 119. The entire assembly of differential units are held together by means of a rod 133 extending through the hubs 118.

If no key is depressed in an amount bank the zero stop lever 116 engages the nose of the reset spider 117, drawing the foot 127 out of the notch in the segment 128 and forcing the nose of the latch 126 into one of a series of notches 134 in a plate 135 supported by one of the plates 119. This breaks the latch in the zero position. If one of the keys 115 is depressed in an amount bank the differential actuator 124 travels clockwise until the latch 126 engages the stem of the depressed key causing the latch to break in the proper position thereby differentially setting the actuator. After the foot 127 is forced out of the notch in the segment 128, the segment is free to continue its clockwise movement, an arcuate surface 136 (Fig. 14) thereon engaging the sole of the foot 127 to lock the actuator 124 in its set position. Return movement home of the segment 128 releases the latch 126 and returns it to its normal position.

Transaction keys

The machine of the instant invention has four totalizer lines, three lines of interspersed totalizers 138, 139, and 140, (Figs. 3 and 14) and an add-subtract or balance totalizer 141. The totalizer lines 138 and 139 each have nine sets of totalizer wheels, which are actuated by the differential actuators 124. The actuators 124 have three sets of teeth, one set for each of the totalizers 138 and 139 and a set for the add-subtract totalizer 141. The totalizer lines 138 and 139 are shiftable laterally in order that the desired set of totalizer wheels may be alined with the differential actuators 124. A row of keys 142 (Figs. 1 and 39) controls the selection of the totalizers on line 138 and a row of keys 143 controls the selection of the totalizer on line 139. The mechanism that shifts the totalizers laterally is old in the art and therefore will not be explained, but reference may be had to Patent No. 1,394,256 issued October 18, 1921, to F. L. Fuller, for a detailed description of this mechanism.

The add-subtract or balance totalizer 141 has two sets of wheels, a positive set and a negative set. The keys 142 in addition to selecting the totalizers on line 138 also select the positive side of the add-subtract totalizer for engagement with the differential actuators and the keys 143 likewise select the negative side of the balance totalizer for engagement with the differentials.

In add operations after the segments 128 have reached the end of their movement clockwise thereby setting the differential actuators 124 commensurate with the amount keys depressed, the selected set of totalizer wheels on one of the lines 138 or 139 (Fig. 3) and the proper side of the add-subtract totalizer are moved into engagement with the teeth on the differential actuators 124. The segments 128 then start their return movements picking up all the differential actuators 124 and returning them to their home positions. This rotates the wheels of the selected totalizer commensurate with the amount set up on the keyboard. The totalizers are then disengaged from the differential actuators 124. The differential actuators 124 have incorporated therein the usual transferring mechanisms for adding one to the next higher order wheel when the lower order wheel passes from 9 to zero. These transfer mechanisms are old and will not be further explained here, as reference may be had to the patents referred to hereinbefore for a complete description thereof.

Printer actuating mechanism

Calling attention to Fig. 3, pivoted on each differential actuator 124 is a beam 144 bifurcated to embrace a stud 145 in a link 146. The link 146 is pivoted at its upper end to a toothed segment 147 loosely mounted on a shaft 148 journaled in the main frames of the machine and is pivoted at its lower end to an arm of a gear segment 149 loose on a shaft 160. The segment 149 cooperates with a gear 161 secured on a shaft 162 which cooperates with the well known printer rack mechanism to position the printer wheels in a manner now to be described.

The Y-shaped cam lever 130 (Fig. 3) has a roller 163 on one of its arms which cooperates with an arcuate surface on the beam 144 to force the beam against the hub 164 on the actuator 124 after said segment has been differentially positioned as previously described. This through the link 146, positions the segments 147 and 149 commensurate with the position of the differential actuator 124, thereby properly positioning the associated printing wheel. After the segment 147 has been positioned, an aligning member 165 fast on a shaft 166 (Fig. 3) engages one of the tooth spaces therein to assist in accurately positioning the printing mechanism.

Cycle control mechanism

Calling attention to Fig. 2, in add operations the shaft 106 makes one revolution to operate the differential mechanism through one cycle of movement. In read and reset operations it is necessary that the differential mechanism operate through two cycles of movement. Therefore, it is necessary to rotate the shaft 106 two complete revolutions in such operations. This is accomplished by means of cycle control mechanism which controls the disengaging of the motor clutch in a manner now to be described.

Journaled between the main frames 104 and 107 is a key lock shaft 167 having secured on its right end an arm 168 carrying a stud 169 embraced by a slot in the upper end of a link 170 bifurcated on its lower end to receive a stud in a pitman 171, which is itself slotted to embrace the stud 103. The lower end of the pitman 171 is pivotally connected to an arm 172 journaled on a stud 173 carried by the frame 104. The arm 172 has an extension 174 connected by a link 175 to an arm 176 secured on a zero latch throwout shaft 177 (see also Fig. 16) extending through the machine and journaled in the main frames 104 and 107.

The link 170 has a stepped opening 178 which cooperates with a stud 179 in a cam arm 180 pivoted on the stud 173 (Fig. 2). The arm 180 carries a roller 181 which cooperates with a cam race 182 in the gear 102. The circular cam race 182 has one half of its contour a duplicate of the other half, each of said halves cooperating with the roller 181 near the end of each cycle of movement to rock the arm 180 first clockwise, then back to normal position. Retained in a slot in the link 170 by means of a projection is a spring 183 operatively connected to the arm 168 which spring is tensioned to urge the shaft 167 clockwise.

In Fig. 2 the cycle control mechanism is shown in its normal or adding position. Releasing the machine for an add operation by depressing the motor bar 108 frees the shaft 167 to the action of the spring 183 which forces the shaft clockwise until the arm 168 strikes a stop stud 184 secured in the frame 104. This movement of the shaft 167 engages the motor clutch and locks the amount keys in the well known manner.

As previously explained, the shaft 106 makes one revolution clockwise in add operations and the gear 102 makes one-half revolution counterclockwise. Just as the gear 102 is completing its movement of 180 degrees, the arm 180 is rocked clockwise and back, as previously explained, and as the stud 179 at this time engages the top step in the opening 178, the link 170 receives its maximum downward movement. This declutches the motor from the driving mechanism and releases the depressed keys in the usual manner.

In total taking operations, both read and reset, it is necessary that the shaft 106 make two clockwise rotations and the gear 102 one counterclockwise rotation. This is accomplished in the following manner. The pitman 171 carries a roll 185 normally retained in a notch in a cam 186 but adapted to cooperate at certain times with a cam race 187 in said cam 186. The cam 186 is rotatably supported by the stud 103 but during add operations is retained immovable by means of the roller 185 engaging the notch therein.

Figure 6:
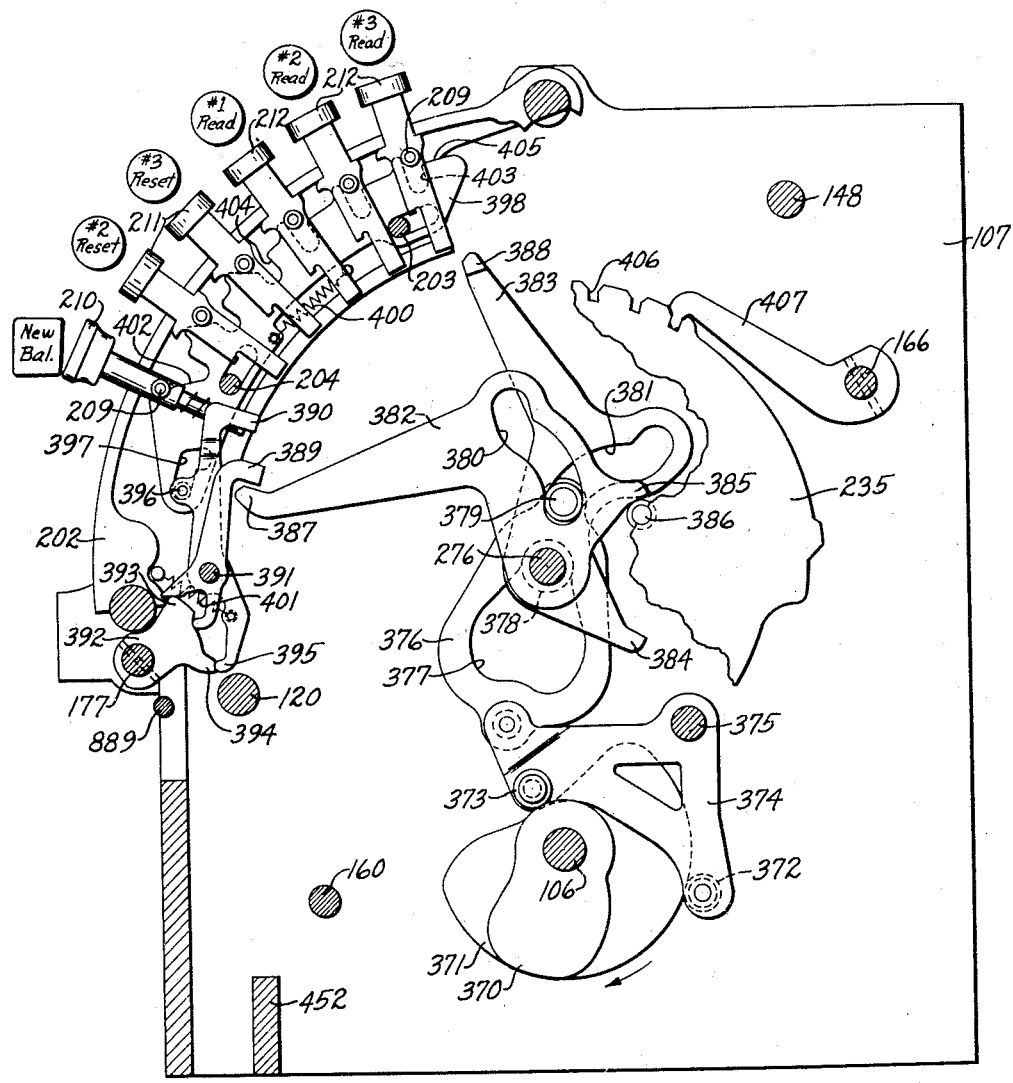
Fig. 6 is a cross section of the mechanism for positioning the total plate.

Loosely mounted on the shaft 167 (Figs. 2 and 16) is an arm 188, connected by a link 189 to the arm 172. The arm 188 has pivoted thereto a link 190 having a stud 191 which engages a slot in a plate 192 pivoted on a stud 193 secured in the frame 104. The link 190 has fast therein another stud 150 arranged to cooperate with a projection 151 on the arm 168. The plate 192 has another slot embracing a stud 194 in an arm 195 of a yoke 196 loose on a shaft 197 (see also Fig. 19). The yoke 196 is bifurcated to receive a stud 198 in a link 199 connecting the upper ends of key plates 200 and 201 mounted for slight radial movement on studs 203 and 204 carried by a total key frame 202 (Fig. 6).

A link 205 connects the lower ends of the plates 200 and 201 in exactly the same manner as the link 199 connects the upper ends. Each plate 200 and 201 has three sets of slots 206, 207 and 208 (Figs. 16 and 19) arranged to cooperate with studs 209 carried by a new balance key 210, total reset keys 211 and total read keys 212 (see also Fig. 6). These slots are so arranged that each plate 200 and 201 receives a varying degree of movement for each corresponding read and reset key depressed. However, the combined movement of both plates is always the same, and consequently the stud 198 moves the same distance regardless of which total key is depressed.

The arm 188 (Fig. 2) and connecting mechanism are retained in normal ineffective positions by a spring 213 tensioned between an extension of the arm 168 and one end of a lever 214 pivoted on a stud 215 secured in an auxiliary frame 216 supported by the frame 104. The lever 214 is connected by a link 217 to the arm 188. Thus the spring 213 retains the arm 188 in normal position against the stop stud 184 and at times when said arm and the shaft 167 are rotated in unison their action is compensated for by the link 217 so that no additional burden is placed upon the shaft 167.

Depression of any of the keys 210, 211 or 212, (Fig. 6) moves the plates 200 and 201 (Figs. 16 and 19) downwardly, thereby rocking the yoke 196 counterclockwise. This movement of the yoke 196 through the stud 194 rocks the plate 192 counterclockwise and the link 190 clockwise to move the stud 150 in the path of the projection 151 on the arm 168. The yoke 196 (Figs. 16 and 19) has an arm 218 with a surface which cooperates with a stud 219 in an arm of a yoke 220 loose on the shaft 167. The yoke 220 has an arm 221 (Fig. 17) bifurcated to receive a stud 222 in a release pawl 223 on the shaft 197 and adapted to cooperate with a release arm 224 secured on the shaft 167. A spring 225 is tensioned to hold the pawl 223 in the path of the arm 224.

Rocking the yoke 196 counterclockwise by depressing any of the total keys as explained above, causes the arm 218, through the stud 219, to rock the yoke 220 clockwise. This in turn rocks the pawl 223 counterclockwise to release the key lock shaft 167 to the action of the spring 183 (Fig. 2) as explained above. The clockwise releasing movement of the shaft 167 through the arm 168 rocks the arm 188 in unison therewith. This, through the link 189 and arm 172, gives the shaft 177 a slight movement clockwise and moves the pitman 171 forwardly causing the roller 185 to move into the raceway 187 in the cam 186 and couple said cam to the gear 102 in the well known manner. This movement of the pitman 171 also rocks the link 170 clockwise.

During rotation of the gear 102 and consequent rotation of the cam 186 in unison therewith, the raceway in said cam 186 cooperating with the roller 185 gives the pitman 171 and shaft 177 added movement thereby placing the link 170 in a position where the stud 179 is free to move idly in the long part of the opening 178 when the cam arm 180 is rocked by the raceway 182. This prevents restoring the key lock shaft 167 during the first cycle of operation, thereby allowing the machine to operate through another cycle near the end of which the cam 186 moves the pitman 171 and link 170 to a position where the stud 179 will again engage the horizontal section of the opening 178 when the arm 180 is moved downwardly which restores the key lock shaft 167 to normal position and releases the depressed transaction and total keys.

In total taking operations the amount differential actuators 124 remain stationary during the first cycle of operation due to the fact that the zero stop pawls 116 (Figs. 3 and 14) remain effective and break the latches in the zero position. Near the end of the first cycle of a total taking operation the clockwise movement of the zero latch throwout shaft 177 rocks the pawls 116 to ineffective positions by means of a rod 226 engaging a tail 227 on each pawl 116. The rod 226 is supported by a plurality of arms 228 secured on the throwout shaft 177. This frees the amount differential for movement during the second cycle of a total taking operation prior to which the wheels of the selected totalizer are engaged with the differential actuators 124, whereupon the latter rotate the totalizer wheels backward until long teeth thereon engage mechanism that breaks the latches in the well known manner. The latch breaking mechanism for total taking operations is normally ineffective but is rendered effective in total taking operations in a manner to be later described.

*Totalizer line selecting and engaging mechanism (add)*

The mechanism for engaging the totalizer wheels on the lines 138 and 139 (Fig. 3) with the actuators 124 in adding operations will now be briefly explained. Referring to Figs. 8, 9, 11 and 12, a total plate 235 (Fig. 11) has two slots 247 and 248 cooperating with rollers 249 and 250 on studs 251 and 252 carried by levers 260 and 261 (Fig. 9) pivoted on arms 262 and 263 journaled on studs carried by a control hanger 264 (Fig. 12). Again directing attention to Fig. 9 the levers 260 and 261 are slotted to embrace studs 265 and 266 secured in links 267 and 268 pivoted on arms 269 and 270 secured on a rear totalizer engaging shaft 277 and a front totalizer engaging shaft 278 respectively.

Figures 8, 65:
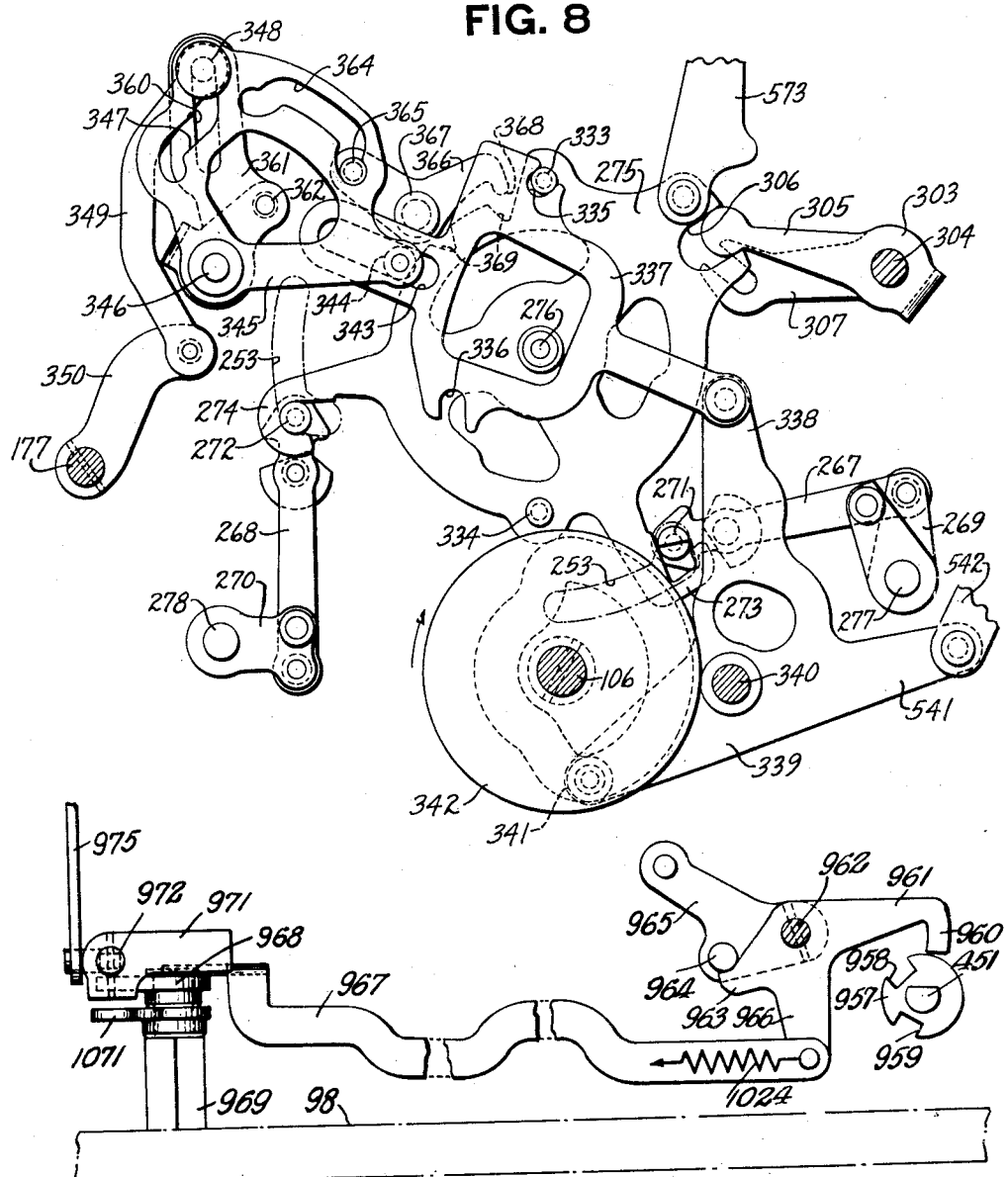
Fig. 8 is a side elevation showing the totalizer engaging mechanism.
Fig. 65 is a front elevation of the mechanism that automatically controls the line-spacing of the sliding table.
Figure 9:
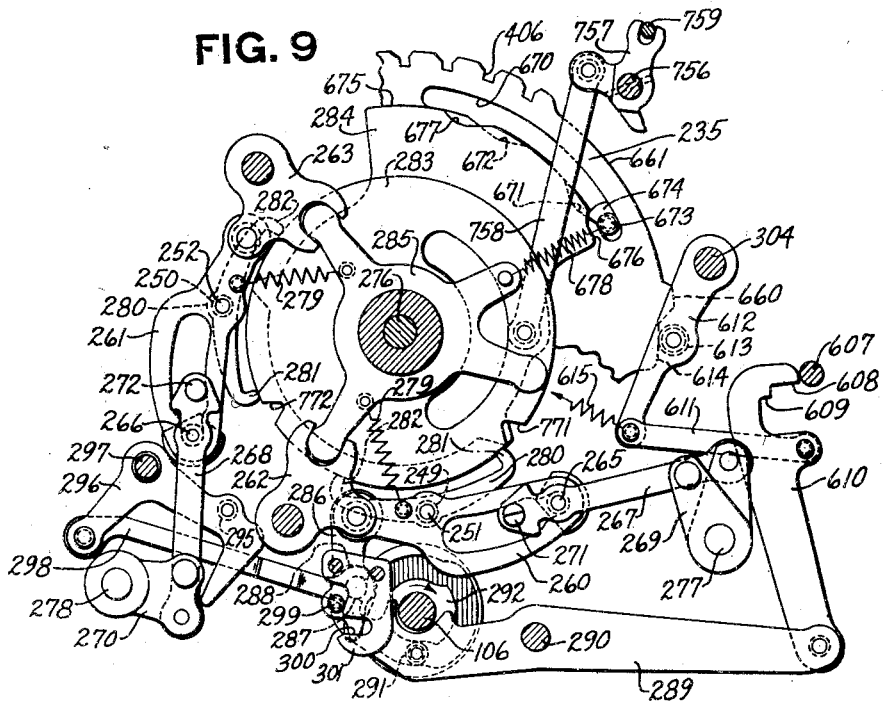
Fig. 9 is a sectional view of the totalizer control mechanism showing in detail the totalizer selecting means.

Calling attention to Figs. 8, 9 and 12, the links 267 and 268 carry respectively studs 271 and 272 arranged to cooperate with hooks 273 and 274 on an engaging spider 275 journaled on a stud 276 secured in the hanger 264. It will be noted that the stud 276 (Fig. 11) also rotatably supports the total plate 235. Pivoted on the studs 251 and 252 are feelers 280 with fingers 281 and 282 arranged to cooperate with low and high points on plates 283 and 284 loose on the stud 276. The arms 262 and 263 are bifurcated to embrace one arm each of a three-armed lever 285 rotatably mounted on the stud 276. Springs 279 are so tensioned between the levers 260 and 261 and the lever 285 as to normally hold the fingers of the feelers 280 in contact with the peripheries of the plates 283 and 284. Pivoted at the fulcrum point between the lever 260 and the arm 262 is a short link 286 carrying a stud 287 which cooperates with a hook 288 on a lever 289 turnably supported by a stud 290 in the frame 104. The lever 289 carries a roller 291 which cooperates with a raceway in a cam 292 fast on the shaft 106.

In adding operations the shaft 106 makes one revolution clockwise and the lever 289 is rocked first counterclockwise which through the link 286 rocks the arm 262 clockwise, and due to the lever 285 the movement of the arm 262 is transmitted to the arm 263, also rocking it clockwise. This causes the levers 260 and 261 to rock counterclockwise on the studs 251 and 252 thereby moving the studs 271 and 272 out of the hooks 273 and 274 (Fig. 8) until they fit into retaining notches of guide slots 253 in a stationary plate 293 (see also Fig. 12). This causes the levers 260 and 261 to then pivot on the studs 265 and 266 (Fig. 9), until the feeler fingers 281 and 282 are lifted clear of the plates 283 and 284 to relieve surface friction so that the plates may be easily positioned in a manner to be later described.

After the plates 283 and 284 are positioned, the cam 292 returns the lever 289 clockwise to its home position. If both the feeler fingers 281 and 282 contact high points of the plates 283 and 284 the studs 271 and 272 of the selected totalizer lines will again be engaged with their respective hooks on the spider 275 (Fig. 8). If either of the feeler fingers 281 or 282 engages a low spot on either of the plates 283 or 284 upon return movement of the lever 289, the lever 260 or 261, as the case may be, pivots on the stud 265 or 266 allowing the stud 271 or 272 to remain disengaged from the spider 275.

From the foregoing description it will be seen that in adding operations the front and rear totalizer lines 138 and 139 are selected for engagement with the differential actuators 124 under control of the plates 283 and 284. If a more detailed description of this selecting mechanism is desired, reference may be had to United States Patent No. 1,749,960, issued March 11, 1930, to B. M. Shipley.

*Totalizer line selecting and engaging mechanism (read and reset)*

In read and reset operations the front and rear totalizer lines 138 and 139 (Figs. 3, 9 and 11) are independently selected for engagement with the differential actuators in the usual manner by means of the slots 247 and 248 in the total plate 235, cooperating with the rollers 249 and 250. In order that the read and reset selecting mechanism may function properly it is necessary to disengage the add selecting mechanism and this is accomplished by means of a slot 294 in the total plate 235, arranged to coact with a roller 295 on a lever 296 pivoted on a stud 297 secured in the hanger plate 264. A link 298 connects the lever 296 and the link 286. The link 286 has a stud 299 arranged to cooperate with a slot 300 in a plate 301 fast to the stationary plate 293.

Initial movement of the cam 292 which rocks the arms 262 and 263 clockwise as explained hereinbefore to disengage the studs 271 and 272 from the hooks 273 and 274, also alines the stud 299 with the slot 300 in the plate 301. The total plate 235 is then automatically positioned for a total taking operation in a manner to be later described. When the total plate 235 is moved away from adding position, in which position it is here shown, the slot 294 coacting with the roller 295 (Fig. 9) rocks the lever 296 counterclockwise, which through the link 298 forces the link 286 counterclockwise, thereby disengaging the stud 287 from the hook 288 and moving the stud 299 into the slot 300. This latches the add selecting mechanism in ineffective position. The slot 247 or 248 as the case may be in the total plate 235 (Fig. 11) cooperating with the roller 249 or 250 rocks the arm 260 or 261 clockwise to engage the stud 271 or 272 with the hook 273 or 274 of the spider 275 to select the proper totalizer line 138 or 139 for engagement with the differential actuators 124.

*Reset shaft operating mechanism*

The engaging spider 275 (Figs. 8, 10 and 11) is operatively connected to a reset shaft operating plate 302 by means of a yoke 303 loose on a stud 304 secured in the frame 104. The yoke 303 has one arm 305 with a rounded end which is embraced by a slot 306 in the plate 275 and another arm 307 bifurcated to receive a stud 308 in an extension 309 of the plate 302. Therefore, whatever movement the spider 275 receives is transmitted to the plate 302 by means of the yoke 303. The plate 302 has cut in the periphery thereof slots 310 and 311, arranged to cooperate respectively with the studs 240 and 241 in the links 243 and 244.

Reset shafts 231 and 232 for totalizer lines 138 and 139 are controlled in the usual way by means of slots 233 and 234 in the total plate 235 cooperating with rollers 236 and 237 on arms 238 and 239 pivoted on the control hanger 264. The arms 238 and 239 are bifurcated to embrace respectively studs 240 and 241 carried by links 243 and 244 pivoted on arms 245 and 246 secured respectively to the shafts 231 and 232. When the totalizer plate 235 is moved to a position where the rear totalizer line 138 is selected for a totalizing operation, the slot 233 cooperating with the roller 236 rocks the arm 238 clockwise engaging the stud 240 with the notch 310 in the plate 302. Subsequent movement of the spider 275 and the plate 302 through the link 243 rocks the reset shaft 231, which in turn renders effective the mechanism which breaks the latches of the amount differentials in total taking operations. The reset shaft 232 for the front totalizer line 139 is operated in exactly the same manner as described above for the reset shaft 231.

*Balance totalizer reset mechanism*

Figure 10:
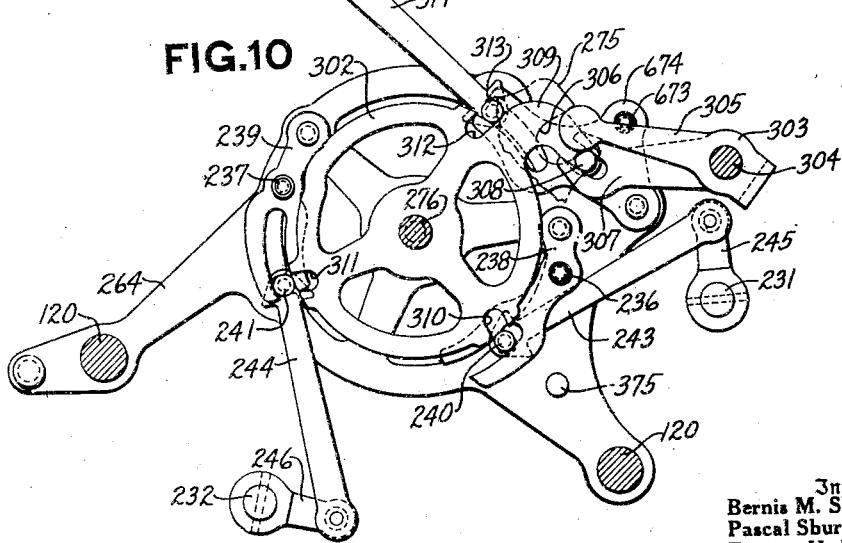
Fig. 10 is a side view showing the totalizer reset shaft mechanism.

Again directing attention to Fig. 10, the plate 302 has therein a notch 312 which cooperates with a stud 313 in a link 314 pivoted on an arm 315 secured to an add-subtract reset shaft 316. The shaft 316 is rocked by the plate 302 in exactly the same manner as the reset shafts 231 and 232. However, the method of engaging the stud 313 with the notch 312 is different from that used in engaging the studs 240 and 241 with the notches 310 and 311. This engaging mechanism is closely related to and therefore will be described in conjunction with the auxiliary totalizer later in this specification.

Referring to Fig. 14 the shaft 316 has secured thereon a partial gear 317 which meshes with a segment 318 pivoted on a stud 319 secured in the hanger 119. The lower end of the segment 318 is bifurcated to embrace a stud 320 pivotally connecting links 321 and 322. The upper end of the link 321 is connected to a lever 323 loosely mounted on the stud 319 while the lower end of the link 322 is loosely connected to a lever 324 pivoted at 325 to a hanger 119. Pivoted on the lever 324 is a pawl 326 having a light-angled extension 327 adapted to cooperate with one of three sets of teeth 328, carried by the reset spider 117. A spring 329 is tensioned to hold the pawl 326 against a stop stud 330 and simultaneously urges the lever 324 counterclockwise against a stop stud 331 carried by the hanger 119.

Initial movement counterclockwise of the shaft 316 through the segment 318 rocks the lever 323 into the path of a long tooth 332 on the selected set (positive or negative) of totalizer wheels on the add-substract totalizer line 141. As previously stated, a total-taking operation consists of two cycles of machine operation. During the first cycle of operation the selected set of totalizer wheels are engaged with the differential actuators 124 (Fig. 3) which remain at zero, due to the differential latches being broken in the zero position by the zero stop levers 116. During the second cycle of operation the zero stop levers 116 are moved to ineffective positions as previously explained, allowing the differential actuators to rotate first clockwise, thereby rotating the totalizer wheels counterclockwise, which is the reverse of rotation in add operations. As a totalizer wheel approaches its zero position the long tooth 332 (Fig. 14) thereon engages and rocks the lever 323 counterclockwise to rock the lever 324 clockwise, causing the extension 327 of the pawl 326 to engage one of the teeth 328 thereby arresting movement of the reset spider 117, which breaks the associated differential latch commensurate with the amount on the totalizer wheel. In reset operations the totalizer wheels are disengaged from the differential actuators after said wheels have been turned back to zero and in read operations the totalizer wheels remain in mesh with the actuators until said actuators complete their return movements counterclockwise so that the amounts read may be replaced in the totalizers.

*Totalizer engaging operating mechanism (add)*

Directing attention to Fig. 8, the spider 275 is rocked first clockwise and then counter clockwise to engage and disengage the selected totalizer line with the differential actuators. The time of the movement of the spider 275 during a machine operation varies to meet the requirements of the different kinds of operations, add, read or reset. This mechanism is old in the art; therefore a brief description is deemed sufficient.

Fast in the plate 275 are studs 333 and 334 arranged to cooperate respectively with notches 335 and 336 in a link 337, the rear end of which is pivoted to an arm 338 of a three-armed lever 339 journaled on a stud 340 carried by the frame 104. Another arm of the lever 339 carries a roller 341 which engages a raceway in a cam 342 secured to the main cam shaft 106. The forward end of the link 337 has a slot 343 which embraces a stud 344 carried by a lever 345 loosely mounted on a stud 346 secured in the frame 104. The lever 345 has a slot 347 through which extends a stud 348 carried by a link 349 pivoted to an arm 350 secured on the shaft 177. The stud 348 also extends through a slot 360 in a yoke 361 loosely mounted on the stud 346. The yoke 361 carries a roller 362 which cooperates with a slot 363 (Fig. 11) in the total plate 235. Again referring to Fig. 8, the lever 345 has therein another slot 364 which cooperates with a roller 365 carried by an alining pawl 366 pivoted at 367 to the plate 293, shown only in Fig. 12. The pawl 366 has a rounded nose 368 which cooperates with two notches 369 in the spider 275 to secure said spider in its normal position or in its moved position during read and reset operations.

In adding operations the cam 342 makes one complete revolution rocking the arm 339 first clockwise and then back to its normal position. This oscillates the link 337 back and forth, the stud 344 in conjunction with the slot 343 positioning and guiding the link 337 in a manner now to be described. In adding operations the zero latch throwout shaft 177 and the yoke 361 receive no movement. Consequently the lever 345 remains in the position shown in Fig. 8, retaining the notch 335 in engagement with the stud 333 and guiding the movement of said link so that the spider 275 is rocked first clockwise and then back to normal position. The cam 342 times the movement of the spider 275 so that its initial movement engages the selected totalizer on the selected totalizer line with the amount differential actuators 124 just after said actuators have completed their initial movement and have been properly positioned by the depressed amount keys 115. Return movement of the spider 275 disengages the totalizer from the differential actuators after said actuators have completed their return movement, which in adding operations is the movement that actuates the wheels of the selected totalizer.

*Totalizer engaging operating mechanism (read and reset)*

In read and reset operations the cam 342 (Fig. 8) makes two complete clockwise revolutions. Consequently the link 337 receives two identical oscillating movements back and forth. In reading operations the yoke 361 is retained in the position in which it is shown in Fig. 8, which is the same as its adding position. The slight initial movement clockwise of the shaft 177 (see description of cycle control mechanism) and the arm 350 through the link 349 moves the stud 348 downwardly to the point where the slot 360 in the yoke 361 and the slot 347 in the lever 345 diverge. Consequently the link 337 will be retained in the position shown and the spider 275 will receive its initial engaging movement clockwise the same as in adding operations. Soon after this the shaft 177 receives its final clockwise movement, causing the stud 348 guided by the slot 360 to complete its downward movement. This through the slot 347 rocks the lever 345 clockwise to move the link 337 to an intermediate position where neither of the studs 333 or 334 are engaged by the notches 335 or 336. This clockwise movement of the lever 345 through the slot 364 rocks the pawl 366 clockwise, causing the nose 368 to engage one of the notches 369 to retain the spider 275 in its moved position while the link 337 is disengaged therefrom. After the selected totalizer has been read and the amount reentered thereon the shaft 177 receives sufficient return movement counter clockwise to reengage the notch 335 in the link 337 with the stud 333. Final movement counter clockwise of the lever 339 rocks the spider 275 back to its home position thereby disengaging the selected totalizer from the differential actuators.

In resetting operations the cam 342 makes two clockwise revolutions, the same as in read operations. When the total plate 235 (Fig. 11) moves to any one of its three resetting positions the slot 363 cooperating with the roller 362 rocks the yoke 361 (Fig. 8) clockwise. This through the stud 348 rocks the lever 345 clockwise to disengage the notch 335 in the link 337 from the stud 333. Initial movement clockwise of the lever 339 moves the link 337 to a position where the notch 336 is alined with the stud 334 in the spider 275. Immediately following this the shaft 177 receives its final clockwise movement, which gives the lever 345 additional clockwise movement thereby causing the notch 336 to engage the stud 334. The initial movement of the lever 345 in reset operations through the slot 364 cooperating with the roller 365 causes the pawl 366 to engage one of the notches 369 to retain the spider 275 in its home position while the link 337 is being shifted. The final movement of the lever 345 which couples the link 337 to the stud 334 disengages the pawl 366 from the notch 369.

The first return movement counterclockwise of the lever 339 rocks the spider 275 clockwise to engage the selected totalizer with the amount differential actuators. After the selected totalizer has been reset to zero the lever 339 receives its second and final clockwise movement to return the spider 275 counterclockwise to its home position, thereby disengaging the selected totalizer from the differential actuators. Before the lever 339 makes its final movement counterclockwise the shaft 177 and the arm 350 are returned counterclockwise to move the link 337 to its ineffective position and reengage the pawl 366 with one of the notches 369.

As previously explained, the plate 302 (Fig. 10) moves in unison with the spider 275, due to its connection thereto, by means of the yoke 303. This causes the reset shafts 231, 232 or 316 of the selected totalizer to be moved to effective position when said totalizer is moved into engagement with the differential actuators and causes the reset shaft to be returned to ineffective position when the selected totalizer is being disengaged from the actuators.

*Total plate control mechanism*

In former machines of this type the total plate was moved from one position to another by manipulative means. However, in the instant machine the total plate is automatically moved to the desired position. The mechanism for accomplishing this result will now be described.

Figure 11:
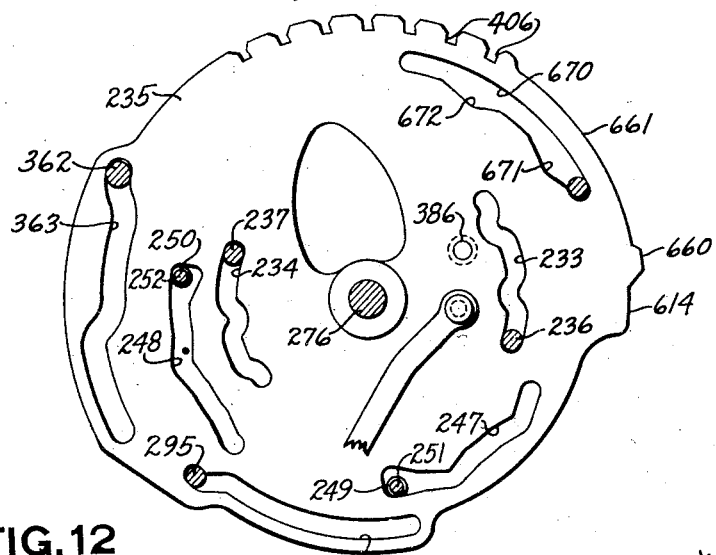
Fig. 11 is a detail of the total plate.
Figure 12:
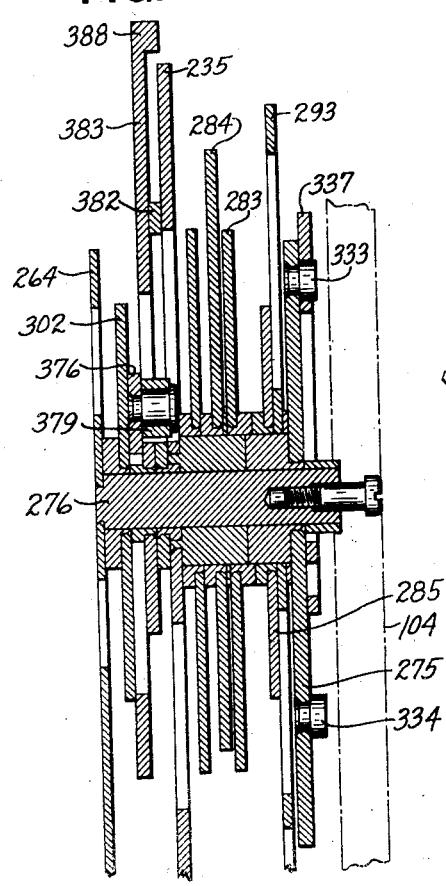
Fig. 12 is a cross section of the totalizer control mechanism.

Calling attention to Figs. 6, 11 and 12, secured on the shaft 106 are companion cams 370 and 371, adapted to cooperate with rollers 372 and 373 carried by a lever 374 journaled on a stud 375 secured in the plate 264 (see also Fig. 10). Loosely mounted on the lever 374 is a link 376 having a heart-shaped opening 377, the point of which co-operates with a hub 378 loose on the shaft 276. The link 376 carries an anti-friction roller 379 which extends through slots 380 and 381 in levers 382 and 383 rotatably supported by the stud 276. The levers 382 and 383 have extensions 384 and 385 which cooperate with a stud 386 fast in the total plate 235. The extreme upper ends of the levers 382 and 383 have tips 387 and 388 arranged to cooperate with an add pawl 389 and a first reset pawl 390 and the lower ends of the total keys 211 and 212. The pawls 389 and 390 are pivoted on a stud 391 fast in the total key frame 202. Fast on the shaft 177 is a cam 392 having a node 393 which coacts with the bifurcated end of the pawl 389 to hold said pawl in the path of the tips 387 and 388 of the levers 382 and 383 during adding operations.

When the throwout shaft 177 is rocked clockwise in read and reset operations, as explained hereinbefore, the cam 392 rocks the pawl 389 counter clockwise out of the path of the levers 382 and 383. It will be recalled that the throwout shaft 177 receives no movement in add operations. The cam 392 has another node 394 which cooperates with a projection 395 on the pawl 390. The pawl 390 has fast therein a stud 396 which extends within a slot 397 in a key plate 398 mounted for slight rocking movement on the studs 203 and 204. A spring 400 is tensioned to urge the plate 398 clockwise, while another spring 401 is tensioned to rock the pawl 390 in a clockwise direction. The plate 398 has an angular camming surface 402 which cooperates with the stud 209 in the new balance key 210. Depression of the key 210 moves the plate 398 counter clockwise to a position where the stud 396 is opposite a recess in the slot 397 so that the pawl 390 is free to move clockwise under tension of the spring 401 into the path of the levers 382 and 383 but is restrained from doing so by the node 394 on the cam 392 cooperating with the projection 395 until the throwout shaft 177 makes its initial clockwise movement.

Depression of any one of the keys 212 forces its stud 209 into the associated notch 403 in the plate 398 to lock said plate against movement, thereby preventing depression of the keys 210 and the keys 211. Depression of either of the keys 211 causes the stud 209 thereon to cooperate with one of two camming notches 404 in the plate 398 to rock said plate a slight distance counter clockwise thereby forcing an upper surface of the plate 398 under the studs 209 in the keys 212 to lock said keys against depression. The rocking movement given to the plate 398 by depression of the keys 211 is not sufficient to place the offset in the slot 397 opposite the stud 396. Therefore, the pawl 390 remains locked in ineffective position.

Figure 39:
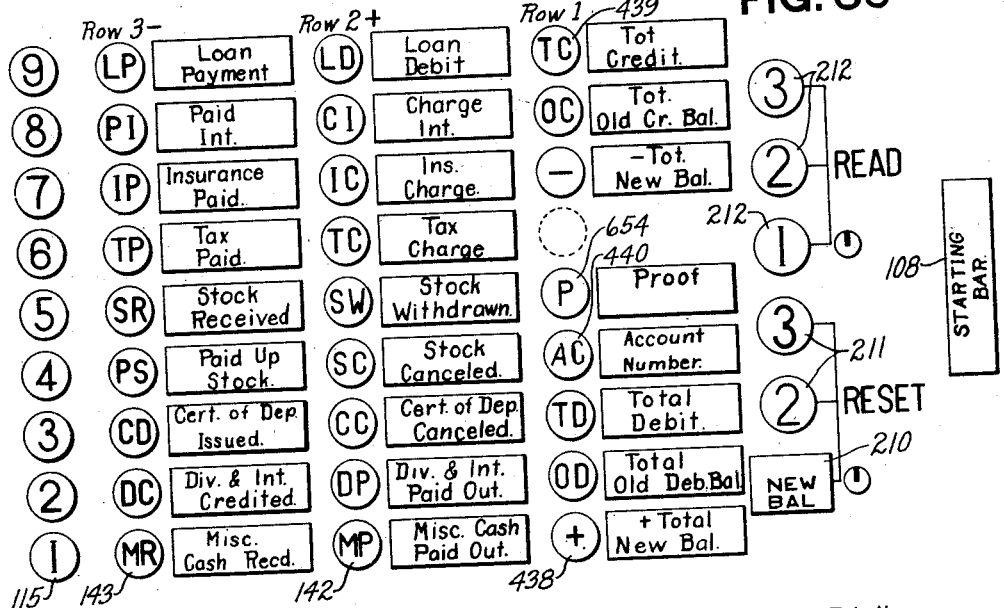
Fig. 39 is a diagrammatic view showing the keys of one amount bank, the keys of the three transaction banks, the total plate control keys and the starting bar of the instant machine.

The total plate 235 has seven positions, including an adding or home position, three reset positions and three read positions (see diagrammatic view of the keyboard Fig. 39). A series of notches 406 corresponding to the different positions of said total plate 235 cooperate with an alining pawl 407 secured to the shaft 166. Soon after the machine is released for operation the pawl 407 (see chart Fig. 38) is disengaged from the plate 235 and remains thus disengaged until the plate is positioned, after which the pawl is reengaged with one of the notches 406 and remains thus engaged until the beginning of the next operation.

While the shaft 106 makes its rotation clockwise during operation of the machine, the cams 370 and 371 rock the lever 374 first clockwise and then counter clockwise to normal position, thereby moving the link 376 first upward, then back to the position shown in Fig. 6. As the link 376 makes its initial movement upward the roller 379 cooperating with the slots 380 and 381 in the levers 382 and 383 force the tips of said levers and the projections 384 and 385 together in what is known as a scissors movement. This locates the total plate 235 commensurate with the total key depressed. With the parts in the positions shown in Fig. 6 the link 376 in its upward movement would first force the lever 383 counter clockwise toward the lever 382 due to the fact that the lever 382 is held stationary by the pawl 389, thereby causing the slot 380 to guide the roller 379. Return movement downward of the link 376 always returns the levers 382 and 383 to the position shown in Fig. 6. This is due to the fact that the link 376 is located in its home position by means of the slot 377 cooperating with the hub 378.

As another example, let us assume that the No. 3 read key 212 is depressed. As this is a total taking operation initial movement of the throwout shaft 177 rocks the add pawl 389 to an ineffective position. Initial movement upward of the link 376 causes the lever 383 to rotate counter clockwise until the tips 388 engage the stem of the depressed key. The slot 381 then serves as a guide for the roller 379 which coacting with the slot 380 forces the lever 382 clockwise until the tip 387 thereof engages the stem of the depressed key. During this clockwise movement of the lever 382 the projection 385 cooperating with the stud 386 in the total plate 235 forces the total plate clockwise until the stud 386 is embraced or held snugly between the projections 384 and 385 thereby positioning said total plate 235 in accordance with the key depressed. The total plate 235 is not returned to its home position after each operation but remains in the position to which it was moved until the beginning of the succeeding operation.

From what has been said it will be seen that the levers 382 and 383 move complementary to each other and in this case their combined movement always equals six steps.

Add-subtract totalizer

Figure 7:
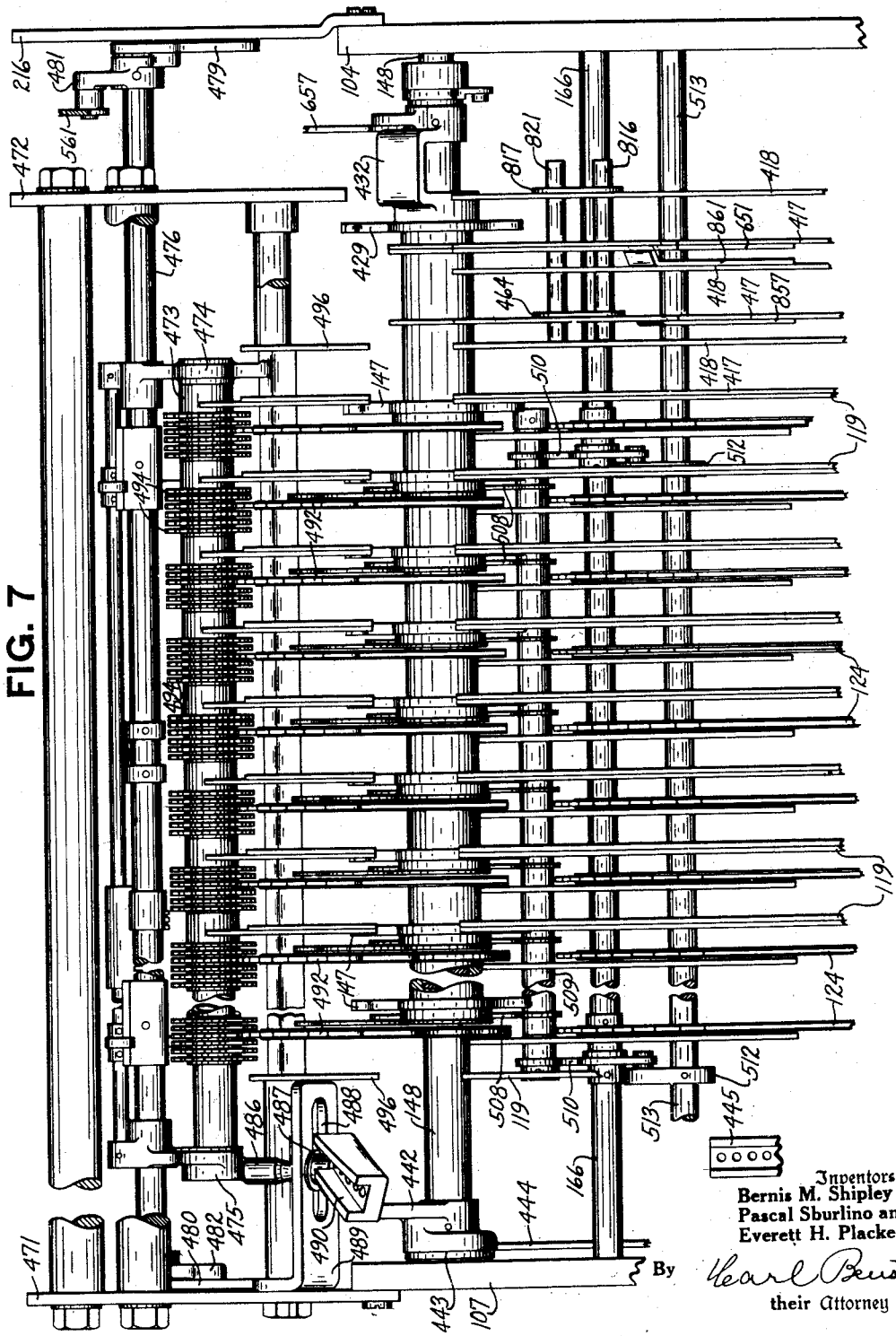
Fig. 7 is a top plan view of the auxiliary totalizer and its differential mechanism.

The add-subtract totalizer embodied in this machine is similar to that used in previous machines of this type. There is an adding wheel and a subtracting wheel for each denominational unit (Figs. 3 and 4) corresponding wheels of each denominational unit being geared together in the well-known manner so that they revolve in opposite directions. These sets of add-subtract totalizer wheels are loosely mounted on the shaft 141 which is in turn secured in a slidable frame (not shown) controlled for engagement with the differential actuators 124 in a manner to be later described in connection with the auxiliary totalizer. The add-subtract totalizer is selected for addition or subtraction by shifting the shaft 141 so that the desired set of wheels are alined with the differential actuators 124. This is accomplished by means of the first transaction bank latch plate 410 (Figs. 5, 21 and 23) which operates similarly to the reset spider 117 (Fig. 14) of the amount bank and through an arm 411 controls the breaking of a first transaction latch 412. The latch 412 is pivoted to an arm 413 by means of the arm 411 and a link 414 and has a foot which cooperates with a notch in a driving segment 415 pivoted on a hub 416 extending between plates 417 and 418 supported by the rods 120. Substantially all the mechanism of the first transaction bank is mounted between the plates 417 and 418 (Fig. 7). A link 419 connects the driving segment 415 to a cam arm 420 pivoted on a stud 421 carried by the plate 417. The lever 420 carries rollers 422 and 423 which cooperate with companion cams 424 and 425 secured to the shaft 106. The arm 413 is turnably mounted on the hub 416 and has pivoted thereto a beam 426 bifurcated to embrace a stud 427 in a link 428 extending between an alining segment 429 and an arm 430 of a printer drive segment 431 journaled on the shaft 160. The alining segment 429 is secured to a yoke 432 fast to the shaft 148. The alining segment 429 has a plurality of teeth 433 which cooperate with the alining bar 165 secured to the shaft 166.

Again directing attention to Fig. 5, the beam 426 has an arcuate surface 435 which cooperates with a roller 436 carried by the arm 420. A first transaction bank 437 has therein keys 438, 439 and 440. Depressing any of these keys places the lower end of the stem thereof in the path of the arm 411 to break the latch 412 and differentially position the latch plate 410 and arm 413 commensurate with the depressed key. There is also automatic means, to be explained later, for breaking the latch 412 in its zero, third, fifth and sixth positions. Unlike the other banks of the machine the first transaction bank has no zero stop pawl for breaking the latch 412 in its zero position. Consequently when none of the keys in this bank are depressed and the automatic latch-breaking mechanism is ineffective, the latch plate 410 and arm 413 travel to the ninth position where the latch is automatically broken by means of a stud carried by the first transaction bank frame engaging the end of the latch plate 410. After the plate 413 has been differentially positioned by one of the means previously described the roller 436 engages the arcuate surface 435 of the beam 426 forcing said beam against a hub 441 to differentially position the segments 429 and 431 and the shaft 148 commensurate with the position of the arm 413. The segment 431 is geared to a pinion 450 fast on a shaft 451 journaled between a pinion frame 452 and a front printer frame 453 (see also Fig. 60). The shaft 451 drives a rack (not shown) which positions the printing wheels for the first transaction bank 437 and also controls the automatic line spacing mechanism to be later described.

Secured to the left end of the shaft 148, and consequently rotated in unison therewith, (Figs. 7 and 40) is an auxiliary totalizer shifting cam 442 having an arm 443 connected by a link 444 to an add-subtract totalizer shifting cam 445, pivoted on a stud not shown, carried by the left frame 107. The stud that supports the shifting cam 445 is on the same center as the differential actuators 124. The cam 445 moves in correlation to the movement of cam 442 due to its connection thereto, and as the cam 442 is positioned by the latch mechanism of the first transaction bank the cam 445 is likewise positioned according to the location of said first transaction bank latch mechanism. By referring to Fig. 40 it will be seen that both the cams 442 and 445 have ten positions. The four upper positions of the cam 445 position the add-subtract totalizer frame to the right (as viewed in Fig. 7, or to the left as viewed in Fig. 40), thereby alining the plus set of totalizer wheels with the actuators 124. The four lower positions of the cam 445 position the add-subtract totalizer frame to the left (Fig. 7) to aline the negative set of totalizer wheels with the actuators. The cam 445 has two neutral positions which position both the positive and negative sets of totalizer wheels out of alinement with the differential actuators 124.

From the foregoing description it will be seen that when the latch 412 (Fig. 5) is broken in the zero, first, second or third positions the negative side of the add-subtract totalizer will be selected for engagement with the actuators. and when the latch 412 is broken in the 6th, 7th, 8th or 9th positions the positive side of the add-subtract totalizer will be selected for engagement with the differential actuators 124 and when the latch 412 is broken in the fourth or fifth positions neither set of totalizer wheels will be selected for engagement with the differentials.

As previously stated, the mechanism which shifts the totalizer lines 138, 139 and 141 laterally has been neither illustrated nor described in detail herein, as reference may be had to the Fuller Patent No. 1,394,256 for a complete description of this mechanism.

The means for engaging the add-subtract totalizer with the differential actuator 124 is so closely allied to the engaging mechanism for the auxiliary totalizer that it is deemed advisable to describe these mechanisms together in the description of the auxiliary totalizer following. The same is true of the reset shaft 316 (Fig. 10) for the add-subtract totalizer.

Overdraft mechanism

As each plus wheel of the add-subtract totalizer is geared to its corresponding subtract wheel it can easily be seen that corresponding add and subtract wheels are always complementary to each other. These wheels are arranged in complements of nine for reasons well known in the art and consequently when an overdraft occurs, in order to make the totalizer read correctly it is necessary to add a digit called the fugitive "one" to the units of cents wheel. The same is true when the add-subtract totalizer changes from an overdrawn to a positive condition. Therefore, every time the positive or negative side of the totalizer passes through zero the fugitive "one" is added to the units of cents wheel.

Figure 4:
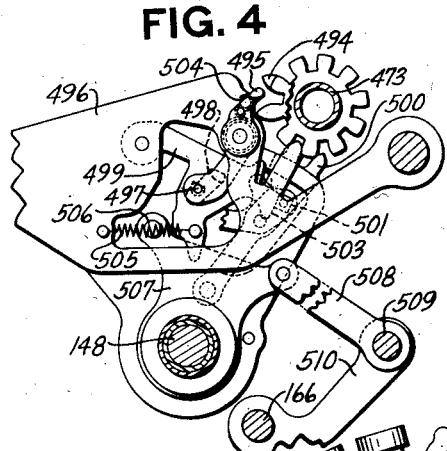
Fig. 4 is a detail view of the transfer mechanism for the auxiliary totalizer.
Figure 24:
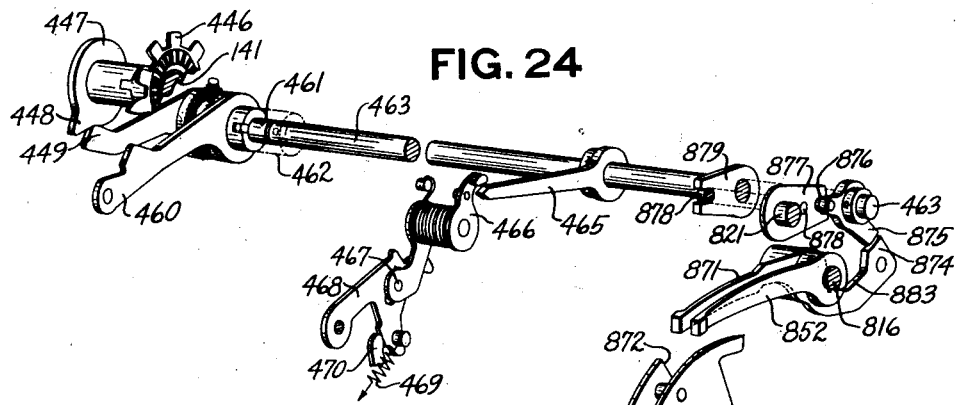
Fig. 24 is a perspective view showing the overdraft control mechanism and the means for controlling the automatic latch-breaking mechanism by said overdraft control mechanism.

Calling attention to Fig. 24, a highest order adding wheel 446 is connected to drive a control disk 447 having a tripping tooth 448 adapted to cooperate with tripping levers 449 and 460 loose on a stud 461 secured in the left frame 107. The levers 449 and 460 are geared together for complementary movement in the same manner as the add-subtract totalizer wheels, that is, when the lever 449 is rocked counter clockwise the lever 460 moves the same distance clockwise. The lever 460 drives a collar 462 journaled on the stud 461 and secured to an overdraft shaft 463 the right end of which is journaled in a plate 464 (Fig. 5) carried by the hanger plate 418. Secured on the shaft 463 (Fig. 24) is a tripping pawl 465, the end of which moving in either direction, rocks a transfer arm 466 having a stud 467 which cooperates with a stepped opening in a transfer lever 468, which controls a transfer segment for the positive and negative units of cents totalizer wheels. The transfer arm 466, and transfer lever 468, are constructed and operate in a manner identical with the well-known transfer mechanism usually provided in machines of the class described herein, and as shown herein in Fig. 4, in connection with the amount bank differentials of denominational orders higher than the units order. In Fig. 4, the elements 495 and 499 correspond to elements 466 and 468, respectively, of Fig. 24.

As shown in Fig. 24 the add-subtract totalizer frame has been shifted to aline the negative set of totalizer wheels with the actuators 124. In subtracting operations the differential actuators rotate the negative totalizer wheels clockwise as viewed from the right, which in turn causes the positive set of totalizer wheels to be rotated counter clockwise commensurate with the negative set of wheels. When the highest order adding wheel 446 passes through zero, which in this case would indicate that the totalizer has changed from a positive to a negative condition, the tripping tooth 448 engages the lever 449 rocking it counter clockwise to rotate the lever 460 and the shaft 463 clockwise. This causes the lever 465 to engage and rock the arm 466 counter clockwise to release the transfer lever 468 to the action of a spring 469. The spring 469 rocks the lever 468 clockwise, which in turn causes the transfer segment to add one to the units of cents wheel on the negative side of the totalizer. At the beginning of each machine operation the lever 468 and the arm 466 are restored to their normal positions by a restoring spider 470 which operates the same as the regular transfer restoring spiders.

When the positive wheels of the add-subtract totalizer are alined with the differential actuators 124 the tripping tooth 448 of the disk 447 is moved into operative alinement with the tripping lever 460. Consequently when the highest order adding wheel 446 is rotated clockwise through zero, thereby indicating that the total has changed from a negative to a positive condition, the tripping tooth 448 rocks the lever 460, the shaft 463 and the tripping arm 465 counter clockwise. It will be recalled that when the add-subtract totalizer changes from a positive to a negative condition the shaft 463 and arm 465 are rocked clockwise. This places the end of the lever 465 above the arm 466. The lever 460, the shaft 463 and the arm 465 remain in this position until the totalizer changes from a negative to a positive condition. This, as previously explained, causes the arm 465 to be rocked counter clockwise, which in turn releases the lever 468 and causes "one" to be added on the positive units of cents wheel.

Overdraft mechanism which operates similar to this has been used on previous bookkeeping machines of this type. Therefore, a more detailed description is deemed unnecessary. As a reference, the United States Patent No. 1,791,907 issued February 10, 1931, to B. M. Shipley, is suggested.

*Auxiliary totalizer mechanism*

Directing attention to Figs. 3, 4 and 7, the auxiliary totalizer mechanism is supported between the plate 216 and a left auxiliary plate 471 secured to the left frame 107. The plate 216 supports an intermediate plate 472 which also assists in supporting the auxiliary totalizer mechanism. The auxiliary totalizer 140 is similar in construction to the front and rear totalizers 138 and 139 and has six sets of interspersed totalizer wheels rotatably mounted on a tube 473 secured in arms 474 and 475, loose on an engaging shaft 476, the ends of which are supported in slots 477 and 478 (see also Fig. 29) in plates 479 and 480 secured respectively to the plates 216 and 471. Secured on opposite ends of the shaft 476 are arms 481 and 482 carrying respectively anti-friction rollers 483 and 484 which extend within duplicate cam slots 485 of the plates 479 and 480. The arm 475 (Fig. 7) carries a pin 486 upon which is journaled a flanged roller 487, the upper end of which is embraced by a lateral slot 488 in a bracket 489 secured to the plate 471. The lower end of the roller 487 extends within a slot 490 in the auxiliary shifting cam 442 see also Fig. 40. Movement of the cam 442 shifts the auxiliary totalizer laterally to aline the selected set of totalizer wheels with a plurality of differential actuator segments 492. The auxiliary totalizer line is guided in its lateral movement by the slot 488 in the bracket 489 and by the shaft 476.

The instant machine is equipped with nine amount banks and one overflow bank. Consequently there are ten of the differential actuators 124 (Fig. 3) and ten corresponding auxiliary actuator segments 492. Each of the segments 492 is rotatably supported by the shaft 148 in vertical alinement with its corresponding actuator 124. Corresponding actuators 124 and segments 492 are connected for concert movement by a link 493. Consequently, the differential movement of the actuators 124 which are controlled in adding operations by the amount keys 113 is transmitted to the corresponding auxiliary actuator segments 492.

The transfer mechanism for the auxiliary totalizer is similar to that used with the other three totalizer lines. Each of the auxiliary totalizer wheels has a long tooth 494 (Figs. 3 and 4) corresponding to its zero position. Each denominational unit except the lowest order has a transfer arm 495 pivotally supported by a plate 436. The arm 495 has fast therein a flattened stud 497 which cooperates with a step in a notch 498 in a transfer lever 499 pivoted on the plate 496. Pivoted on the actuator segment 492 is a transfer segment 500 carrying a stud 501 which is maintained by a spring 502 against a step 503 on the transfer lever 499.

When one of the auxiliary totalizer wheels passes through zero, the long tooth 494 thereon wipes the transfer arm 495, rocking it counter-clockwise against the tension of a spring 504 to disengage the stud 497 from the step in the opening 498 in the transfer lever 499. This releases the transfer lever 499 to the action of a spring 505, which rocks said lever clockwise, thereby disengaging the step 503 from the stud 501, which allows the transfer segment 500 for the next higher order to be rotated the equivalent of one tooth space by the spring 502, thereby moving the next higher order totalizer wheel one step.

All knocked-down transfer levers 499 are restored at the beginning of each operation by studs 506 carried by a plurality of plates 507 rotatably supported by the shaft 148 and connected by links 508 to a rod 509 supported by a pair of arms 510 (only one here shown) loose on the shaft 166. The arms 510 (Figs. 3, 4 and 15) have notches adapted to embrace studs 511 fast in a pair of arms 512 secured on a shaft 513 journaled between the frames 104 and 107. Secured to the shaft 513 is another arm 514 connected by a link 515 to a cam arm 516 pivoted on a stud 517 secured in the left frame 107. The cam arm 516 carries two anti-friction rollers 518 adapted to cooperate with companion cams 519 and 520 secured to the main cam shaft 106. There is one of the plates 507 and its connecting link 508 for each of the transfer levers 499 and consequently this means that there is one of the plates 507 for each denominational unit with the exception of the lowest order, which is the units of cents.

Rotation of the companion cams 519 and 520 rocks the plate 507 first clockwise and then back to normal position, thereby causing the studs 506 to engage and restore to normal position all knocked-down transfer levers 499 at the beginning of each machine operation.

*Auxiliary totalizer latch-breaking mechanism for total-taking operations*

Referring to Fig. 3, it will be recalled that the printing wheels are positioned by the differential actuators 124; therefore, in order to print totals and sub-totals of amounts stored on the auxiliary totalizers, it is necessary that means be provided whereby the latches of the differential actuators 124 may be broken, commensurate with the amount stored on the partiticular set of totalizer wheels on the auxiliary line which is to be read or reset. Mechanism has been provided for accomplishing this result, and will now be explained.

Calling attention to Fig. 14, an auxiliary totalizer reset shaft 521 has fast thereon partial gear 522 meshed with a segment 523 bifurcated to embrace a stud 524 pivotally connecting links 525 and 526. The upper end of the link 526 is connected to a reset pawl 527 pivoted at 528 to one of the plates 496. The pivot 528 also provides a fulcrum for the segment 523. The lower end of the link 525 is pivoted on a stud 529 carried by a stop arm 530 also pivoted on the plate 496 and having a projection which is normally retained against a stop stud 531 in the plate 496 by a spring 532. A link 533 connects the arm 530 to a bell crank 534 pivoted on a stud 535 fast in the hanger plate 119. The bell crank 534 has a projection which is retained against a stud 536 carried by a stop pawl 537 also pivoted on the stud 535. A spring 538 is tensioned so as to maintain a flexible connection between the bell crank 534 and the pawl 537. The pawl 537 has a projection 539 arranged to cooperate with a series of teeth 540 cut on the periphery of the reset spider 117.

In read and reset operations the reset shaft 521 is rotated a slight distance counter clockwise, by mechanism to be later described, to rock the reset pawl 527 in the path of the long tooth of one of the auxiliary totalizer wheels. It will be understood that the mechanism just described is for one denominational unit, there being duplicate mechanisms for each denominational unit.

In total taking operations, the selected set of auxiliary totalizer wheels are engaged with the differential segments 492 and revolved counter clockwise thereby for adding in the same manner as previously described for the front and back totalizers. In counter-clockwise movement during reading or resetting, the long teeth 494 as they approach zero engage the reset pawls 527 rocking them counter-clockwise which in turn rocks the pawls 537 clockwise causing the projections 539 thereon to engage one of the teeth 540 thereby stopping the reset spiders 117. This breaks the latches of the amount differentials and likewise positions the printing wheels in accordance with the amount on the selected set of auxiliary wheels.

Transferring of totals

In the machine of the instant invention it is possible to clear any one of the auxiliary totalizers and add the amount cleared into the proper side of the add-subtract totalizer. Likewise it is possible to clear the add-subtract totalizer and add this amount into a selected one of the auxiliary totalizers. It is also possible to add or subtract in the add-subtract totalizer and simultaneously add in the auxiliary totalizer. The direct transferring of totals is a very desirable feature. This result is accomplished by means of novel mechanism that controls the engagement of the add-subtract and the auxiliary totalizers with their respective differential actuators and likewise controls the movement of the reset shaft for each of these totalizers. Such mechanism will now be described.

The lever 339 (Figs. 8 and 30) has an arm 541 connected by a link 542 to a totalizer engaging arm 543 rotatably mounted on a stud 544 carried by the plate 472. The engaging arm 543 has extensions 545 and 546 (Figs. 28 to 31) having notches 547 and 548 adapted to cooperate respectively with stud 549 associated with the add-subtract totalizer and stud 550 associated with the auxiliary totalizer line carried by links 560 and 561 respectively. The link 560 is pivoted on the upper end of a segment 562 journaled on a stud 563 carried by the plate 472. The segment 562 meshes with a segment 564 pivoted on a stud 565 carried by the plate 472. The segment 564 is bifurcated to embrace a stud 566 carried by an engaging arm 567 secured on an add-subtract engaging shaft 568 supported in slots 569 in a pair of cam plates 570 (only one here shown) one of which is secured to the right side frame 104 and the other to the left frame 107. The arm 567 carries a roller 571 which cooperates with a slot 572 in the plate 570. The plate 570 which is secured to the left frame 107, while not shown, is a duplicate of the plate 570 which has a slot similar to the slot 572 (Fig. 28) which cooperates with a roller on an arm (not shown) similar to the arm 567 said arm being secured on the left end of the shaft 568. The link 561 (Fig. 29) is pivoted to the upper end of the arm 481.

Directing attention to Figs. 8 and 28 the engaging spider 275 is connected by a link 573 to a totalizer engaging plate 574 journaled on the stud 544 (see also Fig. 31). The plate 574 is connected by a stud 576 to a similar plate 577 also journaled on the stud 544 (see Fig. 29). The plate 574 has in its upper periphery a notch 578 arranged to cooperate with the stud 549 carried by the link 560 and the plate 577 has a similar notch 579 which cooperates with the stud 550 carried by the link 561.

It will be recalled that the lever 339 (Figs. 8 and 30) is timed in its movement to properly engage and disengage the totalizers with the differential actuators in adding operations. Being connected to lever 339 by link 542, the totalizer engaging arm 543 (Fig. 30) is rocked in unison therewith, first in a counter clockwise direction and then back to normal position. In case the stud 549 (Fig. 28) carried by the link 560 is engaged with the notch 547 in the arm 543 movement of said arm 543 back and forth will, through the segments 562 and 564, rock the arm 567 and shaft 568 first counter clockwise and then back to normal position during the first half of each machine cycle. The rollers 571 cooperating with the slots 572 in the plates 570 move the shaft 568 guided by the slots 569 first downwardly and then back to normal position to engage and disengage the add-subtract totalizer with the differential actuators 124. In case the stud 550 (Fig. 29) carried by the link 561 is engaged in the notch 548 movement of the arm 543 will rock the arm 481 first counter clockwise and then back to normal position to engage and disengage the auxiliary totalizer with its actuator segments 492 in exactly the same manner as the add-subtract totalizer when stud 549 is engaged with notch 547.

By referring to Fig. 8 it will be recalled that while the engaging spider 275 has a fixed movement first clockwise and then counter clockwise, still this movement is timed differently for adding, reading and resetting operations. Therefore the engaging plates 574 and 577 through the link 573 (Figs. 28 and 29) are moved accordingly in their initial movement counter clockwise and return movement to normal position. If the studs 549 and 550 carried by links 560 and 561 are engaged with the notches 578 and 579 in the plates 574 and 577 respectively, their corresponding totalizers will be engaged with and disengaged from their respective differential actuators according to the timing of the engaging spider 275.

Summarizing briefly, it will be seen that the totalizer engaging arm 543 (Fig. 30) in its movement back and forth is timed exactly the same in adding, reading and resetting operations. However, it will be understood that in one-cycle operations (adding or subtracting) the arm 543 makes only one complete excursion while in two cycle operations (reading or resetting), the arm 543 makes two complete excursions. Consequently, if either the add-subtract or the auxiliary totalizer line is being controlled by the arm 543 it will be engaged and disengaged in add time irrespective of whether the operation being performed is an add, read or reset operation. If either or both the add-subtract and auxiliary totalizer lines are being controlled by the plates 574 and 577 they will be engaged and disengaged with their respective actuators in accordance with the movement of the engaging spider 275, according to the type of operation being performed, whether it be add, read or reset. From the foregoing it will be seen that by properly shifting the links 560 and 561 (Figs. 28 and 29) it is possible to simultaneously add in the balance totalizer and the selected auxiliary totalizer, which also includes the entry of negative amounts in the add-subtract or balance totalizer which is accomplished by adding into the negative side thereof. It is also possible, by properly positioning links 560 and 561, to take a total from either the add-subtract or an auxiliary totalizer and, in the same machine operation, add or transfer this total to the other.

The mechanism for shifting the links 560 and 561, in order to accomplish the above results will now be described. The stud 549 (Figs. 28 and 32) is embraced by a slot 580 in an arm 581 pivoted on a stud 582 fast in the plate 216. The arm 581 carries a stud 583 which cooperates with the upper end of a link 584 having a stud 585 which cooperates with a vertical slot in a plate 586, to assist in positioning the link 584. The lower end of the link 584 is bifurcated to embrace a stud 587 fast in an arm 588 journaled on the shaft 166. The arm 588 has an L-shaped slot 589 which cooperates with a stud 590 in a selecting link 591 pivoted to a selecting arm 592 loose on a stud 593 carried by the plate 216 (Fig. 34). The lever 592 carries a roller 594 arranged to cooperate with a slot 595 in a cam 596 which is secured to a similar cam 597 (Fig. 33) both of said cams being journaled on the stud 544 extending between the plates 216 and 472. The stud 590 on the link 591 also extends through a slot 599 in a driving arm 600 loose on the shaft 166 and connected by a stud 601 to a driving arm 602 also loose on the shaft 166.

The arm 602 is bifurcated to embrace a stud 603 in a lever 604 loose on the stud 304 (see also Fig. 9) and having in its lower end another stud 605 which cooperates with a slot in an arm 606 loose on the shaft 231. The arm 606 carries a stud 607 which cooperates with steps 608 and 609 on the upper end of an operating link 610 pivotally mounted on the lever 289, (see also Fig. 9). The link 610 is connected by a link 611 to an arm 612 loose on the stud 304, said arm 612 carrying a roller 613 which is retained by a spring 615 in operative contact with a camming surface 614 of the total plate 235. The arm 581 (Fig. 32) has a downwardly extending projection 616 which is normally retained against the auxiliary reset shaft 521 by a spring 618. This spring likewise through the link 584 retains a projection of the arm 588 against a stop stud 619 secured in the right frame 104 (see also Fig. 34).

Figure 32:
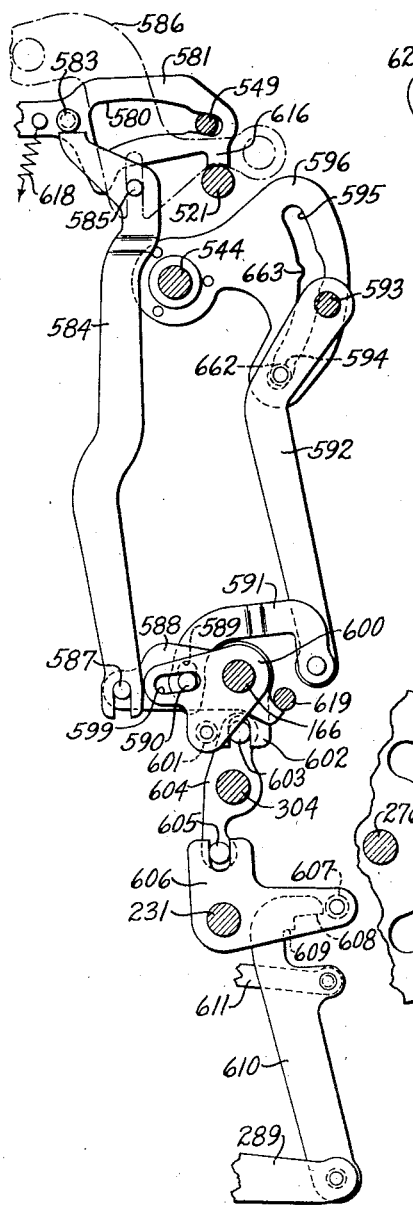
Fig. 32 is a side view of the selecting mechanism for the add-subtract totalizer.
Figure 33:
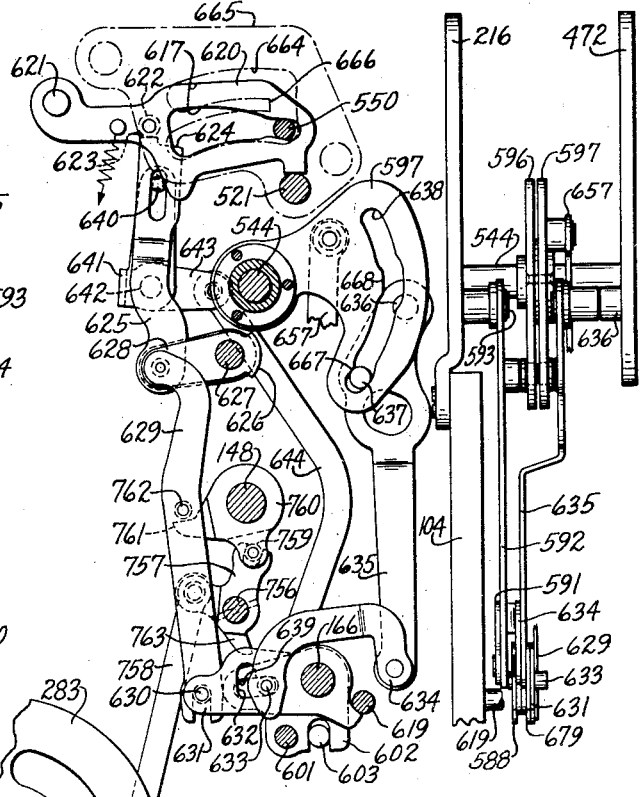
Fig. 33 is a side elevation of the selecting mechanism for the auxiliary totalizer.
Figure 34:
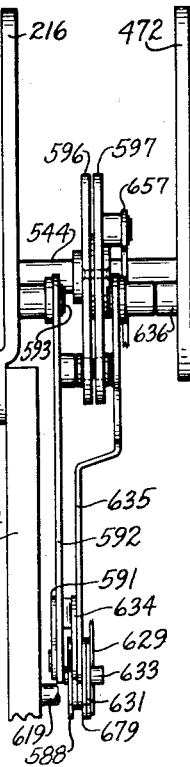
Fig. 34 is a view as observed from the rear of the machine showing the side spacing of some of the parts shown in Figs. 32 and 33.
Figure 35:
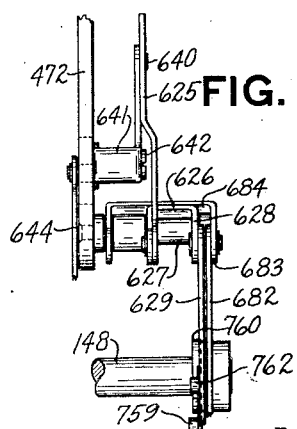
Fig. 35 is a front view showing the side spacing of some of the parts pictured in Fig. 33.

Calling attention to Figs. 33, 34 and 35, the stud 550 in the link 561 is embraced by a slot 617 in an arm 620 rotatably supported by a stud 621 fast in the plate 472. The arm 620 carries a stud 622 which cooperates with steps 623 and 624 on a shiftable link 625 loose on one arm of a yoke 626 journaled on a stud 627 secured in the plate 472 (see also Fig. 35). Pivoted on another arm 628 of the yoke 626 is a link 629 bifurcated to embrace a stud 630 in an arm 631 turnably supported by the shaft 166. The arm 631 has an L-shaped slot 632 which cooperates with a stud 633 in a link 634 pivoted to the lower end of a lever 635 loose on a stud 636 carried by the plate 472. The lever 635 carries a roller 537 which cooperates with a slot 638 in the cam 597. The stud 633 in the link 634 also extends within a slot 639 in the arm 602, said slot 639 being of the same dimensions and alined with the slot 599 in the arm 600 (Fig. 32).

The link 625 (Figs. 33 and 35) has a slot which embraces a stud 640 in the upper arm of a yoke 641 loose on a stud 642 secured in the plate 472. Another arm 643 of the yoke 641 is connected by a link 644 (see also Fig. 41) to an arm 645 of a yoke 646 loose on the shaft 166. Another arm of the yoke 646 has a stud 647 embraced by a slot 648 in the upper end of a link 649, the lower end of which is pivoted to an arm 650 of a shiftable plate 651 loose on the hub 416. The plate 651 has a camming surface 652 which cooperates with a stud 653 carried by a proof key 654 (see also Fig. 5). The plate 651 has a plurality of notches 655 which cooperate with studs in the keys 438, 439 and 440. Depression of any one of the keys 438, 439 or 440 locks the plate 651 against movement, thereby preventing depression of the key 654. Likewise depression of the proof key 654 rocks the plate 651 counter clockwise, thereby moving a series of projections 656 in the path of the studs carried by the keys 438, 439 and 440, to prevent depression of any of these keys when the key 654 has previously been depressed.

Figure 13:
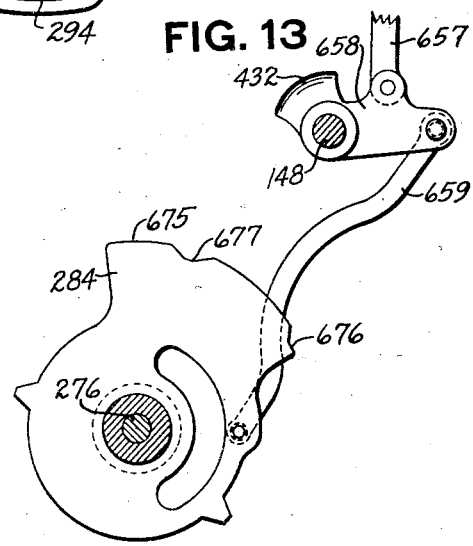
Fig. 13 is a detail of the add selecting plate for the add-subtract totalizer.

Referring to Figs. 5, 13 and 33, the cam 597 is connected by a link 657 to an arm 658 of the yoke 432. The arm 658 is in turn connected by a link 659 to the add selecting plate 284, loose on the stud 275.

It will be recalled by referring to Fig. 5 that the differential positioning of the first transaction bank latch plate 410 and arm 413 through mechanism explained hereinbefore, causes the segment 429 to assume a position relative thereto. This through the yoke 432 and its arm 658 likewise causes the cams 596 and 597 and the add selecting plate 284 (Fig. 13) to also be positioned relative to the position of the plate 410 and the arm 413.

When the total plate 235 (Fig. 9) is in adding position the roller 613 engages the lowest point of the camming surface 614 holding the link 610 out of the path of the stud 607. Consequently the up and down movement of the link 610 does not effect said stud 607 (see also Fig. 32) and mechanism connected therewith. Initial movement of the cam 292 rocks the lever 289 counter clockwise to raise the link 610 above the stud 607 before the total plate 235 receives any movement (Fig. 38). Therefore, when the total plate 235 moves to the first position out of add, which is the new balance or first reset position, a high point 660 of the camming surface 614 through the arm 612 and link 611 rocks the link 610 to a position where the step 609 will be in operative alinement with the stud 607. Consequently when the cam 292 returns the lever 289 and link 610 home, arms 602 and 600 (Figs. 32 and 33) through the stud 607 and arms 606 and 604, receive full movement clockwise. This rocks the studs 590 and 633 and their links 591 and 634 full distance upward. When the total plate 235 moves to any other position than add or new balance position, an intermediate surface 661 of the camming surface 614 rocks the link 610 to a position where the stud 607 will be in operative alinement with the step 608. This causes the return movement of the cam 292 and lever 289 to rock the arms 600 and 602 and the links 591 and 634 only part distance clockwise.

It will be recalled that positions "zero" and "6" are positions in which the latch mechanism for the first transaction bank is broken automatically. The slot 595 in the cam 596 has high points 662 and 663 corresponding respectively to "zero" and sixth positions of the first transaction bank latch mechanism. Consequently when the cam 596 is moved to either of these positions, the lever 592 alines the stud 590 with the upward extension of the L-shaped slot 589 in the arm 588. This allows the stud 590 to operate independently of the arm 588. Therefore, the arm 581 remains in the position shown in Fig. 32, retaining the stud 549 carried by the link 560 in engagement with the plate 574 (Fig. 28). Consequently the engagement of the add-subtract totalizer with its differential actuators is timed during that machine operation by the spider 275.

In the case the balance totalizer cam 596 is positioned by the first transaction bank latch mechanism to positions other than "zero" or "6", the slot 595 rocks the lever 592 clockwise to move the stud 590 out of alinement with the clearance opening in the slot 589, so that the arm 588 is locked to the arms 600 and 602, and moves in unison therewith. Therefore, when the total plate 235 is in the new balance position the arm 588, link 584 and arm 581 receive full movement upward, moving the stud 549 (Fig. 28) into engagement with the notch 547 in the arm 543. This causes the engagement of the add-subtract totalizer with its differential actuators to be timed by the cam 342 (Fig. 30), which cam, as previously stated, always engages the involved totalizer in adding time. If the total plate 235 is in other than the add or new balance position, which causes the step 608 (Fig. 32) to engage the stud 607, the arm 581 and stud 549 will be rocked to an intermediate position where said stud 549 is not in engagement with either the plate 574 or arm 543.

A U-shaped slot 664 (Fig. 33) in a plate 665, retains the stud 550 in engagement with notch 546 in the arm 543 and the notch 579 in the plate 577 during its movement back and forth. Likewise a projection 666 formed by the U-shaped slot 664 blocks the stud 550 against movement when in its intermediate position. While the plate 665 is here shown only in connection with the stud 550, still there is another plate exactly like this, which cooperates in the same manner with the stud 549 (Fig. 32).

Again calling attention to Fig. 33, the auxiliary totalizer cam 597 has high points 667 and 668, which correspond to positions zero, 5 and 6, of the first transaction bank latch mechanism. When the cam 597 is in any one of these three positions, the lever 635 is positioned as shown in Fig. 33. In this position the stud 633 causes the arm 631 to move in unison with the arms 600 and 602. When the total plate 235 (Fig. 9) is in the new balance or first reset position this, through the link 629, yoke 626 and link 625 rocks the arm 620 upward full distance to engage the stud 550 with the slot 548 (Fig. 29) in the arm 543, in exactly the same manner as explained for the balance totalizer. When the total plate 235 is in other than add or new balance position the arms 600 and 602 receive only partial movement, as explained hereinbefore. This causes the arm 620 to move the stud 550 to an intermediate position where it engages neither the plate 577 nor the arm 543.

Summarizing, it will be seen that when the total plate 235 (Fig. 9) remains in the adding position the link 610 does not engage the stud 607. Consequently the studs 549 and 550 (Figs. 28, 29, 32 and 33) remain engaged with the plates 574 and 577 and as the engaging spider 275 receives adding movement at this time the add-subtract and the auxiliary totalizers are engaged with and disengaged from their respective differentials accordingly. Further, when the total plate 235 moves to first position out of add ("new balance" position) the link 610 is shifted to give full movement to the stud 607 and the arms 606, 588 and 631. Consequently, when the latch of the first transaction bank is broken in the zero or sixth position the stud 549 remains engaged with the plate 574 and the stud 550 is shifted into engagement with the engaging arm 543 (see also Fig. 30). The result of this is that the add-subtract totalizer is reset as it is engaged with and disengaged from its differential by the spider 275, which at this time is given a reset movement, and as the auxiliary totalizer is controlled by the arm 543, which moves constantly in add time, the amount cleared from the add-subtract totalizer will be added into the auxiliary totalizer.

In "new balance" operations, when the first transaction bank latch is broken in other than zero or 6th position, the arm 588 receives movement as explained above, causing the stud 549 to be engaged with the add-engaging arm 543. Therefore at this time the add-subtract totalizer is engaged with and disengaged from its actuators, according to add time. Likewise the cam 597 (Fig. 33) in all positions except zero, 5 and 6, shifts the lever 635 to free the arm 631 from the arm 602. Consequently the stud 550 remains coupled to the plate 577 (Fig. 29) causing the auxiliary totalizer to be engaged and disengaged in reset time. Therefore, at this time the auxiliary totalizer is cleared and the amount thus cleared is added into the add-subtract totalizer.

In case the total plate 235 is in other than add or "new balance" position (Figs. 9, 32 and 33) the link 610 imparts only partial movement to the stud 607, arms 606, 600 and 602. Consequently when the cams 596 and 597 are in position zero or 6 the engagement of the add-subtract totalizer is controlled by the spider 275 (Fig. 28) and the auxiliary totalizer remains idle, as the stud 550 is moved to its ineffective position. In positions other than zero and 6 of the cams 596 and 597, the arm 588 receives only partial movement to rock the stud 549 to ineffective position and the arm 631 receives no movement. Therefore, the engaging and disengaging of the auxiliary totalizer is controlled at this time by the spider 275. This causes the auxiliary totalizer to be read and the add-subtract totalizer to remain idle. Breaking of the first transaction bank latch at position 5 at this time causes both totalizers to remain idle, as the studs 549 and 550 are both moved to ineffective positions.

As previously brought out, depression of the "new balance" key 210 (Figs. 16 and 39) causes the add-subtract totalizer to be cleared and this amount added into the auxiliary totalizers. Sometimes it is desirable that this amount be not transferred into the auxiliary totalizer. This is effected by pressing the proof key 654 (Fig. 41) which rocks the plate 651, yoke 641 (see also Fig. 33) and link 625 counter clockwise, to place the step 624 in operative alinement with the stud 622, thereby causing the stud 550 to be shifted to ineffective position. This causes the auxiliary totalizer engaging mechanism to remain inoperative.

Add-subtract reset shaft mechanism

The total plate 235 (Figs. 9, 10 and 11) has therein a slot 670 with depressions 671 and 672 corresponding respectively to the "new balance" or first reset position and the first read position of said total plate 235. The slot 670 cooperates with a roller 763 carried by an arm 674 pivoted on the plate 264 and bifurcated to embrace the stud 313 carried by the link 314. The roller 673 is also arranged to cooperate with an arcuate surface 675 (Figs. 9 and 13) of the add-selecting plate 284. The arcuate surface 675 has low points 676 and 677 corresponding respectively to the zero and sixth positions of the first transaction bank latch mechanism. It will be recalled that the arm 658 (Fig. 13) is differentially positioned by the first transaction bank latch mechanism. Consequently the add-selecting plate 284 is positioned accordingly, due to its connection to the arm 658 by the link 659. A spring 678 (Fig. 9) is tensioned to rock the arm 674 counter clockwise. Therefore, it will be seen that when the total plate 235 is in either the first reset or first read position and the first transaction bank latch is broken at zero or six the stud 313 (Fig. 10) will be moved into the notch 312 in the plate 302 by the action of the spring 678. Subsequent movement first clockwise and then back to normal position, of the plate 302, as previously explained rocks the add-subtract reset shaft 316 first counterclockwise to render the read and reset latch breaking mechanism effective and after the selected totalizer has been read or reset the shaft 316 is returned clockwise to normal position. When the latch of the first transaction bank is broken in any other position than zero or six, the arcuate surface 675 of the plate 284 (Fig. 9) blocks the roller 673, thereby preventing counterclockwise movement of the arm 674. In a like manner the slot 670 in the plate 235 prevents movement of the arm 674 when said total plate 235 is in any other position except first reset or first read. This provides two conditions that must be met before the add-subtract totalizer can be read or reset. First the total plate 235 must be properly positioned, and second, the first transaction bank latch must be broken in either its zero or sixth position.

Auxiliary totalizer reset mechanism

Directing attention to Figs. 33, 36 and 37, loose on the shaft 166 is an arm 679, which in every respect is a duplicate of the arm 598 (Fig. 32). The arm 679 has an L-shaped slot 680, which cooperates with the stud 633 carried by the link 634 pivoted to the lever 635. The arm 679 has fast therein a stud 681 embraced by the bifurcated end of a link 682 the upper end of which is pivoted to an arm 683 of a yoke 684 loose on the stud 627. Another arm 685 of the yoke 684 is pivotally connected by a link 686 to an arm 687 loose on a stud 688 carried by the plate 472.

Also loose on the stud 688 is another arm 689 carrying a stud 690 which is retained against a projection of the arm 687 by a spring 691, which also forms a flexible coupling between the arms 687 and 689. The arm 689 has secured in its lower end a stud 692, which extends through a slot 693 in a locking plate 694 loose on the stud 642 carried by the plate 472. The stud 692 also extends through a slot 695 in a latch plate 696 pivoted on a stud 697 in an arm 698 secured to the auxiliary totalizer reset shaft 521 journaled on trunnions (not shown) carried by the plates 216 and 471 (see also Fig. 7). The upper end of the locking plate 694 cooperates with the stud 697 to retain the arm 698 against a stop stud 710 carried by the plate 472, thereby locking the reset shaft 521 in its home position. The latch plate 696 has a hook 711 which cooperates with a stud 712 carried by the totalizer engaging plate 577 (see also Fig. 29).

When the first transaction bank latch is broken in any position except zero, 5 or 6, the cam 591 (Fig. 33) rocks the lever 635 clockwise to move the stud 633 (Fig. 37) forward in the L-shaped slot 680. Subsequent movement of the arm 602 rocks the stud 633, the arms 679, 687 and 689 clockwise. The stud 692 coacting with the slot 693 in the locking plate 694 and the slot 695 in the latch plate 696 rocks said plate 694 counterclockwise out of the path of the stud 697 and simultaneously rocks the latch plate 696 clockwise to latch the hook 711 over the stud 712.

Initial movement counterclockwise of the plate 577 then rocks the shaft 521 counterclockwise to effective position (see also Fig. 14). After the selected totalizer is read or reset, final movement clockwise of the plate 577 returns the shaft 521 to its home position as shown in Fig. 37.

It will be recalled by referring to Fig. 9 that when the total plate 235 is in adding position the link 610 moves independently of the stud 607. Consequently at this time the link 634 (Fig. 37) receives no up and down movement whatever. When the total plate 235 is in other than adding or first reset position, which, as previously brought out, causes the step 608 of the link 610 to cooperate with the stud 607 to give partial movement to the arms 600 and 602 (Fig. 32), this partial movement when imparted to the arm 679 (Fig. 37) is sufficient to latch the hook 711 over the stud 712. Therefore the auxiliary reset shaft 521 functions whenever the total plate 235 is in other than adding position and the first transaction bank latch is broken in positions other than zero, 5 or 6. When the first transaction bank latch is broken in position zero, five or six the lever 635 receives no movement, consequently the stud 633 remains alined with the upward extending portion of the slot 680. Therefore, at this time the up-and-down movement of the stud 633 does not move the arm 679.

It will be recalled that the total plate 235 (Fig. 9) after being positioned during an operation of the machine remains thus positioned until the beginning of the succeeding operation. For example, after a "new balance" or first reset operation the step 608 of the link 610 remains in engagement with the stud 607. This causes the stud 549 or 550 as the case may be (Figs. 32 and 33) to remain engaged with the arm 543 (Fig. 30) and, depending upon the position in which the first transaction bank latch is broken, the hook 711 (Fig. 37) to remain engaged with the stud 712 at the end of machine operation. Assuming that the succeeding operation is an adding operation at the beginning of which the total plate 235 is moved from first reset position back to adding position, the link 610, which previously has been moved upward by the cam 292 (Fig. 9) will be disengaged from the stud 607 (see also Fig. 38). Consequently, return movement downward of said link 610 has no effect on the totalizer engaging and resetting mechanism. In other words, the mechanisms shown in Figs. 32, 33 and 37 are returned to home position, by the springs 618, 623 and 713 at the beginning of each machine operation, and prior to movement of the total plate 235, and after the cam 292 has lifted the link 610. Subsequent movement of said total plate positions the link 610 in the manner explained above.

*Correction and cashier keys—Control by correction key*

The ledger device 99 (Fig. 1) incorporated at the right of the instant machine has a plurality of depressible keys 714, which control type carriers (not shown) for the purpose of printing ledger or account numbers on ledger cards, passbooks and the like. This mechanism is old, having been used in former machines of this type, and therefore only the part thereof that is pertinent to the present invention will be described. However, reference may be had to the Shipley Patent No. 1,619,796, referred to earlier herein, for a detailed description of the ledger mechanism.

Journaled between the frames 96 and 97 (Figs. 41 and 46) is a shaft 716 in alinement with the key lock shaft 167 (see also Fig. 2). Secured to the left end of the shaft 716 is an arm 717 carrying a stud 718 embraced by a slot in the arm 168 secured to the key lock shaft 167. Due to this connection, the shaft 716 receives any movement which is imparted to the shaft 167. Secured on the right end of the shaft 716 (Fig. 41) is an arm 719 having a stud 720 embraced by a slot 721 in a link 722, the lower end of which is pivoted to an arm 723 secured to a barrel 724 of a lock 725 fast to a front ledger frame 726. The lock 725 has plungers (not shown) which cooperate with notches 727 in a cashier's key 728 (Fig. 45) and a correction key 729 (Fig. 44) adapted to be inserted in opposed grooves 730 in the frame of the lock 725. A spring-pushed plunger 731 (Figs. 41 and 42) cooperates with a notch 732 in each of the keys 728 and 729 to retain them in the lock.

As previously explained, the shaft 167 and consequently the shaft 716 rotates slightly clockwise under spring tension when the motor bar 108 (Figs. 1 and 39) is depressed. This clockwise releasing movement of the shaft 167 is possible only when one of the keys 728 or 729 is inserted within the lock 725, as this frees the lock barrel 724 from the action of its plungers; therefore when there is no key in the lock 725 the machine is locked against operation. Within the slot 721 of the link 722 (Fig. 41) is a spring-pushed slide 733 which cooperates with the stud 720 to prevent the lock 725 from having any effect on the counter clockwise or restoring movement of the shafts 167 and 716.

Pivoted on a stud 734 in the frame 96 (Figs. 41 and 42) is a lever 735 carrying a stud 736 which extends within a slot in a lever 737 (see also Figs. 47 and 48), loose on a stud 738 fast in the frame 96. The lever 737 has therein a slot 739 which surrounds a stud 740 fast in a pitman 741 pivotally connected to an arm 742 loose on a stud 743 carried by the frame 96. The pitman 741 carries a roller 744 which cooperates with a raceway 745 in a cam 746, secured on a shaft 747, opposite ends of which are journaled in the frames 96 and 97. The shaft 747 (Fig. 46) is in effect an extension of the main cam shaft 106, to which it is clutched for concurrent movement therewith. The pitman 741 has therein a slot 748 which surrounds the shaft 747. This slot is merely a clearance slot and does not cooperate in any way with said shaft 747.

Figure 46:
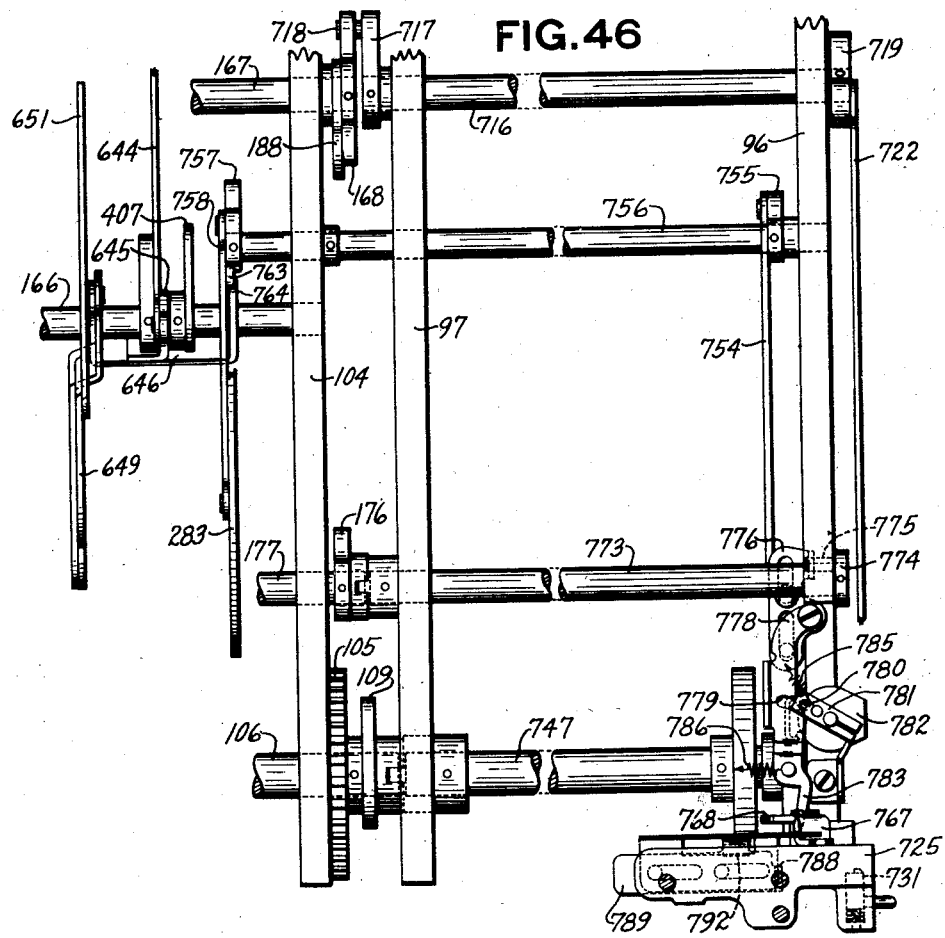
Fig. 46 is a front elevation of the proof key, the correction key and the cashier key mechanisms.
Figure 47:
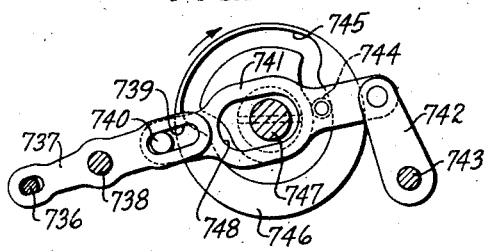
Fig. 47 is a detail of the correction key operating cam mechanism.

Also loose on the stud 738 is an arm 749 having a triangular opening 750 which cooperates with the stud 740 in a manner to be later described. The arm 749 has a right-angled projection 751 which cooperates with a partial rim 752 of a drum 753 secured on the shaft 747. The arm 749 (Fig. 41) is pivotally connected by a link 754 to an arm 755 secured on the righthand end of a shaft 756 (see also Fig. 46) journaled between the right frame 104 and the ledger frame 96. Secured on the left end of the shaft 756 is an arm 757 connected by a link 758 to the add-selecting disk 283 (see also Figs. 9 and 33). The arm 757 is bifurcated to embrace a stud 759 in an arm 760 rotatably mounted on the shaft 148 and having a projection 761 which cooperates with a stud 762 in the link 629. The arm 757 has a projection 763 which cooperates with an extension 764 of the yoke 646 (Figs. 41 and 46).

Figure 48:
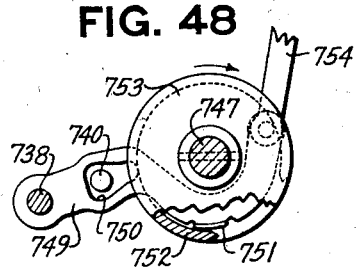
Fig. 48 is a detail view of the operating arm that is controlled by the correction key.

Inserting the correction key 729 (Fig. 44) in the lock 730 causes a stud 765 carried by said correction key to engage a notch 766 (Fig. 42) in an arm 767 turnably mounted on the lock 725. This rocks the arm 767 clockwise, as viewed in Fig. 42, causing an extension 768 thereon to engage an upwardly extending projection 769 of the lever 735 (Fig. 43) to rock said lever counterclockwise against the tension of a spring 770 (Fig. 41). This in turn rocks the lever 737 clockwise to move the stud 740 downwardly until it nearly touches the bottom of the triangular opening 750 in the arm 749 (Fig. 48). The arm 749 is normally retained in its upward position by the rim 752 of the drum 753 engaging the projection 751.

It will be recalled that the main cam shaft 106 (Fig. 46) makes one complete revolution clockwise in adding and subtracting operations and two clockwise revolutions in reading and resetting operations. Consequently the shaft 747 (Figs. 47 and 48) revolves in unison therewith. Slight initial movement of the drum 753 places an opening in the rim 752 opposite the projection 751. The cam 746 cooperating with the roller 744 then moves the pitman 741 rearwardly, causing the stud 740 guided by the slot 739 in the lever 737 to engage the bottom of the opening 750 in the arm 749 to rock said arm 749 clockwise, thereby moving the projection 751 below the rim 752. Continued movement clockwise of the drum 753 causes the periphery of the rim 753 to engage the projection 751 to hold the arm 749 in its moved position. The clockwise movement of the arm 749, as explained above, through the link 754 and arm 755 (Fig. 41) rocks the shaft 756 and arm 757 counter clockwise. The projection 763 of the arm 757 cooperating with the projection 764, rocks the yoke 646 clockwise, which through the link 644 rocks the yoke 641 counter clockwise. This counter clockwise movement of the yoke 641 (Fig. 33) moves the link 625 to a position where the step 624 thereon will be in operative alinement with the stud 622 in the arm 620. The counter clockwise movement of the arm 757 rotates the arm 760 clockwise, causing the projection 761 to engage the stud 762 to lift the links 629 and 625 and the arm 620 sufficiently to shift the stud 550 to its neutral position. This effectively prevents any calculation in the auxiliary totalizer during correction operations.

Counter clockwise movement of the arm 757 (Fig. 9) through the link 758 rocks the add-selecting plate 283 clockwise to place notches 771 and 772 in said plate 283 opposite the fingers 281 of the feelers 280. This, as explained earlier, prevents addition in both the front and back totalizers. From the foregoing description it will be seen that when the correction key 729 (Fig. 44) is used, all the totalizers are rendered ineffective except the add-subtract totalizer. The use of this key also permits only those with the authority to do so to make corrections on ledger cards, passbooks and the like.

Generally when a correction operation is performed the entire erroneous entry is crossed out on the passbook or ledger card, and the corrected transaction is reentered. Such a transaction usually consists in the setting up of the old balance, addition of credits, and subtraction of debits, and finally the arriving at a new balance by clearing the add-subtract totalizer.

It is desirable that a record be kept of the number of correction operations performed and as a balancing operation is made at the end of each correction operation means have been provided for adding one on a step-by-step counter at this time. The mechanism which accomplishes this result will now be described.

Correction key counter

Coupled to the zero latch throwout shaft 177 (Fig. 46) is an auxiliary throwout shaft 773 journaled in the ledger frames 96 and 97. Secured on the right end of the shaft 773 is an arm 774 carrying a stud 775 (see also Fig. 41) which cooperates with a slot in a slide 776 mounted for vertical movement on an intermediate ledger frame 777. Pivoted to the slide 776 is a link 778 having a slot 779 which cooperates with a stud 780 in an arm 781 of a step-by-step counter 782 which is secured to the frame 96. The lower end of the link 778 has a projection 783 which cooperates with an extension 784 of the arm 767 (Fig. 42).

Inserting the correction key 729 (Fig. 44) within the machine causes the stud 765 to rock the arm 767 clockwise, as observed in Fig. 42 in the manner previously described. This causes the extension 784 to engage and rock the link 778 counter clockwise as observed in Fig. 46, thereby causing the slot 779 to embrace the stud 780. It will be recalled that the shaft 177 (Figs. 41 and 46) and consequently the shaft 773 are rocked first clockwise and then back to normal position during total taking operations. Initial movement of the shaft 773 through the arm 774 and stud 775 moves the slide 776 and link 778 first downwardly and as the slot 779 at this time embraces the stud 780, the arm 781 is rocked counter clockwise as observed in Fig. 46 to add one on the step-by-step counter 782. Return movement counter clockwise of the shaft 773 moves the slide 776 and link 778 upward, and the arm 781 back to normal position, in which position said arm 781 is retained by a spring 785.

When the correction key is removed, a spring 786 (Figs. 42 and 46) returns the link 778 and the arm 767 to their normal positions thereby disengaging the slot 779 from the stud 780. In this position an extension of the lower side of the slot 779 prevents manipulation of the counter 782 by blocking the counter clockwise movement of the arm 781. In total taking operations, when the correction key is not being used, the link 778 moves up and down, independently of the arm 781, consequently at this time nothing is accumulated on the counter 782.

Lock for correction key mechanism

Two separate means have been provided for locking the lever 735 against manipulation when the correction key is removed from the machine. One of these means is rendered ineffective by inserting the correction key in the lock, and the other locking means is operated by a lock and key. These two locking means will now be described in the order related above.

A flat surface 787 (Figs. 41 and 43) of the lever 735 is arranged to cooperate with an upwardly extending projection 788 (Figs. 42 and 46) of a slide 789 mounted for horizontal movement on the frame of the lock 725. The projection 788 is normally maintained in position by a spring 790 to block the downward movement of the lever 735. Inserting the correction key 729 (Fig. 44) in the lock 725 causes a stud 791 to engage a downwardly extending projection 792 of the slide 789 and move said slide 789 and the extension 788 out of the path of the lever 735.

The lever 735 (Figs. 41 and 42) carries a stud 793 which coacts with a slot 794 in a slide 795 mounted for horizontal movement on the ledger frame 96. The slide 795 (Fig. 43) carries a stud 796 which cooperates with projections 797 and 798 on a barrel 799 of a lock 800, which is secured to the frame 96. In Fig. 43 the slide 795 is shown locked forward, in which position the slot 794 engages the stud 793 to prevent movement of the lever 735. By inserting the key in the lock 800 and rotating the barrel 799 clockwise 180 degrees, the projection 798 is caused to engage the stud 796 to move the slide 795 rearwardly, thereby disengaging the slot 794 from the stud 793 to permit movement of the lever 735. The two locking means just described prevent manipulation of the correction mechanism by unscrupulous or unauthorized persons.

The cashier key 728 and the correction key 729 (Figs. 44 and 45) have respectively lugs 806 and 807 adapted to engage and position a printer rack (not shown) which in turn positions a symbol-carrying type wheel in order to print a symbol characteristic of the key being used.

Cashier key control

Use of the cashiers key 728 (Figs. 41 and 45) has no effect upon the correction key mechanism, but serves only to free the plungers from the barrel 724 of the lock 725 so that the machine may be released for operation.

Automatic latch-breaking mechanism

As previously brought out, the latch of the first transaction bank, in addition to being broken by means of the keys 438, 439 and 440 (Figs. 5 and 39), is also broken automatically in various positions. It will be remembered that the first transaction bank latch controls the selection of the plus or minus side of the add-subtract totalizer and also controls the selection of the different totalizers on the auxiliary totalizer line in all operations including add, read and reset.

The first transaction bank (row 1) latch has ten positions, zero to 9 inclusive. Movement of this latch controls the positioning of the cams 442 and 445 (Fig. 40), which in turn respectively control the selection of different sets of totalizer wheels on the auxiliary totalizer line and the plus or minus side of the add-subtract or balance totalizer. Positions zero to 3 inclusive of the cam 445 select the minus side of the add-subtract totalizer and positions 6 to 9 inclusive select the plus side of the add-subtract totalizer.

It requires two positions of the cam 445, in this instance positions 4 and 5, for the shifting of the add-subtract totalizer in order to aline the positive or negative side thereof with the actuators. There are keys in both these positions, but the account number key, fourth position, is merely a printing key, that is, it is used to release the key lock line when it is desired to print an account number on the ledger card or passbook. The proof key, fifth position, has a short stem and consequently does not stop the latch which in this position is controlled automatically. The automatic latch-breaking mechanism will now be described in detail.

Figure 20:
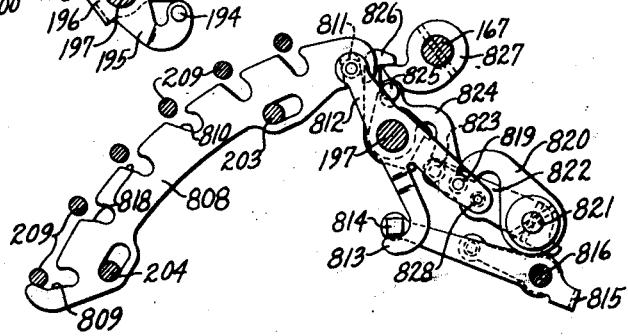
Fig. 20 is a detail view showing the mechanism for unlocking the machine releasing means when a total key is depressed.

Mounted for slight rocking movement on studs 203 and 204, carried by the total key frame 202 (Figs. 6 and 20) is a plate 808 having slots 809 and 810, which cooperate with studs 209 in the new balance or first reset key 210 and the first read key 212 (see also Fig. 39). The plate 808 is bifurcated to embrace a stud 811 in an arm 812 loosely mounted on the upper reset shaft 197. The arm 812 has a hook 813 which cooperates with a square stud 814 in one arm of a yoke 815 loosely mounted on a shaft 816, opposite ends of which are journaled in the plate 464 (Figs. 5 and 7) and a plate 817, carried by the first transaction bank hanger 418. The plate 808 (Fig. 20) has symmetrical slots 818, which cooperate with the studs 209 carried by the second and third reset and read keys 211 and 212 respectively. The arm 812 carries a stud 819 which cooperates with an arm 820 secured on a shaft 821 journaled in the plates 464 and 817. Secured on the shaft 821 is another arm 822 having a stud 823 which cooperates with an arm 824 loose on the shaft 197. The arm 824 carries a stud 825 arranged to engage a key lock line latch 826 loose on the shaft 197.

When the machine is in home position a spring (not shown) retains the latch 826 in engagement with an arm 827 fast on the key lock shaft 167.

Depressing any one of the keys 210, 211 and 212, rocks the plate 808 and the arm 812 counter clockwise. This in turn rocks the shaft 821 and arm 822 clockwise, which through the arm 824 moves the latch 826 counter clockwise to release the key lock line for its clockwise releasing movement, as previously described herein. Restoration counter clockwise of the key lock line 167 near the end of machine operation allows the latch 826 to reengage the arm 827 to lock the shaft 167 against releasing.

Depressing a key in either the first, second or third transaction bank likewise rocks the latch 826 counter clockwise, so that the shaft 167 will be free to make its releasing movement clockwise when the starting bar 108 is depressed. From the foregoing it will be seen that depressing one of the keys 210, 211 or 212 starts the machine to operate, but before the machine can be started to operate by depressing the starting bar 108 it is necessary that a key be depressed in either the first, second or third transaction bank.

Depression of either the new balance key 210 (Fig. 20) or the first read key 212, due to the angle of the slots 809 and 810, rocks the plate 808 and the arm 812 full distance counter clockwise. This moves the hook 813 out of the path of the stud 814 thereby surrendering the yoke 815 to the control of other means to be later described. Depression of any other key in the total bank rocks the plate 808 and the arm 812 only partial distance counter clockwise which is not sufficient to move the hook 813 out of the path of stud 814, therefore the yoke 815 is retained in ineffective position.

The arm 812 (Figs. 21 and 23) has a stud 828 which cooperates with a forked projection of a yoke 829 loose on the shaft 821. An arm of the yoke 829 has steps 830, 831, and 832 which cooperate with a stud 833 carried by an upward extension of a latch stop arm 834 pivoted on a stud 835 carried by the hanger plate 418 for the first transaction bank (see Fig. 5). The arm 834 has a projection 836, which coacts with a projection 837 on the first transaction bank latch plate 410.

Depressing either the new balance key 210 (Figs. 20 and 21) or the first read key 212 through the plate 808 and the arm 812 rocks the yoke 829 maximum distance clockwise to aline the step 832 thereon with the stud 833 in the arm 834. Depressing any other key in the total bank rocks the yoke 829 part distance clockwise to aline the step 831 thereon with the stud 833 in the arm 834. The purpose of the above movements of the yoke 829 will be revealed later.

Figure 27:
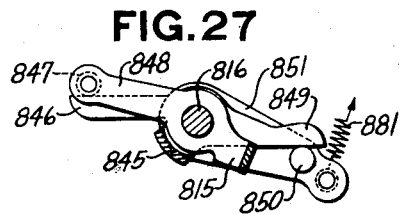
Fig. 27 is a sectional view taken along line 27 of Fig. 26 looking in the direction of the arrows.

Calling attention to Fig. 21, fast on the key lock shaft 167 is an arm 838 connected by a link 840 to a plate 841, rotatably mounted on the shaft 821. A foot 842 of the link 840 cooperates with the stud 833 to restore the arm 834 to normal position near the end of each machine operation in a manner to be described later. The plate 841 has an arcuate surface 843 which coacts with a stud 844 carried by one arm of a yoke 845 turnably mounted on the shaft 816 (see also Figs. 26 and 27). Initial releasing movement clockwise of the shaft 167 (Fig. 21) rocks the foot 842 of the link 840 away from the stud 833 in the arm 834, and rocks the plate 841 counter clockwise. This movement of the plate 841 disengages the arcuate surface 843 thereon from the stud 844 in the yoke 845 for a purpose to be later described. The yoke 845 has an extension 846 (Fig. 27) which cooperates with a stud 847 in an arm 848 of the yoke 815. Another extension 849 of the yoke 845 coacts with a stud 850 in an arm 851 secured to the shaft 816. Secured on the shaft 816 is a latch stop pawl 852 the end of which is adapted to cooperate with a projection 853 on the plate 410 (see also Fig. 24). Also fast on the shaft 816 is an arm 854 carrying a stud 855 which coacts with a projection 856 (Fig. 23) of a plate 857 mounted for slight rocking movement on the center 133. The plate 857 has angular camming surfaces 858 arranged to be engaged by studs 859 carried by the keys 141 (Fig. 39) of the third transaction bank. The stud 847 in the arm 848 of the yoke 815 (Figs. 21, 26 and 27) is arranged to be engaged by a radial projection 860 (Figs. 21 and 22) on a plate 861 turnably mounted on the center 133 and having angular camming surfaces 862 which cooperate with studs 863 carried by the keys 438, 439 and 440 of the first transaction bank. The plate 861 (Figs. 21 and 22) carries a stud 864 embraced by the bifurcated end of an arm 865 rotatably supported on the shaft 821, and having an extension 866 which cooperates with the stud 833 carried by the stop arm 834 in a manner and for a purpose to be later described. The plates 857 and 861 (Figs. 21 and 23) are returned to and retained in normal positions as here shown against stop studs 867 and 868 secured in the hanger plates 417 by springs 869 and 870 respectively.

Figure 25:
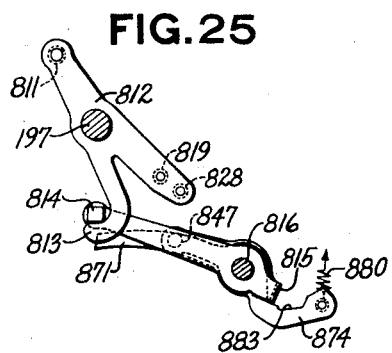
Fig. 25 is a detail view of part of the automatic latch-breaking mechanism.
Figure 26:
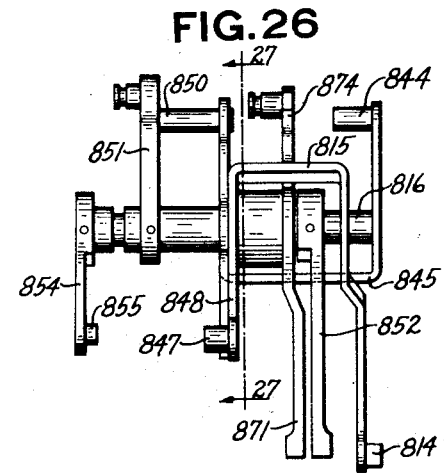
Fig. 26 is a top plan view of the stop pawls for the automatic latch-breaking mechanism.

Directing attention to Figs. 24, 25 and 26, loose on the shaft 816 is a pawl 871 which cooperates with steps 872 and 873 of a plate 805 secured to the first transaction bank latch plate 410.

The pawl 871 has an extension 874 which cooperates with a disabling arm 875 loose on the overdraft shaft 463. The arm 875 has a stud 876 embraced by the bifurcated end of an arm 877 loose on the shaft 821. The arm 877 carries a stud 878 which extends within a slot in an arm 879 secured on the shaft 463. The extension 874 of the pawl 871 is maintained in engagement with the connecting bar of the yoke 815 by a spring 880 (see Fig. 25) which is tensioned to urge both the pawl 871 and yoke 815 in a counter clockwise direction, as viewed in Fig. 25. A spring 881 (Fig. 27) is tensioned to urge the arm 851, shaft 816, arm 854 (Fig. 26) and pawl 852 counter clockwise.

*New balance and No. 1 read operations*

In analyzing the different operations in which the first transaction bank latch is automatically broken, let us begin with the new balance or first reset operation and the first reading operation. Depression of either the new balance key 210 or the first read key 212 (Figs. 6 and 20) causes the stud 209 in cooperation with either of the slots 809 or 810 to rock the plate 808 and arm 812 counter clockwise maximum distance. This, as previously explained, removes the latch 826 from the arm 827 and also rocks the hook 813 out of the path of the stud 814 in the yoke 815. This counter-clockwise movement of the arm 812 (Figs. 21 and 23) also rocks the yoke 829 full distance clockwise to disengage the step 830 from the stud 833 to release the arm 834 to the action of a spring 882, which is tensioned to rock said arm counter clockwise. The full clockwise movement of the yoke 829 also alines the step 832 with the stud 833.

Depression of either the new balance or first read key releases the key lock shaft 167 to the action of its spring which rocks said shaft clockwise to clutch the motor to the driving mechanism, as explained earlier herein. Clockwise movement of the shaft 167 and the arm 838 moves the foot 842 of the link 840 out of the path of the stud 833, allowing the arm 834 to move counter-clockwise until the stud 833 engages the step 832. With the arm 834 in this position the projection 836 is moved beyond the path of movement of the projection 837. Consequently said projection 837 passes above the projection 836 when the latch plate 410 makes its clockwise starting movement. The link 840 rotates the plate 841 counter clockwise to free the yoke 845 for counterclockwise movement, which in turn frees the yoke 815 and shaft 816 for counter clockwise movement against which they are normally restrained by extensions 846 and 849 (Figs. 26 and 27) of the yoke 845 until the key lock shaft 167 makes its initial releasing movement clockwise. However, in this type of operation the shaft 816 is further blocked against counter clockwise movement by the projection 856 (Fig. 23) of the plate 857. Consequently the pawl 852 (Figs. 24 and 26) is held ineffective and the pawl 871 (see also Fig. 25) is released to the control of the overdraft shaft 463.

As shown in Fig. 24, the plus side of the add-subtract totalizer is standing at zero (i. e. not overdrawn). When the add-subtract totalizer is not overdrawn, the shaft 463 is so positioned that the arm 875 engages the extension 874 to locate the pawl 871 in alinement with the step 873 which arrests the clockwise setting movement of the plate 410 to break the first transaction bank latch 412 in the sixth position. It should be borne in mind that in first read or reset operations the first transaction bank latch is always broken in either zero or the sixth position. Consequently the projection 836 (Fig. 21) of the arm 834 is prevented from interfering with the latch plate 410.

With the plus wheels of the add-subtract totalizer standing at zero as shown in Fig. 24, let us assume that a transaction is made whereby "one" is subtracted from the totalizer thereby causing an overdraft. This revolves the highest order plus wheel 446 counter-clockwise through zero, causing the tripping tooth 448 to engage and rock the lever 449 counter-clockwise which in turn rocks the shaft 463 and arm 875 clockwise, moving said arm out of the path of the extension 874 and into alinement with an undercut surface 883 of the pawl 871. With the add-subtract totalizer thus overdrawn, a subsequent first reset or reading operation allows the pawl 871 to travel the full distance counter-clockwise until arrested by the arm 875 engaging the surface 883. This alines the pawl 871 with the step 872 of the plate 410, which corresponds to the zero position of said plate; consequently the first transaction bank latch is automatically broken in the zero position.

Figure 40:
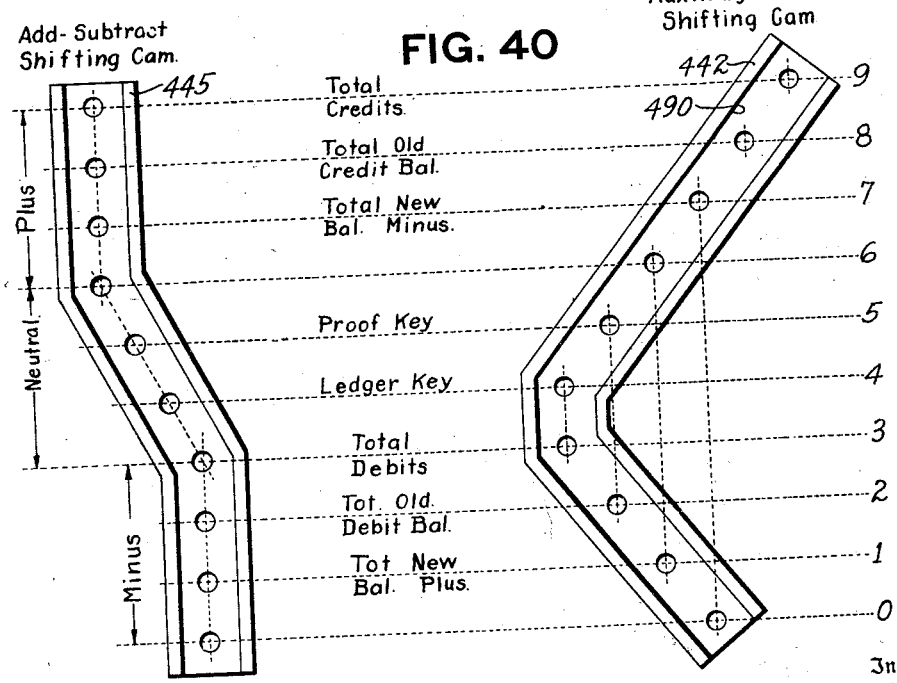
Fig. 40 is a diagrammatic view of the balance totalizer shifting cam and the auxiliary totalizer shifting cam. The cams are shown as they appear looking from the rear of the machine toward the front.

By referring to Fig. 40 it will be seen that when the first transaction bank latch is thus broken, the minus side of the add-subtract totalizer is selected for reading or resetting, and the totalizer on the auxiliary totalizer line, in which the total negative new balance is stored, is selected for addition. One exception to the above statement, however, is that when the #1 read key is depressed and an operation performed, the auxiliary totalizer engaging mechanism is shifted to a neutral position, as previously explained, and consequently there is no adding into the auxiliary totalizer during a first reading operation.

*Reading and resetting the auxiliary totalizer*

It will be recalled that the keys 438 and 439 (Figs. 5 and 39) in the first transaction bank represent the different totalizers on the auxiliary totalizer line; therefore when it is desired to read or reset the auxiliary totalizer line these keys are used in conjunction with the new balance or first reset key and the first read key. Using the keys 438 and 439 in conjunction with the new balance key causes the totalizers they represent on the auxiliary totalizer line to be cleared and this amount transferred to the add-subtract totalizer. In this type of transaction it is desirable that the automatic latch breaking mechanism be crippled in order that the stem of the depressed key will position the first transaction bank latch, thereby selecting the totalizer it represents. This is accomplished in the following manner:

Depressing any one of the keys 438 or 439 (Figs. 21 and 22) rocks the plate 861 counter clockwise, causing the arcuate projection 860 to pass under the stud 847 (see also Fig. 26) in the yoke 815 thereby blocking the counter clockwise movement of said yoke when it is released by depressing the first reset key 210 (Figs. 16 and 20), as explained above. Counter clockwise movement of the plate 861 rocks the arm 865 clockwise to move the projection 866 in the path of the stud 833, thereby blocking counter clockwise movement of the arm 834 when the first reset key 210 is depressed. As no keys have been pressed in the third transaction bank (Fig. 23) the projection 856 on the plate 857 remains in the path of the stud 855 to block counter clockwise movement of the shaft 816. Therefore, it will be seen that the pawls 852 and 871 (Fig. 24) and the arm 834 (Fig. 21) are retained in ineffective positions, thereby allowing the latch plate 410 to travel until it strikes the stem of the depressed key.

Using the No. 1 read key 212 (Figs. 5, 6 and 39) in conjunction with the keys 438 and 439 disables the automatic latch breaking mechanism in exactly the same manner as just described, in order to read the desired totalizer on the auxiliary totalizer line. However, when using the first read key, the amount thus read is not transferred to the add-subtract totalizer as the position of the total plate 235 (Fig. 9) causes the stud 549 (Fig. 32) to be shifted to its ineffective position thereby rendering ineffective the add-subtract engaging mechanism.

*Reading and resetting the No. 2 or rear totalizer line*

To read or reset the No. 2 totalizer line, which is sometimes referred to as the rear totalizer, the keys 142 (Fig. 39) in the second transaction bank are used in conjunction with the #2 read key 212 or the #2 reset key 211. Depressing any of the keys 142 rocks the plate 808 (Fig. 20) sufficiently to release the latch 826, but not far enough to disengage the hook 813 from the stud 814. Therefore the yoke 815 and likewise the pawl 871 (Figs. 24 and 26) are retained in ineffective position. This part movement of the plate 808 through the arm 812 rocks the yoke 829 (Figs. 21 and 23) sufficiently to aline the step 831 with the stud 833. This causes the arm 834 to be so positioned that the projection 836 is in the path of the projection 837 of the plate 410. This causes the clockwise movement of the plate 410 to be arrested and the first transaction bank latch broken in the fifth position, which, as previously stated, is a neutral position and selects neither side of the add-subtract totalizer.

By referring to Fig. 33 it will be seen that the fifth position of the first transaction bank latch usually selects the auxiliary totalizer for an adding operation, but due to the position of the total plate 235 the stud 550 is moved to its intermediate ineffective position. Consequently the engaging mechanism for the auxiliary totalizer is rendered ineffective. Therefore, using the keys 142 in row two in conjunction with the #2 read and #2 reset keys causes the totalizers on the #2 or rear totalizer line to be read or reset as the case may be, but has no effect whatever on the add-subtract and the auxiliary totalizers.

*Reading and resetting the No. 3 or front totalizer line*

To read or reset the #3 or front totalizer line the keys 143 (Fig. 39) are used in conjunction with the #3 read key 212 or the #3 reset key 211. Depression of any one of the keys 143 rocks the plate 857 (Fig. 23) counter clockwise, thereby removing the projection 856 out of the path of the stud 855, which releases the shaft 816 for counter clockwise movement when the machine is tripped. This places the pawl 852 in the path of the projection 853 on the plate 410, which would normally cause the first transaction bank latch to be broken in the third position, but as it is necessary that this latch be broken in the fifth position at this time, means have been provided for arresting the counter clockwise movement of the shaft 816. Depressing either the third read or third reset key rocks the plate 808 (Figs. 20 and 23), the arm 812 and the yoke 829 part distance the same as depressing the second read or second reset key. Clockwise movement of the yoke 829 in addition to alining the step 831 with the stud 833 carried by the arm 834 causes an extension 884 to move into the path of the stud 855 to effectively block the counter clockwise movement of the shaft 816 and the pawl 852. From the foregoing it will be seen that depressing the 3rd read or 3rd reset key releases the key lock shaft 167 thereby allowing the stud 833 (Fig. 21) to engage the step 831 of the yoke 829 to aline the projection 836 of the arm 834 with the projection 837 of the plate 410. Consequently the first transaction bank latch will be broken in the fifth position and due to the position of the total plate 235 the studs 549 and 550 (Figs. 32 and 33) will be lifted upward to their ineffective positions thereby crippling the engaging mechanism for the add-subtract and the auxiliary totalizers.

It will be recalled that near the end of each machine operation the key lock shaft 167 (Fig. 21) is rocked counter clockwise to release the depressed keys and disengage the clutch mechanism. This counter clockwise movement through the arm 838 and the link 840 rocks the plate 841 clockwise causing the arcuate surface 843 to engage the stud 844 to rock the yoke 845 clockwise which through the extensions 846 and 849 (Fig. 27) also rocks the yoke 815 and shaft 816 clockwise to restore and retain them in their normal ineffective positions. This counter clockwise restoring movement of the shaft 167 (Fig. 21) also causes the foot 842 of the link 840 to engage the stud 833 to return the arm 834 to its normal position as shown in Fig. 21. A spring 885 (Fig. 23) then returns the yoke 829 counter clockwise to normal position, causing the surface 830 in cooperation with the stud 833 to retain the arm 834 in its normal position.

It will be remembered that the proof key 654 (Figs. 21 and 39) due to its short stem does not break the first transaction bank latch mechanism. Neither does depression of this key move the plate 861 due to the fact that there is no camming surface 862 for the stud 863 carried by this key. In other words, the sole purpose of the key 654, as previously brought out, is to prevent the transferring of the amount from the add-subtract totalizer into the auxiliary totalizer. Therefore using the key 654 in conjunction with the new balance key 210 or first read key 212, resets or reads the balance totalizer, as the case may be, but does not transfer the amount into the auxiliary totalizer. The new balance key and the first read key work at this time in exactly the same manner as previously described for a new balance operation.

Control of the First Transaction Bank Latch Mechanism in Adding Operations

Adding operations are performed in the present machine by using the amount keys 114 (Fig. 39) in conjunction with the keys 438 or 439 in row 1, the keys 142 in row 2 or the keys 143 in row 3, together with the starting bar 108. Pressing any one of the keys 438 or 439 (Fig. 21) rocks the plate 861 counter clockwise to block the counter clockwise movement of the yoke 815 and the pawl 871 (see also Figs. 24 and 26) and due to the fact that there are no keys depressed in the third row, the plate 857 (Fig. 23) blocks the counter clockwise movement of the shaft 816 and the pawl 852. As no total key is depressed in an adding transaction the hook 813 (Fig. 21) of the arm 812 further blocks the downward movement of the yoke 815 and the yoke 829 retains the arm 834 in its ineffective position. Consequently the first transaction bank latch is positioned by the depressed key 438 or 439 to select the proper totalizer on the auxiliary line for addition and the corresponding side of the add-subtract totalizer.

The keys 142 (Fig. 39) in row 2 have no effect on either of the plates 861 or 857 (Figs. 21 and 23). Neither is there a plate similar to these plates for this row of keys. As in the previous operation the plate 857 retains the shaft 816 and the pawl 851 in ineffective position, as shown in Fig. 23, and as there are no total keys depressed at this time the hook 813 on the arm 812 prevents downward movement of the yoke 815 and the pawl 871, and as before, the yoke 829 blocks the movement of the arm 834. This renders all the automatic latch-breaking mechanism ineffective and as there is no means for breaking the first transaction bank latch at zero, other than the automatic latch-breaking means, the plate 410 is free to travel to the ninth position to select the plus side of the add-subtract totalizer and the proper totalizer on the auxiliary totalizer line for the storing of credit items.

Using the keys 143 (Fig. 39) in row 3, in addition to selecting the totalizer on the front totalizer line for the addition of debit items, also rocks the plate 857 (Fig. 23) counter clockwise to remove the projection 856 from the path of the stud 855, thereby permitting counter clockwise movement of the shaft 816 and the pawl 852 when the machine is released for operation. Again no total key is depressed, consequently the hook 813 and the yoke 829 prevent counter clockwise movement of the yoke 815 and the arm 834 respectively. As the yoke 829 (Fig. 23) receives no movement the extension 884 remains in the position here shown, and consequently does not interfere with the downward movement of the pawl 852. Releasing the machine for operation allows the pawl 852 to move into the path of the projection 853 to break the latch of the first transaction bank in the third position, thereby selecting the minus side of the add-subtract totalizer and the proper totalizer on the auxiliary totalizer line for the storing of debit items.

At the end of this specification a system will be outlined in which the various functions of the machine will be related in sequential order.

Interlocks between the transaction keys and the total keys

Figure 16:
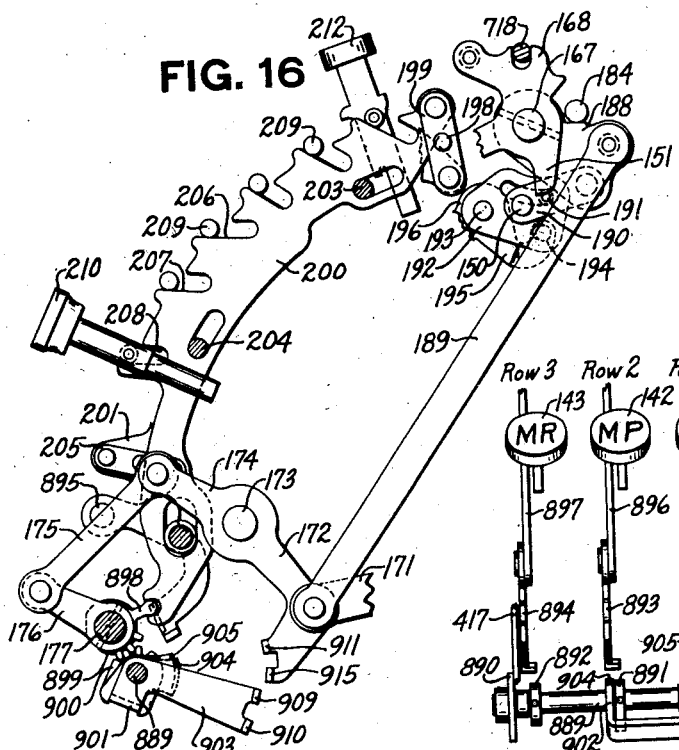
Fig. 16 is a side elevation of a part of the interlocking mechanism between the transaction banks, the total keys and the machine releasing mechanism.
Figure 17:
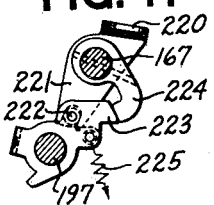
Fig. 17 is a detail view of part of the machine releasing mechanism.
Figure 18:
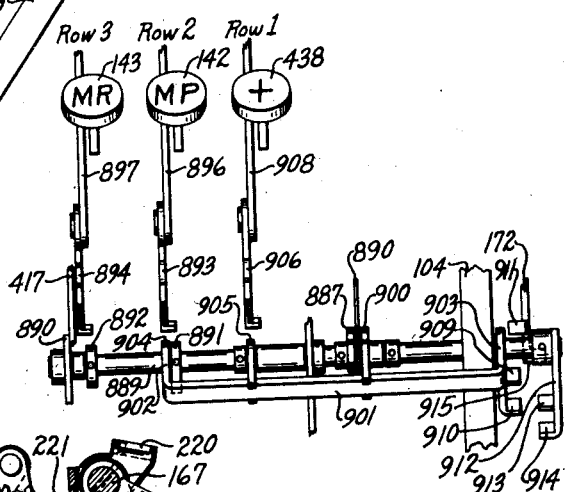
Fig. 18 is a front view of the interlocking mechanism between the transaction banks, the total keys and the machine releasing mechanism.
Figure 19:
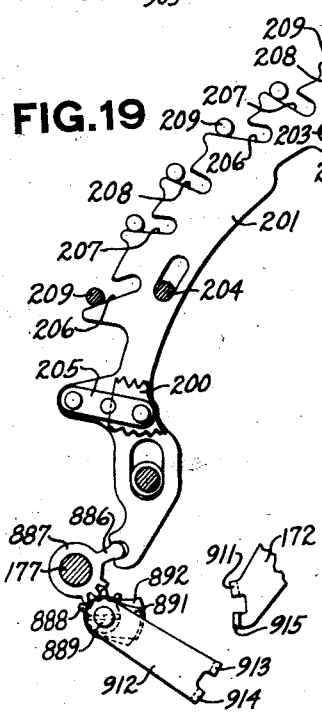
Fig. 19 is a side elevation showing in detail the mechanism for releasing the machine by means of the total keys.

The present machine has been provided with mechanism for preventing the depression of a wrong combination of keys in total taking operations which would undoubtedly result in an improper operation of the various mechanisms. Figs. 16, 18 and 19 well illustrate this interlocking mechanism, which will now be described in detail.

It will be recalled that the plates 200 and 201 (Figs. 16 and 19) each have two sets of slots, corresponding slots of each set being identical. These slots cooperate with studs 209 carried by the total keys 210, 211 and 212 (see also Fig. 39). The slots 206 give the plates 200 and 201 maximum throw counter-clockwise. The slots 207 give the plates a medium movement counter-clockwise and the slots 208 give minimum counter-clockwise movement to said plates 200 and 201. It will be noted by referring to Figs. 16 and 19 that the slots 206 of the plate 200 are in operative alinement with the slots 208 in the plate 201, and that the slots 207 of both plates are in alinement. From the foregoing it will be seen that when either the first reset key 210 or the first read key 212 is depressed, the plate 200 receives minimum movement, while the plate 201 receives maximum movement that depressing either the No. 2 reset or No. 2 read key causes both plates to move exactly the same distance, and that depressing either the third reset or third read key causes the plate 200 to move maximum distance and the plate 201 to receive minimum movement.

The lower end of the plate 201 (Fig. 19) is bifurcated to receive a projection 886 of a collar 887 loose on the shaft 177 and having gear teeth which mesh with similar teeth in a segment 888 secured to a shaft 889 supported between a plate 890 (Fig. 5) carried by the hanger 417 for the first transaction bank and the right frame 104. Secured on the shaft 889 are blocking segments 891 and 892 which cooperate respectively with arms 893 and 894 pivoted at 895 to the second and third transaction key frames. The arms 893 and 894 are loosely connected to plates 896 and 897 mounted for slight rocking movement in the second and third transaction banks (see also Fig. 18).

The plate 200 is bifurcated to receive a projection 898 of a collar 899 rotatably supported by the shaft 177 and having teeth which mesh with like teeth in a segment 900 loose on the shaft 889. The segment 900 has a slot which embraces the bail of a yoke 901 turnably supported on the shaft 889 by arms 902 and 903, said arm 902 terminating in a segment 904 which cooperates with the arm 893. Loose on the shaft 889 is a segment 905 slotted to embrace the bail of the yoke 901. The segment 905 is arranged to cooperate with an arm 906 pivoted at 907 to the first transaction bank 437 (see also Fig. 5) and loosely connected to a reciprocable plate 908 (Fig. 18) also carried by the first transaction bank and arranged to be acted upon by the keys in this bank.

Depression of any one of the keys in row 1 moves the lower end of the arm 906 into the path of the segment 905. Depression of the total new balance key 210 or the first read key 212 moves the plate 200 and the yoke 901 minimum distance and the plate 201 and shaft 889 maximum distance. Therefore the yoke 901 does not move the segment 905 far enough for the arm 906 to interfere therewith. The shaft 889 moves the segments 891 and 892 into the paths of the arms 893 and 894, thereby preventing depression of keys in either row 2 or row 3 at this time.

With a key depressed in row 1, depression of the second or third reset key 211 or the second or third read key 212 moves the plate 200, the yoke 901 and the segment 905 until said segment 905 strikes the arm 906. This prevents further depression of these keys. Consequently it is impossible to release the machine for operation when attempting to use this combination of keys.

Depression of a key in row 2 (Figs. 18 and 39) moves the arm 893 into the path of the segment 891 and the segment 904 of the yoke 901 (see also Fig. 16). Depression of either the second reset or second read key moves the plates 200 and 201 (Figs. 16 and 19) the yoke 901 and the shaft 889 exactly the same distance. This movement is not enough to cause the segment 891 (Fig. 18) or the segment 904, the blocking surfaces of which are exactly the same height, to interfere with the arm 893. Consequently it is possible to fully depress the second reset or second read key in combination with keys in row 2, to release the machine for a second reset or second read operation. This movement of the yoke 901 and the shaft 889 moves the segment 905 and the disk 892, the blocking surfaces of which are exactly the same height, into the path of the arms 906 and 894, thereby preventing depression of keys in row 1 or row 3.

Depression of any one of the keys 143 in row 3 rocks the arm 894 into the path of the segment 892. Subsequent depression of either the third reset or third read key rocks the plate 200 and the yoke 901 maximum distance, and the plate 201 and shaft 889 minimum distance. Maximum movement of the yoke 901 rocks the segments 904 and 905 in the paths of the arms 893 and 906 thereby preventing depression of keys in row 1 and row 2. Minimum movement of the plate 201 and the shaft 889 does not move the segment 892 far enough to cause it to interfere with the arm 894; consequently using the keys in row 3 in combination with the third reset or third read key is permissible and releases the machine for operation. Attempting to depress the first reset or first read key in combination with keys in row 3 causes the plate 201 to rock the shaft 889 until the segment 892 contacts the lower bent portion of the arm 894 which blocks further movement of the shaft 889 and consequently prevents complete depression of either the first reset of first read key. Likewise, depressing either the second reset or second read key gives medium movement to the plate 201 which is sufficient to cause interference between the segment 892 and the arm 894.

In the instant machine a further safeguard has been provided for preventing the depression of the wrong combination of keys. This mechanism prevents the clockwise releasing movement of the key lock shaft 167 (Fig. 15) when an attempt is made to use the wrong combination of transaction and total keys. This prevents straining of the mechanism connected with the shaft 889 and the yoke 901 when an effort is made to forcibly depress the wrong total key. Such mechanism will now be described.

Referring to Figs. 16, 18 and 19, the arm 903 of the yoke 901 has right-angled lugs 909 and 910, which cooperate with a projection 911 of the arm 172. Secured to the righthand end of the shaft 889 is an arm 912, bifurcated and formed to produce lugs 913 and 914, which cooperate with a projection 915 of the arm 172. As previously brought out, the plate 200 under control of the total keys 210, 211 and 212 (see also Fig. 39) has three movements, minimum, medium and maximum, which rotates the yoke 901 and arm 903, 15, 30 and 45 degrees respectively. This is also true of the plate 201, the shaft 889 and the arm 912. When the yoke 901 is not restrained from moving to its 30 or 45-degree position, the lugs 909 or 910 are in such position that they clear the projection 911. Consequently the arms 172, 188, 168 and the shaft 167 are free to rotate clockwise when said shaft 167 is released by the total key as previously described. It will be recalled that depressing a total key couples the arm 188 to the arm 168 in order to rotate the arm 172 and the zero latch throwout shaft 177 in unison with the releasing movement clockwise of the shaft 167. In a like manner, movement of the shaft 889 and the arm 912 to the 30 or 45-degree position places the lugs 913 and 914 where they clear the projection 915 of the arm 172; therefore, movement of the arm 172 is not blocked. Consequently the shaft 167 may be released.

In other words, in total taking operations, whenever the proper combination of transaction and total keys is depressed the lugs 909 and 910 of the arm 903 clear the projection 911 on the arm 172 and the lugs 913 and 914 clear the projection 915 on the arm 172. When the wrong combination of keys is depressed the yoke 901 and the shaft 889 are restrained from making full movement to the 30 or 45-degree position. Consequently the lugs 909 and 911 or the lugs 913 or 914 remain in the path of the projection 911 or 915, as the case may be, thereby preventing clockwise releasing movement of the shaft 167. It might be well to state here that minimum movement of the 15-degree position of both the yoke 901 and the shaft 889 has no blocking effect on the clockwise releasing movement of the shaft 167.

Further explanation of this mechanism will be given by examples of what happens when the different combinations of transaction and total keys are depressed. Assuming a key is depressed in row 1 (Figs. 16, 18, 19 and 39), depressing the total new balance key or first reset key 210 or the first read key 212 moves the plate 200 and yoke 901 minimum distance (15 degrees) which in turn moves the lug 909 to a position just below the projection 911. Consequently no interference is created and the shaft 167 is therefore free to make its releasing movement clockwise, which indicates a permissible combination of keys. It is unnecessary to consider the shaft 889 and its movement in connection with the first row of transaction keys 438, as the movement of this shaft has no relation whatever to these keys.

Likewise with a key depressed in row 1, which, as previously stated, rocks the lower end of the arm 906 (Fig. 18) into the path of the blocking segment 905 controlled by the movement of the yoke 901, let us assume an attempt is made to depress the second reset or second read key. This causes the plate 200 to move the yoke 901 and arm 903 counter clockwise until the segment 905 strikes the lower end of the arm 906, thus stopping the counter clockwise movement of the arm 903 before it reaches its medium or 30-degree position. Consequently the lug 909 is in the path of the projection 911, thereby blocking the clockwise movement of the arm 172, which through the link 189 prevents clockwise releasing movement of the arm 188 and the shaft 167. This eliminates the possibility of forcing the machine to release by straining the mechanism when the wrong combination of keys is used.

With one of the keys in row 1 depressed, an attempt to press the third reset or third read key, through the plate 200 rocks the yoke 901 and the arm 903 to a position where the segment 905 engages the lower end of the arm 906, which, as stated above, places the lug 909 in the path of the projection 911 to prevent release of the machine when using this combination of keys.

Depressing a key in row 2, as previously stated, rocks the lower end of the arm 893 into the path of the segment 891 carried by the shaft 889 and the segment 904 of the yoke 901. With a key depressed in row 2 let us assume that an attempt is made to release the machine by depressing the first reset or the first read key. This, as explained above, through the plate 200 rocks the yoke 901 and arm 903 minimum distance, 15 degrees, which it will be remembered has no blocking effect on the arm 172. Movement of the plate 201 rocks the shaft 889 and the arm 912 counter clockwise toward their 45-degree position until the segment 891 engages the lower end of the arm 893, which positions the lug 914 on the arm 912 in the path of the projection 915 of the arm 172, thereby preventing release of the machine when this combination of keys is used.

In using the No. 2 reset and the No. 2 read key in combination with one of the keys in row 2, the plates 200 and 201 are moved medium distance to rock the arms 903 and 912 to their 30-degree positions, to which positions they are free to move without any interference from the arm 893. This positions the lugs 909 and 910 so that they clear the projection 911 and likewise positions the lugs 913 and 914 so that they clear the projection 915. Therefore, with this combination of keys depressed, the arm 172 is free to move clockwise thereby permitting the clockwise releasing movement of the shaft 167.

With a key depressed in row 2, attempt to depress the third reset or third read key through the plate 200 and the yoke 901 moves the arm 903 towards its 45-degree position until the segment 904 engages the lower end of the arm 893 which obstructs said yoke 901 against further movement. This leaves the arm 903 in a position where the lug 910 is opposite the projection 911 of the arm 172, thereby preventing release of the key lock shaft 167 when this combination of keys is used. The plate 201 at this time receives minimum movement, which does not rotate the arm 912 sufficiently to place the lugs 913 and 914 in an effective position.

We will now consider the use of the keys 143 in the third transaction bank, in combination with the different total keys. Depression of any one of the keys 143 through the plate 897 (Fig. 18) rocks the lower end of the arm 894 into the path of the segment 892 carried by the shaft 889. With one of these keys depressed, let us assume an attempt is made to depress the first reset or the first read key. Depression of either of these keys through the plate 201 rocks the shaft 889 and the arm 912 towards their 45-degree positions. The segment 892 strikes the lower end of the arm 894, thereby arresting movement of the arm 912 before it completes its maximum movement. This positions the lug 913 in the path of the lug 915, thereby blocking the releasing movement of the shaft 167, which as previously stated, prevents releasing the machine by forcing the mechanism when the wrong combination of keys is being used. Due to the fact that the yoke 901 has no mechanical connection with the third transaction bank, movement of the plate 200 is of no effect at this time.

With a key depressed in the third transaction bank depression of either the second reset or second read key, which under normal conditions rocks the shaft 889 and the arm 912 counter clockwise through 30 degrees of movement, rocks said shaft and arm 912 until the segment 892 contacts the lower end of the arm 894. This arrests movement of the arm 912 leaving the lug 913 in the path of the projection 915 to prevent release of the machine as related above.

Depressing the third reset or third read key in combination with any one of the keys 143 in the third transaction bank through the plate 201 rocks the shaft 889 and arm 912 counter clockwise through 15 degrees of movement, which as previously stated, is not sufficient to place the lug 913 in the path of the projection 915. Consequently the arm 172 is free to move counter clockwise. This results in no restraint being placed on the counter clockwise releasing movement of the shaft 167; therefore, use of this combination of keys is permissible.

PRINTING MECHANISM

Only as much of the printing mechanism has been shown herein as was thought necessary to properly disclose the instant invention. This invention is particularly concerned with the sliding table or traveling carriage mechanism and has to do with the automatic line spacing of said table. Therefore, the following description will be confined principally to the automatic linespacing mechanism.

The bulk of the printing mechanism used in this machine is old, having been disclosed in former patents, two of which are United States Patent No. 1,747,397, granted to B. M. Shipley, February 18, 1930, and the Shipley Patent No. 1,761,542, referred to near the beginning of this specification, to which reference may be had for a thorough disclosure and description of the standard printing mechanism.

Referring to Figs. 54 and 55, a traveling carriage or sliding table 920 is mounted for lateral movement on an ejector shaft 921 supported by brackets 922, one only here shown, secured to the machine base 98, and by rollers 923 and 924 carried by a U-shaped bracket 925 secured to said sliding table cooperating with a rail 926 secured to the machine base 98. The table 920 supports a plurality of depressible keys 927 having notches 928 which cooperate with slots 929 in a slidable detent 930 mounted for slight lateral movement on studs secured in a plate carried by the table 920. A spring 931 is tensioned to urge the detent 930 toward the right. This locks the depressed key until another key is depressed, or until the detent 930 is automatically moved toward the left. This latter occurs near the end of each machine operation in the instant machine. Each of the keys 927 has a spring 932 which returns said keys 927 to and retains them in their normal positions when they are released.

The lower ends of the keys 927 are tapered to cooperate with hinged plates 933 and 934 rotatably supported by upright extensions 935 (only one here shown) of a bracket 936 mounted for slight horizontal movement on studs 937 secured in a plate 938 fast to the base 98. The plates 933 and 934 are retained upward against the head of a stud 939 fast in the bracket 936 by a spring 940 which is tensioned between said hinged plate. The bracket 936 has a down-turned ear 941 maintained between two springs 942 by a screw 943 adjustably supported by nuts 944 on a bracket 945 secured to the plate 938. The screw 943 extends through a clearance hole in the ear 941.

The normal position of the sliding table 920 is at the extreme left, just opposite to that shown in Fig. 54. However, it will be observed that the plates 933 and 934 which form a locating stop for the sliding table may be approached from either direction.

Figure 53:
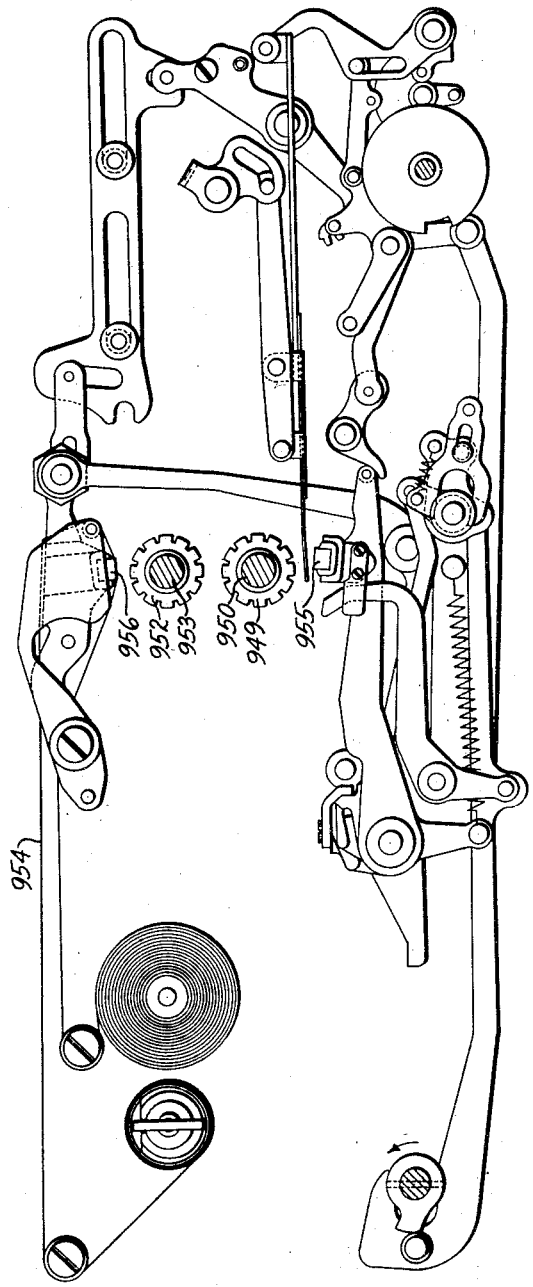
Fig. 53 is a front elevation of a portion of the printing mechanism.

The keys 927 are line-finding keys and in the instant machine there are twenty-seven of these keys, each of which corresponds to a space on ledger cards 946 and 947 (Figs. 49 and 50) and a proof card 948 (Fig. 51). These cards are arranged to be inserted within guides 949 (Fig. 55) (only one here shown) carried by the table 920. The key 927 corresponding to the line upon which it is desired to print is first depressed. This is done usually with the carriage 920 in its extreme lefthand position. The sliding table 920 is then pushed toward the right. The stem of the depressed key, which in the case of the ledger card 946 would be the seventh, engages the top surface of the inclined hinged plate 934, rocking said plate clockwise against the tension of the spring 940. The plate 933 serves as a stop for the lower end of the depressed key and, as soon as the key stem passes over the plate 934 the spring 940 returns said plate upward to its normal position to secure the sliding table 920 in its adjusted position until the depressed key is released. The springs 942 cushion the shock and prevent injury to the key stem when the movement of the sliding table 920 is stopped by one of the plates 933 or 934. This locates the desired line on the ledger card in relation to a line of type wheels 949 (Fig. 53) loose on a rod 950 fast in a rear printer frame 951 (Figs. 5 and 6). There is a duplicate line of type wheels 952 loose on a rod 953 also carried by the printer frame 951 for printing on a detail strip 954 (Fig. 52) upon which is retained a complete record of the transactions of a certain business period. In the instant machine each of the rods 950 and 953 carries four sets of amount type wheels, each set having nine wheels. In addition there is a set of date wheels, a set of transaction wheels and a set of six ledger number wheels on each type wheel line. A common driving means actuates corresponding sets of wheels of the two lines, and there is a set of hammers 955 for the lower type line and 956 for the upper line of type wheels. All the mechanism shown in Fig. 53 is of conventional design and is fully described in the Shipley patents referred to in connection with the printing mechanism. Therefore it is thought unnecessary to further explain this mechanism.

AUTOMATIC LINE SPACING MECHANISM

It will be noted by referring to Figs. 49 and 50 that there are seven vertical columns on each ledger card, namely, a "date" column, an "old balance" column, a "debit" column, a "credit" column, a "new balance" column, a "transaction" column, and an "account number" column. In this machine debits and credits are never printed on the same line, however, any other combination of transactions are printed on the same line. For example, an old balance, a debit, and a new balance are printed upon the same line. Likewise an old balance, a credit, and a new balance transaction are all printed upon the same line. This automatic line-spacing mechanism and the manner in which it is controlled by the first transaction bank will now be described in detail.

Figure 60:
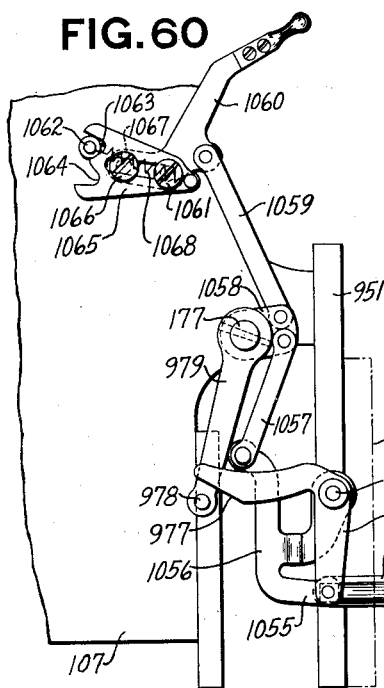
Fig. 60 is an end view of the controlling mechanism for the sliding table escapement mechanism.
Figure 63:
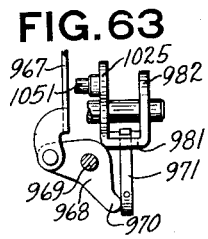
Fig. 63 is a top view of the operating yoke for the automatic line-spacing mechanism.

The first transaction bank printer pinion line 451 (Figs. 5 and 65) has fast thereon a disk 957 having notches 958 and 959 that cooperate with an extension 960 of an arm 961 loose on a hammer control shaft 962 journaled between the printer frames 453 and 951 (Fig. 60). The arm 961 has a projection 963 adapted to be engaged by a stud 964 fast in an arm 965 secured to the shaft 962. The arm 961 has an extension 966 to which is pivoted one end of a link 967, the other end of which is loosely connected to a shifting pawl 968 (Figs. 61 and 63) turnably mounted on a stud 969 fast in the base plate 98. The pawl 968 has a projection 970 which cooperates with an arm 971 secured to a rod 972 shiftably supported by a bracket 973 secured to the frame 453 and by a sub-frame 974 secured to the frame 951 (Fig. 60). The rear end of the rod 972 is pivotally connected to one arm of a lever 975 turnably supported by a stud 976 carried by the sub-frame 974. Another arm of the lever 975 has a camming surface 977 adapted to coact with a stud 978 in an arm 979 secured to the zero throwout shaft 177.

Figure 61:
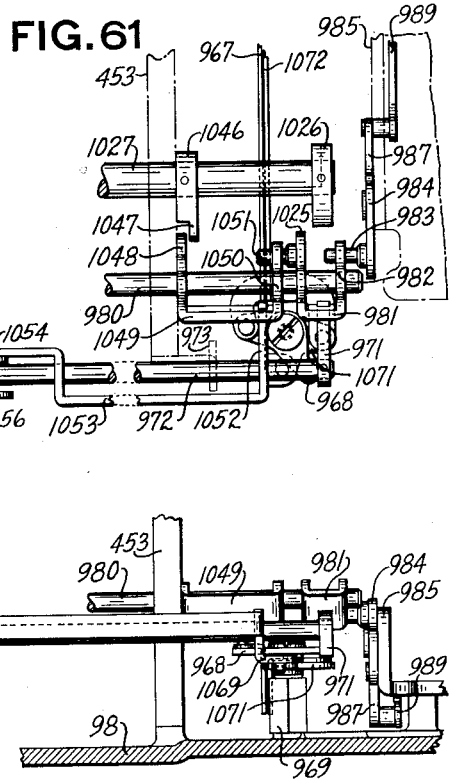
Fig. 61 is a top view of part of the mechanism shown in Fig. 60.
Figure 62:
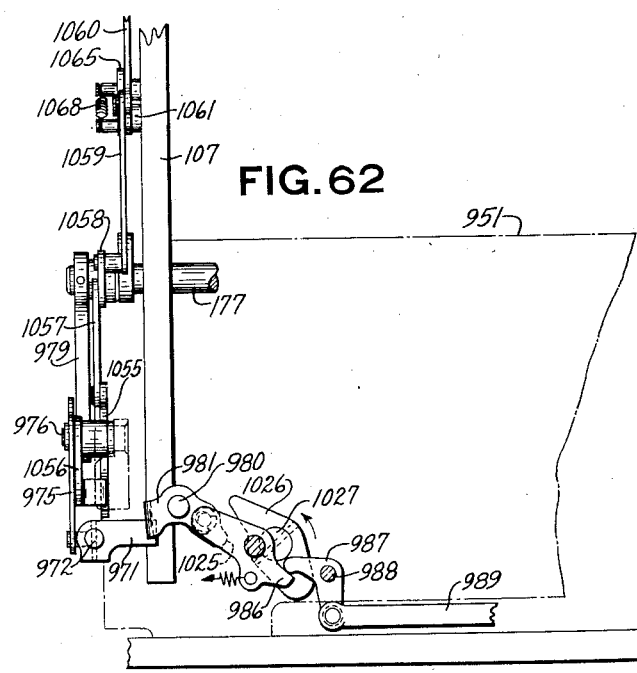
Fig. 62 is a front view of a part of the mechanism shown in Fig. 60.

Journaled in the frames 951 and 453 is a shaft 980 having loose thereon a yoke 981 slotted to receive the arm 971 (see also Fig. 62). An arm 982 (Figs. 60 and 61) of the yoke 981 is bifurcated to embrace a stud 983 fast in a lever 984 pivoted on a bracket 985 secured to the base plate 98. The arm 984 has a projection 986 (Figs. 56 and 57) which cooperates with one arm of a bell crank 987 loose on a stud 988 secured in the bracket 985. A link 989 pivotally connects the bell crank 987 to an escapement plate 990 turnably mounted on a stud 991 secured in a bracket 992 fast to the base plate 98. Pivoted on a stud 993 carried by the plate 990 is an escapement pawl 994 having a projection 995 which is maintained against a stop stud 996 fast in the escapement plate 990 by a torsion spring 997 supported by a stud 998 fast in the bracket 992. The stud 998 also forms the connection between the link 989 and the plate 990. Pivoted on the stud 991 is an escapement pawl 999, a projection of which is urged counterclockwise by the spring 997 against a stop stud 1000 carried by the plate 990. The pawls 949 and 999 have respectively teeth 1001 and 1002 which cooperate with a plurality of teeth 1003 on a rack 1004 secured to the bracket 925 (see also Fig. 55) which supports the table 920. A spring 1005 is tensioned to urge the plate 990 (Fig. 57) counterclockwise, which normally maintains the tooth 1002 of the pawl 999 in engagement with the teeth of the rack 1004.

Secured to the shaft 451 is a mutilated disk 1006 having depressions 1007 and 1008 that correspond respectively to the zero and the sixth positions of the first transaction bank latch, which cooperate with a stud 1009 in an arm 1010 loose on the shaft 962. The arm 1010 is bifurcated to embrace a stud 1011 in a bell crank 1012 loose on a shaft 1013 supported by the frames 453 and 951. The bell crank 1012 has fast therein a stud 1014 embraced by a slot in an arm 1015 secured to a shaft 1016 rotatably supported by the bracket 992. Secured to the shaft 1016 is another arm 1017 carrying a stud 1018 (Fig. 58) which cooperates with a lever 1019 pivoted on a shifting plate 1020 mounted for slight reciprocating movement on studs 1021 secured in the bracket 992. The plate 1020 has an angular camming surface 1022 which cooperates with a stud 1023 carried by the escapement pawl 999 (see also Figs. 58 and 59).

Calling attention to Figs. 39 and 49, let us assume that the ledger card 946 has been properly inserted within the guides of the sliding table and the first space thereon located opposite the printing point by depressing the No. 1 line finding key and moving the sliding table 920 to the right until the stem of the depressed key is engaged and retained by the stop plates 933 and 934 in the manner set out hereinbefore. An old balance of $5000.00 is set up on the amount keys, the total old credit balance key is depressed in row 1, and the machine released for operation by depressing the starting bar 108. In this case the old credit balance key controls the first transaction bank latch causing it to break in the eighth position. Consequently the periphery of the disk 957 (Fig. 65) is in the path of the extension 960 and retains the arm 961 in its normal ineffective position, the arm 965 in this case rocking idly back and forth. At the end of this first operation the plate 930 (Fig. 54) is shifted toward the left, as explained in Shipley Patent No. 1,761,542, to release the depressed line finding key and to surrender control of the table 920 to the escapement mechanism.

Next a credit item of $150.00 is entered on the ledger card by depressing one of the keys in row 2 and releasing the machine for operation by depressing the starting bar 108. As previously brought out, pressing any one of the keys in row 2 causes the first transaction bank latch to be automatically broken in its ninth position. This positions the shaft 451 (Fig. 65) and the disk 957 so that the notch 959 is opposite the extension 960 of the arm 961. Immediately after the disk 957 is positioned the arm 965 makes its initial movement clockwise, the arm 961 moving in unison therewith under tension of a spring 1024 until the extension 960 seats in the bottom of the notch 959. This through the link 967 rocks the pawl 968 (Figs. 61 and 63) counterclockwise which in turn shifts the arm 971, the rod 972 and the yoke 981 toward the front of the machine. This places a rounded extension 1025 of the yoke 981 in the path of a cam 1026 secured on a printer cam shaft 1027 journaled in the frames 453 and 951. The shaft 1027 makes one counterclockwise revolution (Fig. 62) each time the machine operates. In adding and subtracting operations this counterclockwise movement starts immediately after the machine is released for operation. In total taking operations this counterclockwise movement starts at the beginning of the second cycle of movement of such operation. In this case the yoke 981 is not shifted until the arm 1026 has revolved beyond the projection 1025. Therefore during this operation the sliding table will not be automatically line-spaced, but the condition has been set up whereby automatic line-spacing will take place in the succeeding operation unless such condition is overcome by other means, to be described later on.

The next item is a credit item of $60.00. This amount is set up on the keyboard and one of the keys in row 2, together with the starting bar, is depressed, thus releasing the machine for a credit operation as before. The arm 1026 (Fig. 62) wipes the projection 1025 of the yoke 981, rocking said yoke in a clockwise direction, which through the arm 986, bell crank 987 and the link 989 (see also Fig. 57) rocks the escapement plate 990 clockwise, which through the pawls 994 and 999 in cooperation with the teeth 1003 of the rack 1004 allows the table 920 under the tension of the spring 1028 to tabulate one position to the left. The spring 1005 returns the plate 990 counterclockwise, causing the tooth 1002 of the pawl 999 to engage the rack 1004 to retain the table 920 in its tabulated position. It will be recalled that the line finding key 927 is released near the end of the first operation, thereby surrendering control of the sliding table 920 to the escapement mechanism.

From this period on the entering of credit or debit items causes the sliding table to line-space, as the automatic line spacing mechanism remains effective until a balancing operation is made. Another credit item of $25.00 is entered followed by three debit items of $300.00, $60.00 and $25.00 after which a new balance is taken. This is accomplished by depressing the new balance key 210 (Fig. 39) which as previously explained rocks the zero throwout shaft 177 clockwise as viewed in Fig. 2 and counterclockwise as viewed in Fig. 60. The forward movement of the rod 972, as explained above, rocks the lever 975 counterclockwise, placing the camming surface 977 in the path of the stud 978. Therefore counterclockwise movement of the shaft 177 and the arm 979 causes the stud 978 to engage and rock the lever 975 clockwise, which through the rod 972 and the arm 971 shifts the yoke 981 rearwardly to ineffective position. This occurs before the cam 1026 has an opportunity to engage the projection 1025 of the yoke 981. Consequently the line-spacing mechanism is crippled and the new balance of $4,850.00 is therefore printed on the same line as the last debit item. Depressing any one of the other total keys 211 or 212 has the same effect as depressing the total new balance key 210, that is, the automatic line-spacing mechanism is rendered ineffective.

Depressing the new balance key 210 also causes the escapement mechanism to be rendered ineffective so that the sliding table may be returned to its extreme lefthand position by the spring 1028 (Fig. 56). As previously brought out, in taking a new balance, if the amount on the balance totalizer is positive, the first transaction bank latch is broken automatically in the sixth position. If the amount is negative the first transaction bank latch is automatically broken at zero.

As shown in Fig. 57, the depression 1007 which corresponds to the zero position of the first transaction bank latch is shown opposite the stud 1009 of the arm 1010. Therefore in case of an overdraft, the first transaction bank latch will be broken in this position. As the arm 965 makes its initial movement clockwise the stud 964 cooperating with the arm 1010 allows said arm to move clockwise in unison therewith under tension of a spring 1029 until the stud 1009 bottoms in the depression 1007. This through the arm 1012 rocks the arms 1015 and 1017 clockwise, causing the stud 1018 to pass beyond a step 1030 on the lever 1019 (see also Fig. 58). A spring 1031 then forces the lever 1019 clockwise until an abrupt surface thereon contacts the stud 1018, to place the step 1030 in the path of said stud 1018. Return movement counterclockwise of the arm 965 through the arm 1010 and bell crank 1012 positively returns the arms 1015 and 1017 counterclockwise which through the lever 1019 forces the plate 1020 toward the left causing the camming surface 1022 thereon in cooperation with the stud 1023 to rock the pawl 999 clockwise out of engagement with the teeth of the rack 1004 (Fig. 56). The spring 1028 then returns the sliding table 920 to its extreme lefthand position to facilitate the removal and insertion of ledger cards. Exactly the same thing occurs during positive new balance operations in which the first transaction bank latch is automatically broken in the sixth position, which places the depression 1008 of the disk 1006 in the path of the stud 1009. Breaking of the first transaction bank latch in positions other than zero or six, locates the disk 1006 so that the periphery 1032 thereof is opposite the stud 1009 thereby blocking the clockwise movement of the arm 1010.

As the sliding table 920 (Figs. 57, 58 and 59) approaches its extreme lefthand position a bracket 1033 engages a rounded projection 1034 of an arm 1035 rotatably supported by one of the studs 1021, rocking said arm counterclockwise, causing an extension 1036 thereof to engage and rock the lever 1019 counterclockwise to disengage the step 1030 from the stud 1018. A spring 1037 then returns the plate 1020 toward the right, moving the step 1030 of the lever 1019 beyond the stud 1018 and allowing said lever 1019 to come to rest on said stud 1018 when the sliding table is moved from its lefthand position. A stud 1038 in the plate 1020 cooperates with a V notch in the arm 1035 to limit the movement of said arm 1035.

Manual means have also been provided for disengaging the escapement pawl 999 (Fig. 56) from the rack 1004 to release the sliding table 920. Such means includes a finger-piece 1039 (Figs. 54 and 55) pivotally supported by a bracket 1040 carried by the sliding table 920. The fingerpiece 1039 is yoked to an arm 1041 pivoted on the bracket 925. A link 1042 connects the arm 1041 to a plate 1043 supported for slight angular sliding movement on the bracket 925, by means of studs 1044 which cooperate with angular slots in said plate 1043. The lower edge of the plate 1043 cooperates with the stud 1023 carried by the pawl 999. Pressing downward on the fingerpiece 1039 through the link 1042 forces the plate 1043 downwardly against the tension of a spring 1045, causing said plate to engage the stud 1023 to rock the pawl 999 (see also Fig. 56) out of engagement with the rack 1004 to release the sliding table 920. When pressure is removed from the fingerpiece 1039 the spring 1045 returns the plate 1043 upward to its normal position, as shown in Fig. 54.

In proof-reading operations it is necessary that the proof card 948 (Fig. 51) to be line-spaced every operation of the machine in order to print the different items on separate lines. As all the items in a proof-reading operation are the result of total taking operations, it is necessary to render ineffective the mechanism that cripples the line-spacing mechanism when a balance operation is performed. Also in proof-reading, there are two balancing operations which, as previously brought out, generally disengages the escapement mechanism from the rack 1004 (Fig. 56) and allows the table 920 to be returned to its extreme lefthand position by the spring 1028. In order to prevent this releasing of the table 920 in proofreading operations, mechanism has been provided for blocking the clockwise movement of the arm 1010 (Fig. 57).

Figure 64:
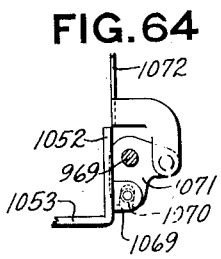
Fig. 64 is a detail view of a part of the mechanism shown in Fig. 61.

Secured on the shaft 1027 (Figs. 57 and 61) is an arm 1046 having a projection 1047 which cooperates with an arm 1048 of a yoke 1049 loosely supported by the shaft 980. Another arm 1050 of the yoke 1049 is bifurcated to embrace a stud 1051 carried by the yoke 981. The bail of the yoke 1049 is slotted to receive an arm 1052 of a slide 1053 loosely supported by the rod 972 and having an extension 1054 pivoted to an arm 1055 of a lever 1056 pivoted on the stud 976 (Fig. 60). The lever 1056 is connected by a link 1057 to an arm 1058 loose on the shaft 177. The arm 1058 in turn is connected by a link 1059 to a lever 1060 rotatably mounted on a stud 1061 secured in the frame 107. Secured in the frame 107 is a stud 1062 which cooperates with notches 1063 and 1064 in a retaining slide 1065 having a slot through which extends the stud 1061 and a stud 1066 secured in an extension 1067 of the lever 1060. A spring 1068 is tensioned to hold the notches 1063 and 1064 in engagement with the stud 1062. The slide 1053 (Figs. 60, 61 and 64) has a projection 1069 carrying a stud 1070 embraced by a slot in a bell crank 1071 rotatably supported by the stud 969. A link 1072 (see also Fig. 57) pivotally connects the bell crank 1071 to an arm 1073 rotatably supported by the shaft 451. The arm 1073 has a projection 1074 which cooperates with a point 1075 of the arm 1010.

With the lever 1060 in its upward position, as shown in Fig. 60, the arm 1048 (Fig. 61) of the yoke 1049 is retained out of the path of the projection 1047 of the arm 1046. Consequently, rotation of the printer cam shaft 1027 has no effect upon this yoke. Therefore, the tabulating of the sliding table 920 is controlled by the automatic line-spacing or tabulating mechanism, which in turn is controlled by the second and third transaction banks, as explained hereinbefore. Likewise when the lever 1060 is retained in its upward position the projection 1074 (Fig. 57) of the arm 1073 is held out of the path of the point 1075 of the arm 1010. Therefore the escapement releasing mechanism remains under the control of the total new balance key 210, as previously explained.

Moving the lever 1060 downwardly (Fig. 60) through the link 1059, the arm 1058 and the link 1057 rocks the lever 1056 counterclockwise to shift the slide 1053 frontwardly, which in turn shifts the yoke 1049 to place the arm 1048 in the path of the projection 1047 of the cam 1046 (Fig. 61). Rotation of the shaft 1027 (Fig. 57) causes the projection 1047 to engage the arm 1048 to rock the yoke 1049 and the yoke 981 in a clockwise direction, as viewed in Figs. 57 and 62. This causes the escapement mechanism to work in exactly the same manner as explained earlier herein for the yoke 981. This line spaces the sliding table 920 every operation of the machine, regardless of the type of operation as long as the lever 1060 is in its downward position. The forward shifting of the slide 1053 when the lever 1060 is moved downwardly, through the extension 1069 (Figs. 57 and 64) rocks the bell crank 1071 counterclockwise, which through the link 1072 rocks the arm 1073 in a counterclockwise direction to place the projection 1074 in the path of the point 1075 to retain the arm 1010 in its ineffective position. This prevents release of the escapement mechanism when a balance operation is performed. Therefore in proof-reading operations the result illustrated in Fig. 51, is obtained.

OPERATION OF THE MACHINE

While an understanding of the operation of the instant machine in a business accounting system will have been obtained from the foregoing description, a complete series of operations which embrace all the different functions of the machine will be given, showing its usefulness.

For illustrative purposes let us take the case of a building and loan association having a number of members who, let us assume, have borrowed money for the purchase of homes. Each of these individuals will have a ledger card such as shown in Figs. 49 and 50 upon which the computation of their separate accounts takes place. One such member, John Doe we will say, has borrowed $5,000.00, which is carried as a credit item in favor of the building and loan association. All charges, such as interest, taxes, insurance and the like, are added to this amount, and all payments made by John Doe are subtracted therefrom. Assuming that each such account is balanced every six months, during this period in this case there would be, let us say, an interest charge of $150.00, a tax charge of $60.00, and an insurance charge of $25.00. John Doe, during this period, makes six monthly payments of $50.00 each, and in addition in the last month of the period, which is June, pays the taxes and insurance.

In computing John Doe's account for this period of six months, the old balance of $5,000.00 is first set up on the amount keys 115 (Figs. 1 and 39) and the total old credit balance key, which is the eighth key in row one, is then depressed, and the machine released for operation by depressing the motor bar 108. This simultaneously selects the plus side of the balance totalizer and the eighth totalizer on the auxiliary line for addition. Next the interest, taxes and insurance items are simultaneously added into the plus side of the balance totalizer and the ninth totalizer on the auxiliary line by using the proper amount keys, the proper keys in row two, and the starting bar. Next the total of the monthly payments, $300.00, the tax and insurance items, are subtracted from the balance totalizer and simultaneously added into the third totalizer on the auxiliary lines by using the amount keys and the proper keys in row three in conjunction with the starting bar. Finally a new balance, in this case $4,850.00, is arrived at by depressing the "new balance" key 210, which in this instance simultaneously selects the plus side of the balance totalizer for resetting and the sixth totalizer on the auxiliary line for the storing of plus total new balances, in the manner previously described.

The above is only one example of the use of this machine by building and loan associations and by referring to Fig. 39 it can be seen that this machine is adapted to the handling of stock transactions and transactions involving the purchase and the cancellation of certificates of deposit, including the crediting or debiting of dividends and interest on outstanding shares of stock and certificates of deposit. Likewise this machine may be used for the handling of pass- book accounts by using the "cash received" and "cash paid out" keys and the "dividend and interest credited" and the "dividend and interest paid out" keys in rows three and two.

PROOF-READING

As an example of proof-reading, let us assume that at the end of each business day a proof card (Fig. 51) is inserted in the machine, the lever 1060 (Fig. 60) is moved downwardly so that the sliding table 920 will automatically line-space each time the machine is operated and a proof-reading is then taken of the day's transactions.

This consists in first clearing and resetting each totalizer on the debit or No. 3 totalizer line by using keys 143 in row three in conjunction with the No. 3 reset key 211 (Fig. 39). Next the third or total debit totalizer on the auxiliary line is cleared and this amount simultaneously added into the negative side of the previously cleared balance totalizer. This is accomplished by depressing the "total debit" key 438 (Fig. 39) in conjunction with the "new balance" key 210. Similarly the total old debit balances or second totalizer on the auxiliary line is reset and this amount simultaneously added into the negative side of the balance totalizer. Next the positive total new balance is transferred from the auxiliary to the balance totalizer by depressing the "plus total new balance" key 438 in row one in conjunction with the "new balance" key 210. The proof balance is then ascertained by clearing the balance totalizer, which is accomplished by depressing the "new balance" key 210 and this amount, as previously explained, is prevented from being transferred into the total new balance minus or No. 7 auxiliary totalizers by depressing the "proof" key 654 in conjunction with the "new balance" key, which shifts the stud 550 (Fig. 33) to an ineffective position. This completes one of the two steps in a proof-reading operation.

The second step consists in first resetting each of the nine totalizers on the credit or No. 2 line by using keys 142 in row 2 (Fig. 39) in connection with the No. 2 reset key 211. Next the amount of the total credit is transferred from the auxiliary totalizer to the positive side of the previously cleared balance totalizer by depressing the "total credit" key 439 in conjunction with the "new balance" key 210. Next the total old credit balances and then the negative total new balances are transferred from the auxiliary to the positive side of the balance totalizer. A proof balance is then taken by depressing the "proof" key 654 and the "new balance" key 210. This clears the balance totalizer and prints the totals of the three items mentioned above. If no mistakes have been made the two proof balances thus ascertained will agree. This proves that all the totalizers on the auxiliary line had been cleared before the starting of the day's transactions, that a new balance operation has been performed at the end of each individual computation, and in addition gives totals of the various debit and credit items, a grand total of all the debits, a grand total of all credits, a grand total of all the positive new balances, and a grand total of all the negative new balances. A duplicate of all the transactions related above is kept on the detail strip 950 (Fig. 52).

From a perusal of this specification it can be seen that in addition to the above use, the machine of this invention is very flexible in nature and is easily adaptable for use in most any business where running accounts involving debit and credit transactions are kept of a number of individuals.

While the forms of mechanisms herein shown and described are admirably adapted to fulfill the objects primarily stated, it is to be understood that it is not intended to confine the invention to the forms of embodiment herein disclosed, for it is susceptible of embodiment in various forms all coming within the scope of the claims which follow.

What is claimed is:

1. In a calculating machine, the combination of a balance totalizer; actuators therefor; means for engaging the totalizer with the actuators; means for operating the engaging means in adding or subtracting operations; another means for operating the engaging means in adding, subtracting, or reset operations; shiftable means for coupling the engaging means to either of the operating means during the same machine operation; means for shifting the coupling means; and means for controlling the shifting means.

2. In a machine of the class described capable of performing balancing operations, the combination of a balance totalizer comprising a set of adding and a set of subtracting wheels each adding wheel being reversely geared to its corresponding subtracting wheel, a common set of actuators for both sets of wheels; means for moving either set of wheels in alinement with the actuators; means for engaging the wheels with the actuators; means for operating the engaging means in adding or subtracting operations; another means for operating the engaging means in adding, subtracting, or reset operation; shiftable means for coupling the engaging means to either of the operating means during the same machine operation; means for shifting the coupling means; and means operated by the moving means for controlling the shifting means.

3. In a calculating machine the combination of a balance totalizer comprising a set of adding and a set of subtracting wheels; a common set of actuators for both sets of wheels; means for moving either set of wheels in alinement with the actuators; means for engaging the wheels with the actuators; means for operating the engaging means in adding or subtracting operations; means for operating the engaging means in adding, subtracting or totalizing operations; shiftable means for coupling the engaging means to either of the operating means; a total control member; means made effective by the total control member for shifting the coupling means; and means operated by the moving means for controlling the shifting means.

4. In a calculating machine, the combination of a balance totalizer comprising a set of adding and a set of subtracting wheels; a common set of actuators for both sets of wheels; means for moving either set of wheels in alinement with the actuators; means for engaging the wheels with the actuators; means for operating the engaging means in adding or subtracting operations; means for operating the engaging means in adding, subtracting or totalizing operations; shiftable means for coupling the engaging means with either of the operating means; means for operating the shiftable coupling means; a total control member; means made effective by the total control member for rocking the operating means into operative alinement with the shiftable coupling means; and means operated by the rocking means for controlling the shiftable coupling means.

5. In a calculating machine adapted to perform variable types of operations, the combination of a balance totalizer having a set of adding and a set of subtracting wheels; a common set of actuators for both sets of wheels; differential means for moving either set of wheels into alinement with the actuators; automatic means for stopping the differential means in either of two positions; means for stopping the differential means in various other positions; means for engaging the totalizer wheels with the actuators; means for operating the engaging means in adding and subtracting operations; means for operating the engaging means in an adding, subtracting or reset operation; shiftable means for normally coupling the engaging means to the latter operating means; means for shifting the coupling means into engagement with the first mentioned operating means; means whereby the shifting means is rendered ineffective when the differential means is stopped in either of the said two positions; and means for rendering the shifting means effective when the differential means is stopped in any other position.

6. In a calculating machine the combination of a balance totalizer having a set of positive and a set of negative wheels; an auxiliary totalizer line having a plurality of auxiliary totalizers thereon consisting of sets of positive wheels; a selecting device for said totalizers; manipulative means for controlling the selecting device; automatic means for controlling the selecting device; means for rendering the automatic means ineffective when the manual controlling means is being used; a balance control device; means controlled by the balance control device for rendering the automatic controlling means effective to select the proper set of wheels of the balance totalizer for resetting and simultaneously select a corresponding set of auxiliary totalizer wheels for addition; and means rendered effective by the manual controlling means and the balance controlling means when used together for simultaneously disabling the automatic controlling means and for resetting the auxiliary totalizer and adding in the balance totalizer.

7. In a machine of the class described the combination of a balance totalizer having a set of positive and a set of negative wheels; an auxiliary totalizer line having a plurality of auxiliary totalizers thereon consisting of sets of positive wheels; a common selecting device for said totalizers; a totalizer for the accumulation of positive items; a totalizer for the accumulation of negative items; selecting means for each of said positive item and negative item totalizers; means controlled by one of said selecting means for automatically controlling the selecting device to simultaneously select the negative side of the balance totalizer and a corresponding set of wheels of the auxiliary totalizer line for accumulation; and means whereby the other selecting means causes the selecting device to simultaneously select the positive side of the balance totalizer and a corresponding set of wheels on the auxiliary totalizer line for accumulation.

8. In a calculating machine the combination of a balance totalizer, an auxiliary totalizer; a selecting member for the balance totalizer; a selecting member for the auxiliary totalizer; common controlling means for both selecting members; automatic means controlled by the algebraic state of the balance totalizer for positioning the controlling means; other positioning means for the controlling means; and means whereby the other positioning means supersedes the automatic positioning means.

9. In a machine of the class described, the combination of a balance totalizer; an auxiliary totalizer; a selective device for both totalizers; manipulative means for controlling the selective device; means controlled by the algebraic state of the totalizer for controlling the selective device; and means for rendering the last-named means ineffective when the manipulative means is being used.

10. In a machine of the class described adapted to perform operations of various kinds, the combination of an auxiliary totalizer; actuators therefor; means to engage the totalizer with the actuators; means to operate the engaging means in adding operations; another means to operate the engaging means in adding, subtracting, or resetting operations; means to connect the engaging means to either of the operating means during the same machine operation; a manipulative member; and means intermediate the manipulative member and the connecting means to cause the connecting means to shift to an intermediate position where it engages neither of the operating means.

11. In a machine of the class described, the combination of a plurality of totalizers; add selecting means for said totalizers; a balance totalizer; total-controlling means for the balance totalizer; a reset shaft for the balance totalizer; operating means for the reset shaft; and means controlled by the add selecting means and the total controlling means when they are set at predetermined positions to selectively couple the reset shaft to its operating means.

12. In a machine of the class described, the combination of a totalizer, actuators therefor, means to engage the totalizer with the actuators, means to control the effectiveness of the engaging means, an insertable key, and means operated by the key when inserted into the machine to supersede the control of the engaging means by the first-named controlling means.

13. In a machine of the class described, the combination of a totalizer, actuators therefor, means to engage the totalizer with the actuators, means to control the effectiveness of the engaging means, an insertable key, a control element, means operated by the insertable key when inserted into the machine to adjust the control element from a normal position into an adjusted position, an operating shaft, a cam on the shaft operable during each machine operation, and connections operated by the cam and controlled by the control element when in said adjusted position to render the engaging means ineffective regardless of the effectiveness of the engaging means as controlled by the first-named control means.

14. In a machine of the class described, the combination of a totalizer, actuators therefor, means to engage the totalizer with the actuators, a shaft operable during each operation of the machine, a locking device on the shaft, an arm cooperating with the locking device, said arm normally in position relatively to the locking device whereby the locking device maintains the arm in a position wherein the arm is not operated, an insertable key, means operated by the insertion of the insertable key to control the operation of the arm relatively to the locking device and to predetermine the position into which the arm is set during a machine operation, a shiftable member operable during each machine operation to position the arm according to the position of the means operated by the insertion of the insertable key, and means connected to the arm and positioned thereby to render the totalizer engaging mechanism ineffective.

15. In a calculating machine adapted to perform variable operations, the combination of a balance totalizer; an auxiliary totalizer; actuators for the totalizers; an individual means for engaging each of the totalizers; operating means for the engaging means to engage the totalizers with the actuators in adding or subtracting operations; another operating means for engaging the totalizers with the actuators in adding, subtracting, or reset operations; means for connecting either totalizer engaging means to either operating means during the same machine operation; and means for controlling the connecting means.

16. In a machine of the class described capable of performing operations of various kinds, the combination of a balance totalizer; an auxiliary totalizer; actuators for the totalizers; an individual means for engaging each of the totalizers; operating means for the engaging means to engage the totalizers with the actuators in adding operations; another operating means for engaging the totalizers with the actuators in adding, subtracting, or reset operations; separate means for connecting each of the totalizer engaging means with either operating means at different times during the same machine operation; a total control member; and means rendered effective by the total control member for operating the connecting means.

17. In a calculating machine, the combination of a balance totalizer having a positive and a negative side; a single auxiliary totalizer line having a plurality of totalizers one of which may be selected to receive amounts; means for simultaneously entering positive or negative amounts into the balance totalizer and into a selected one of the auxiliary totalizers; means for controlling certain elements of the machine for taking a total from the balance totalizer and entering said total into one of the auxiliary totalizers; adjustable means adjusted under the sole control of the balance totalizer in accordance with the algebraic state thereof, when taking a total from the balance totalizer, to select the positive side of the balance totalizer and also to select one of said auxiliary totalizers to receive the total when the total on the balance totalizer is positive, and adjusted under said control to select the negative side of the balance totalizer and another one of said auxiliary totalizers to receive the total when the total on the balance totalizer is negative; and means for controlling certain elements of the machine for taking a total from a selected one of said auxiliary totalizers and entering said total into the proper side of the balance totalizer under control of the adjustable means.

18. In a calculating machine having a balance totalizer comprising a positive and a negative side, an auxiliary totalizer line having a plurality of coaxial auxiliary totalizers, means for entering amounts on said totalizers, a manipulative device which is normally in ineffective position but which, upon movement to effective position, sets certain elements of the machine for taking a total from either the balance totalizer or a selected auxiliary totalizer, and a main operating mechanism, the combination of a selector; mechanism controlled by the balance totalizer for adjusting said selector to one of two positions corresponding to the algebraic state of said totalizer; means normally rendering said adjusting mechanism ineffective but permitting it to become effective upon movement of said manipulating device to effective position; and means actuated by said main operating mechanism for bringing into operative position the proper side of the balance totalizer and a corresponding auxiliary totalizer, as determined by the position of said selector.

19. In a machine of the class described having an add and subtract totalizer comprising a set of adding wheels and a set of subtracting wheels, each adding wheel being reversely geared to its corresponding subtracting wheel; a common set of actuators for both sets of wheels said actuators having a data withdrawing movement followed by a data entering movement; and means for positioning either set of wheels in alinement with the actuators, the combination of means operable to engage the actuators and the alined wheels; means for operating the engaging means during the data entering movement of the actuators; another operating means for the engaging means manually selectable for engaging the totalizers either during the data withdrawing movement of the actuators, the data entering movement of the actuators, or during both movements of the actuators; shiftable means for coupling the engaging means to either of the operating means; means for shifting the coupling means; and means operated by the totalizer wheel alining means for selectively controlling the shifting means.

20. In a calculating machine having a totalizer; actuators therefor; means for engaging the totalizer with the actuators; and a main operating mechanism giving a data withdrawing motion to the actuators during a portion of the operative cycle and giving a data entering motion to the actuators during another portion of the operative cycle, the combination of means operable to engage the totalizer with the actuators; operating means for the engaging means normally coupled thereto for operation in data withdrawing or data entering timing; a second operating means for the engaging means normally uncoupled therefrom but operating with invariable data entering timing each machine operation; means shiftable to uncouple the engaging means from its normally coupled operating means and to couple the engaging means with the second operating means; means to operate the shifting means; automatic means to disable the shifting means operating means on certain machine operations; and manual means for preventing the coupling of the second operating means to the engaging means on operation of the shifting means.

21. In a calculating machine having a totalizer; actuators therefor; and a main operating mechanism giving a data-withdrawing motion to the actuators during a portion of the operative cycle and giving a data-entering motion to the actuators during another portion of the operative cycle, the combination of means operable to engage the totalizer with the actuators; operating means for the engaging means normally coupled thereto for operation thereof in data-withdrawing or data-entering timing or both; a second operating means for the engaging means normally uncoupled therefrom but operating with invariable data-entering timing each machine operation; means shiftable to uncouple the engaging means from its normally coupled operating means and to couple the engaging means with the second operating means; means to operate the shifting means; automatic means to disable the shifting means operating means on certain machine operations; manual means for preventing the coupling of the second operating means to the engaging means on operation of the shifting means; and a second manual means operative to uncouple the normally coupled operating means and engaging means before a machine operation and to operate the first-mentioned manual means for preventing the coupling of this second operating means to the engaging means.

22. In a machine of the class described having an add and subtract totalizer; auxiliary totalizers each accumulating either all positive data or all negative data; and common actuators for all of said totalizers for entering data therein or withdrawing data therefrom, the combination of means to condition the add and subtract totalizer to deal with either positive or negative data; means to select an auxiliary totalizer for operation; means coupling the conditioning means to the selecting means so that if a positive individual totalizer or a negative individual totalizer is selected for operation the add and subtract totalizer will be conditioned to deal with the same class of data; means for engaging the add and subtract totalizer with the actuators; means for engaging the selected auxiliary totalizer with the actuators; coexisting alternative means to operate either engaging means, one of said alternative means being normally coupled to both of the engaging means to operate both of the engaging means for data-withdrawing or data entering as selected, and the other of said alternative means being normally uncoupled from both the totalizer engaging means but always operating for data entering operations; a shiftable means associated with each engaging means, said shiftable means being individually operable to uncouple its associated engaging means from the normally coupled operating means and to move it to a neutral position or to couple it to the other of said alternative operating means; means to operate a selected one of the shifting means; and means associated with the add and subtract totalizer conditioning means and the individual totalizer selecting means for selecting the shifting means to be operated.

23. In a machine of the class described having an add and subtract totalizer, auxiliary totalizers each accumulating either all positive data or all negative data, and common actuators for all of said totalizers having a data-withdrawing movement and a data-entering movement, the combination of means to condition the add and subtract totalizer to deal with either positive or negative data; means to select an auxiliary totalizer for operation; means coupling the conditioning means to the selecting means so that if a positive or a negative individual totalizer is selected for operation, the add and subtract totalizer will be conditioned to deal with the same class of data; a means for engaging the add and subtract totalizer with the actuators; a means for engaging the selected auxiliary totalizer with the actuators; coexisting alternative means to operate either engaging means, one of said alternative means being normally coupled to both of the engaging means to operate both of the engaging means in either data-withdrawing timing or data-entering timing and the other of said alternative means being normally uncoupled from both the totalizer engaging means but always moving in data-entering timing; a shiftable means associated with each engaging means, said shiftable means being individually operable to uncouple its associated engaging means from the normally coupled operating means and to move it to a neutral position or to couple it to the other of said alternative operating means; and means under control of the selecting means for controlling both shifting means.

24. In a machine of the class described having an add and subtract totalizer, auxiliary totalizers each accumulating either positive or negative data, and common actuators for all of said totalizers having a data-withdrawing action and a data-entering action, the combination of means to condition the add and subtract totalizer to deal with either positive or negative data; means to select an auxiliary totalizer for operation; means coupling the conditioning means to the selecting means so that if a positive or a negative auxiliary totalizer is selected for operation the add and subtract totalizer will be conditioned to deal with the same class of data; a means for engaging the add and subtract totalizer with the actuators; a means for engaging the selected auxiliary totalizer with the actuators; coexisting alternative means to operate either engaging means, one of said alternative means being normally coupled to both of the engaging means to operate both of the engaging means either for the data-withdrawing action or for the data-entering action and the other of said alternative means being normally uncoupled from both the totalizer engaging means but always operating for the data-entering action; a shiftable means associated with each engaging means, said shiftable means being individually operable to uncouple its associated engaging means from the normally coupled operating means and to move it to a neutral position or to couple it to the other of said alternative operating means; means to operate a selected one of the shifting means; means associated with the add and subtract totalizer conditioning means and the auxiliary totalizer selecting means for selecting the shifting means to be operated; and manual means to render the shifting means operable only to uncouple the engaging means from the normally coupled operating means.

25. In a machine of the class described having a main operating mechanism; an add and subtract totalizer to deal with negative or positive data; a plurality of auxiliary totalizers, part being provided to deal with negative data and part to deal with positive data; and differentially settable totalizer actuator means common to all of the totalizers, the combination of a means for selecting one of the auxiliary totalizers for engagement with the differential means; an operation conditioning means for the add and subtract totalizer; means coupling the selecting means and the conditioning means so that selection of an auxiliary totalizer dealing with negative data will condition the add and subtract totalizer to deal with negative data and the selection of an auxiliary totalizer dealing with positive data will condition the add and subtract totalizer to deal with positive data; means to engage the add and subtract totalizer and the differentially settable means; means to engage the selected auxiliary totalizer and the differentially settable means; a totalizer engaging operating means normally coupled to both engaging means selectively operable in data-withdrawing timing or data-entering timing; a coexisting alternative totalizer engaging operating means to which either engaging means may be coupled, said alternative operating means being timed for data-entering operations; a shiftable means for uncoupling the auxiliary totalizer engaging means from the normally coupled totalizer engaging operating means to a neutral position or to a position coupling it with the alternative operating means; a shiftable means for uncoupling the add and subtract totalizer from the normally coupled engaging operating means; means operated on data-withdrawing operations under control of the auxiliary totalizer positioning means for controlling the shifting means so as to normally cause data withdrawn from the add and subtract totalizer to be entered into the individual totalizer or data withdrawn from an individual totalizer to be entered into the add and subtract totalizer; and manual means which may be operated to prevent data withdrawn from the add and subtract totalizer from being entered into an individual totalizer.

26. In a machine of the class described, the combination of an add and subtract totalizer having positive elements and negative elements; a plurality of auxiliary totalizers each dealing with one class of data, be it of positive significance or of negative significance; a selecting device positionable to select any one of the auxiliary totalizers for operation; manual means for positioning the selecting device; automatic means for positioning the selecting device, at least one of said auxiliary totalizers being selectable either by the manual positioning means or by the automatic positioning means; and a second selecting device for positioning for operation either the positive elements or the negative elements of the add and subtract totalizer, said first-mentioned selecting device and said second selecting device being so designed and coupled that automatic positioning of the first selecting device to select an auxiliary totalizer also through the positioning of the second selecting device will select one of the sets of elements of the add and subtract totalizer and manual positioning of the first selecting device to select the same auxiliary totalizer will select, through the second selecting device, the other of the sets of elements of the add and subtract totalizer.

27. In a machine of the class described having an add and subtract totalizer having positive elements and negative elements; a plurality of auxiliary totalizers; and differential means for actuating said totalizers, the combination of a selecting device positionable to select one of the auxiliary totalizers for actuation, said selecting device being effective in more than one position to select a given auxiliary totalizer; a second selecting device positionable to select either the positive elements or the negative elements of the add and subtract totalizer for actuation; means coupling the two selecting devices so that a given auxiliary totalizer may be selected for actuation with the differential actuators simultaneously with either the positive elements or the negative elements of the add and subtract totalizer; and a differential means to position the selecting devices.

28. In a machine of the class described having an add and subtract totalizer consisting of negative elements and positive elements; and a plurality of auxiliary totalizers, each confined to a single classification of data, be it of positive sig-